(12) United States Patent
Rostami et al.

(10) Patent No.: US 12,508,285 B2
(45) Date of Patent: Dec. 30, 2025

(54) OLIGODENDROCYTE-DERIVED EXTRACELLULAR VESICLES FOR THERAPY OF MULTIPLE SCLEROSIS

(71) Applicant: THOMAS JEFFERSON UNIVERSITY, Philadelphia, PA (US)

(72) Inventors: Abdolmohamad Rostami, Gladwyne, PA (US); Giacomo Casella, Philadelphia, PA (US); Bogoljub Ciric, Philadelphia, PA (US); Guang-Xian Zhang, Philadelphia, PA (US)

(73) Assignee: Thomas Jefferson University, Philadelphia, PA (US)

( * ) Notice: Subject to any disclaimer, the term of this patent is extended or adjusted under 35 U.S.C. 154(b) by 951 days.

(21) Appl. No.: 17/615,975

(22) PCT Filed: Jun. 3, 2020

(86) PCT No.: PCT/US2020/035829
§ 371 (c)(1),
(2) Date: Dec. 2, 2021

(87) PCT Pub. No.: WO2020/247432
PCT Pub. Date: Dec. 10, 2020

(65) Prior Publication Data
US 2022/0323506 A1  Oct. 13, 2022

Related U.S. Application Data

(60) Provisional application No. 62/953,257, filed on Dec. 24, 2019, provisional application No. 62/857,182, filed on Jun. 4, 2019.

(51) Int. Cl.
| | |
|---|---|
| A61K 35/30 | (2015.01) |
| A61K 9/00 | (2006.01) |
| A61K 47/26 | (2006.01) |
| A61K 47/38 | (2006.01) |
| A61K 47/42 | (2017.01) |
| A61P 25/28 | (2006.01) |
| A61P 37/06 | (2006.01) |

(52) U.S. Cl.
CPC ............ *A61K 35/30* (2013.01); *A61K 9/0019* (2013.01); *A61K 9/0043* (2013.01); *A61K 9/0053* (2013.01); *A61K 47/26* (2013.01); *A61K 47/38* (2013.01); *A61K 47/42* (2013.01); *A61P 25/28* (2018.01); *A61P 37/06* (2018.01)

(58) Field of Classification Search
None
See application file for complete search history.

(56) References Cited

U.S. PATENT DOCUMENTS

| | | |
|---|---|---|
| 2009/0104142 A1 | 4/2009 | Foussat |
| 2014/0242037 A1 | 8/2014 | Dresch et al. |
| 2015/0044244 A1* | 2/2015 | Wang et al. ............ A61K 39/00 |
| 2017/0043036 A1 | 2/2017 | Hoffman |
| 2018/0105566 A1 | 4/2018 | Lenardo et al. |
| 2019/0202892 A1 | 7/2019 | Lewis et al. |

FOREIGN PATENT DOCUMENTS

| | | | |
|---|---|---|---|
| EP | 3941528 A1 | 1/2022 | |
| JP | 2015524849 A | 8/2015 | |
| WO | 2013160865 A1 | 10/2013 | |
| WO | 2014028763 A1 | 2/2014 | |
| WO | 2016145086 A1 | 9/2016 | |
| WO | WO-2018029656 A2 * | 2/2018 | ............ A61K 35/15 |
| WO | 2020041720 A1 | 2/2020 | |
| WO | 2020191377 A1 | 3/2020 | |

OTHER PUBLICATIONS

Garusiewics et al., "Glioblastoma stem cell-derived exosomes induce M2 macrophages & PD-L1 expression on human monocytes", Oncoimmunology (Year: 2018).*
WebMD "the four types of multiple sclerosis explained". (Year: 2023).*
National Multiple Sclerosis Society "Types of MS" as established 1996 (Year: 1996).*
Hart, "Why does multiple sclerosis only affect human primates?" Multiple Sclerosis Journal (Year: 2015).*
Van Niel et al., "Shedding light on the cell biology of extracellular vesicles" Nature Reviews (Year: 2018).*
"C. International Multiple Sclerosis Genetics, Multiple sclerosis genomic map implicates peripheral immune cells and microglia in susceptibility.", Science 365, 2019.
"International Search Report and Written Opinion dated Sep. 10, 2010 for International Appln. No. PCT/US2020/035829".
Ajami, et al., "Infiltrating monocytes trigger EAE progression, but do not contribute to the resident microglia pool", Nat Neurosci 14, 2011, 1142-1149.
Bebo, et al., "Gender differences in protection from EAE induced by oral tolerance with a peptide analogue of MBP-Ac1-11", J Neurosci Res 55, 1999, 432-440.
Casella, et al., "Extracellular Vesicles Containing IL-4 Modulate Neuroinflammation in a Mouse Model of Multiple Sclerosis", Mol Ther.; 26(9); PMD: 30017878, 2018, 2107-2118.
Casella, et al., "IL4 induces IL6-producing M2 macrophages associated to inhibition of neuroinflammation in vitro and in vivo", J Neuroinflammation 13, 2016, 139.
Chen, et al., "Tumor-associated macrophages: an accomplice in solid tumor progression", Journal of Biomedical Science, vol. 26, No. 78, Oct. 2019, 1-13.

(Continued)

*Primary Examiner* — Robert M Kelly
*Assistant Examiner* — John David Moore
(74) *Attorney, Agent, or Firm* — Saul Ewing LLP; Kathryn R. Doyle; Justin Crotty

(57) ABSTRACT

In various aspects and embodiments the invention provides a method of treating multiple sclerosis in a subject in need thereof, the method comprising administering to the subject an effective amount of an oligodendrocyte-derived extracellular vesicle.

8 Claims, 38 Drawing Sheets

Specification includes a Sequence Listing.

(56) References Cited

OTHER PUBLICATIONS

Colombo, et al., "Cytokines Stimulate the Release of Microvesicles from Myeloid Cells Independently from the P2X7 Receptor/Acid Sphingomyelinase Pathway", Front Immunol., Feb. 7;9, PMD: 29467770, 2018.
Cox, et al., "MaxQuant enables high peptide identification rates, individualized p.p.b.-range mass accuracies and proteome-wide protein quantification", Nat Biotechnol 26, 2008, 1367-1372.
Croxford, et al., "The Cytokine GM-CSF Drives the Inflammatory Signature of CCR2+ Monocytes and Licenses Autoimmunity", Immunity 43, 2015, 502-514.
Faissner, et al., "Progressive multiple sclerosis: from pathophysiology to therapeutic strategies", Nat Rev Drug Discov, 2019.
Falcao, et al., "Disease-specific oligodendrocyte lineage cells arise in multiple sclerosis", Nat Med 24, 2018, 1837-1844.
Francisco, et al., "The PD-1 pathway in tolerance and autoimmunity", 2010, Immunol Rev 236:219-242.
Fruhbeis, et al., "Neurotransmitter-triggered transfer of exosomes mediates oligodendrocyte-neuron communication", PLoS Biol 11, e1001604, 2013.
Furlan, et al., "Animal models of multiple sclerosis", Methods Mol Biol 549, 2009, 157-173.
Gabrusiewicz, et al., "Glioblastoma Stem Cell-Derived Exosomes Induce M2 Macrophages and PD-L 1 Expression on Human Monocytes", OncoImmunology, vol. 7, Issue 4, Jan. 2018, 1-10.
Getts, et al., "Microparticles bearing encephalitogenic peptides induce T-cell tolerance and ameliorate experimental autoimmune encephalomyelitis", Nat Biotechnol 30, 2012, 1217-1224.
Getts, et al., "Tolerance induced by apoptotic antigen-coupled leukocytes is induced by PD-L1+ and IL-10-producing splenic macrophages and maintained by T regulatory cells", J Immunol 187, 2011, 2405-2417.
Giles, et al., "CNS-resident classical DCs play a critical role in CNS autoimmune disease", J Clin Invest 128, 2018, 5322-5334.
Ginhoux, et al., "Fate mapping analysis reveals that adult microglia derive from primitive macrophages", Science 330, 2010, 841-845.
Hirsch, et al., "Antigen-based immunotherapy for autoimmune disease: current status", Immunotargets Ther 4, 2015, 1-11.
Kaushansky, et al., "Modulation of MS-like disease by a multi epitope protein is mediated by induction of CD11c(+) CD11b(+)Gr1(+) myeloid-derived dendritic cells", J Neuroimmunol 333, 2019, 476953.
Kaushansky, et al., "Multi-epitope-targeted' immune-specific therapy for a multiple sclerosis-like disease via engineered multi-epitope protein is superior to peptides. P", PLoS One 6, e27860, 2011.
Komuczki, et al., "Fate-Mapping of GM-CSF Expression Identifies a Discrete Subset of Inflammation-Driving T Helper Cells Regulated by Cytokines IL-23 and IL-1beta", Immunity 50, e1286, 2019, 1289-1304.
Kroenke, et al., "EAE mediated by a non-IFN-gamma/non-IL-17 pathway", Eur J Immunol 40, 2010, 2340-2348.
Lafaille, et al., "High incidence of spontaneous autoimmune encephalomyelitis in immunodeficient anti-myelin basic protein T cell receptor transgenic mice", Cell 78, 1994, 399-408.
Lutterotti, et al., "Antigen-specific tolerance by autologous myelin peptide-coupled cells: a phase 1 trial in multiple sclerosis", Sci Transl Med 5, 188ra175, 2013.
Mathieu, et al., "Specificities of secretion and uptake of exosomes and other extracellular vesicles for cell-to-cell communication", Nat Cell Biol 21, 2019, 9-17.
McMahon, et al., "Epitope spreading initiates in the CNS in two mouse models of multiple sclerosis", Nat Med 11, 2005, 335-339.
Meredith, et al., "Expression of the zinc finger transcription factor zDC (Zbtb46, Btbd4) defines the classical dendritic cell lineage", J Exp Med 209, 2012, 1153-1165.
Meredith, et al., "Zinc finger transcription factor zDC is a negative regulator required to prevent activation of classical dendritic cells in the steady state", J Exp Med 209, 2012, 1583-1593.

Mildner, et al., "CCR2+Ly-6Chi monocytes are crucial for the effector phase of autoimmunity in the central nervous system", Brain 132, 2009, 2487-2500.
Niel, et al., "Shedding light on the cell biology of extracellular vesicles", Nat Rev Mol Cell Biol 19, 2018, 213-228.
Niu, et al., "Aberrant oligodendroglial-vascular interactions disrupt the blood-brain barrier, triggering CNS inflammation", Nat Neurosci 22, 2019, 709-718.
Readhead, et al., "The dysmyelinating mouse mutations shiverer (shi) and myelin deficient (shimld)", Behav Genet 20, 1990, 213-234.
Riazifar, et al., "Stem Cell-Derived Exosomes as Nanotherapeutics for Autoimmune and Neurodegenerative Disorders", ACS Nano, 2019.
Sage, et al., "Dendritic Cell PD-L1 Limits Autoimmunity and Follicular T Cell Differentiation and Function", J Immunol 200, 2018, 2592-2602.
Serra, et al., "Antigen-specific therapeutic approaches for autoimmunity.", Nat Biotechnol 37, 2019, 238-251.
Smith, et al., "Differential induction of IgE-mediated anaphylaxis after soluble vs. cell-bound tolerogenic peptide therapy of autoimmune encephalomyelitis", Proc Natl Acad Sci U S A 102, 2005, 9595-9600.
Steinman, et al., "Antigen-specific tolerance to self-antigens in protein replacement therapy, gene therapy and autoimmunity", Curr Opin Immunol 61, 2019, 46-53.
Thery, et al., "Minimal information for studies of extracellular vesicles 2018 (MISEV2018): a position statement of the International Society for Extracellular Vesicles and update of the MISEV2014 guidelines", J Extracell Vesicles 7, 1535750, 2018.
Thome, et al., "Induction of Peripheral Tolerance in Ongoing Autoimmune Inflammation Requires Interleukin 27 Signaling in Dendritic Cells", Front Immunol 8, 1392, 2017.
Tian, et al., "Potential Roles of Extracellular Vesicles in the Pathophysiology, Diagnosis, and Treatment of Autoimmune Diseases", International Journal of Biological Sciences, vol. 16, Iss. 4, Jan. 1, 2020, 620-632.
Trabattoni, et al., "Costimulatory Pathways in Multiple Sclerosis: Distinctive Expression of PD-1 and PD-L 1 in Patients with Different Patterns of Disease", The Journal of Immunology, vol. 183, Iss. 8, Sep. 2009, 4984-4993.
Wiklander, et al., "Advances in therapeutic applications of extracellular vesicles", Sci Transl Med 11, 2019.
Xie, et al., "IL-12Rbeta2 has a protective role in relapsing-remitting experimental autoimmune encephalomyelitis", J Neuroimmunol 291, 2016, 59-69.
Yeste, et al., "Nanoparticle-mediated codelivery of myelin antigen and a tolerogenic small molecule suppresses experimental autoimmune encephalomyelitis", Proc Natl Acad Sci U S A 109, 2012, 11270-11275.
Yogev, et al., "Dendritic cells ameliorate autoimmunity in the CNS by controlling the homeostasis of PD-1 receptor(+) regulatory T cells", Immunity 37, 2012, 264-275.
Zeng, et al., "Type 1 regulatory T cells: a new mechanism of peripheral immune tolerance", Cell Mol Immunol 12, 2015, 566-571.
Zhang, et al., "Generation of Oligodendrocyte Progenitor Cells From Mouse Bone Marrow Cells", Front Cell Neurosci 13, 2019, 247.
Zhang, et al., "Loss of the surface antigen 3G11 characterizes a distinct population of anergic/regulatory T cells in experimental autoimmune encephalomyelitis", J Immunol 176, 2006, 3366-3373.
Zhuang, et al., "Treatment of brain inflammatory diseases by delivering exosome encapsulated anti-inflammatory drugs from the nasal region to the brain", Mol Ther 19,, 2011, 1769-1779.
Zubizarreta, et al., "Immune tolerance in multiple sclerosis and neuromyelitis optica with peptide-loaded tolerogenic dendritic cells in a phase 1b trial", Proc Natl Acad Sci U S A 116, 2019, 8463-8470.
Kramer-Albers , et al., "Oligodendrocytes secrete exosomes containing major myelin and stress-protective proteins: Trophic support for axons?, Proteomics Clinical Applications", vol. 1, Dec. 31, 2007, 1446-1461.

(56) References Cited

OTHER PUBLICATIONS

"Supplementary European Search Report dated May 26, 2023 for European Appln. No. 20 81 8397. 0".

Laso-Garcia, et al., "Therapeutic potential of extracellular vesicles derived from human mesenchymal stem cells in a model of progressive multiple sclerosis", PLOS One, vol. 13, No. 9, Sep. 19, 2018.

Osorio-Querejeta, et al., "Therapeutic Potential of Extracellular Vesicles for Demyelinating Diseases; Challenges and Opportunities", Frontiers in Molecular Neuroscience, vol. 11, Nov. 23, 2018.

"Communication Pursuant to Article 94(3) EPC dated Sep. 16, 2025 for European Application No. 20 818 397.0".

\* cited by examiner

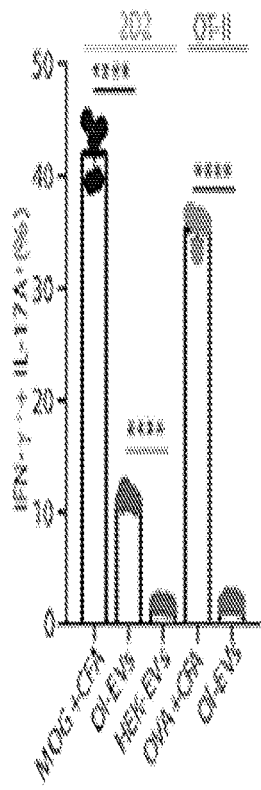 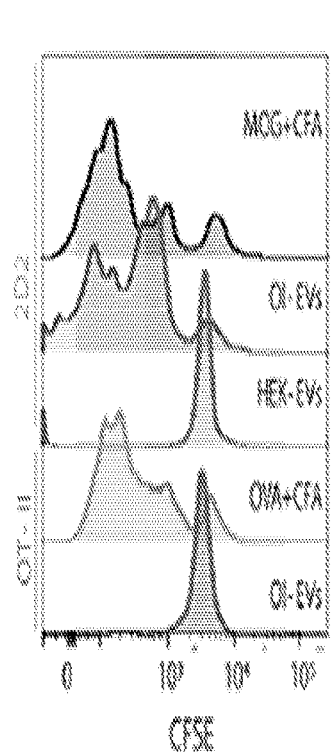 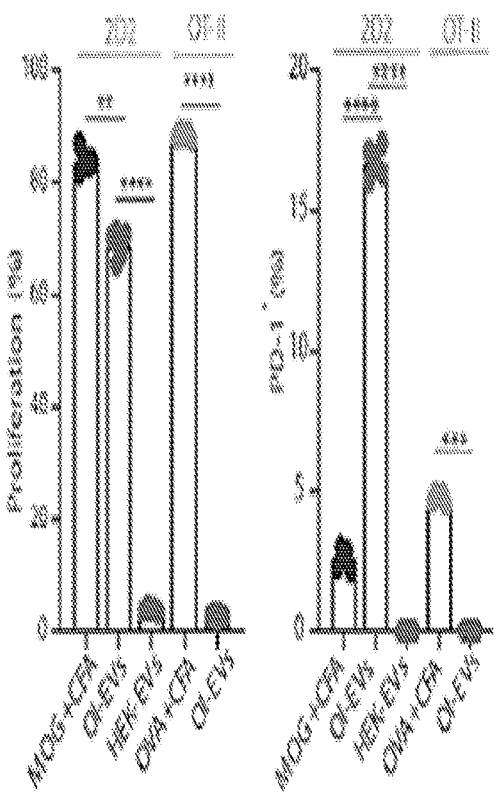
FIG. 3F    FIG. 3G    FIG. 3H    FIG. 3I

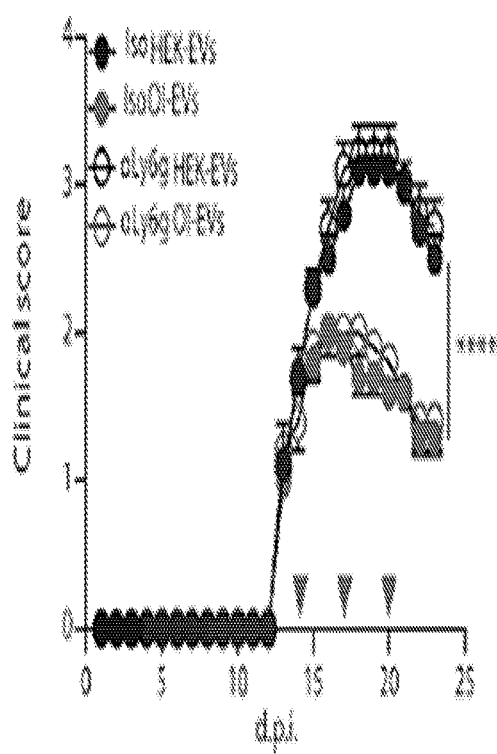
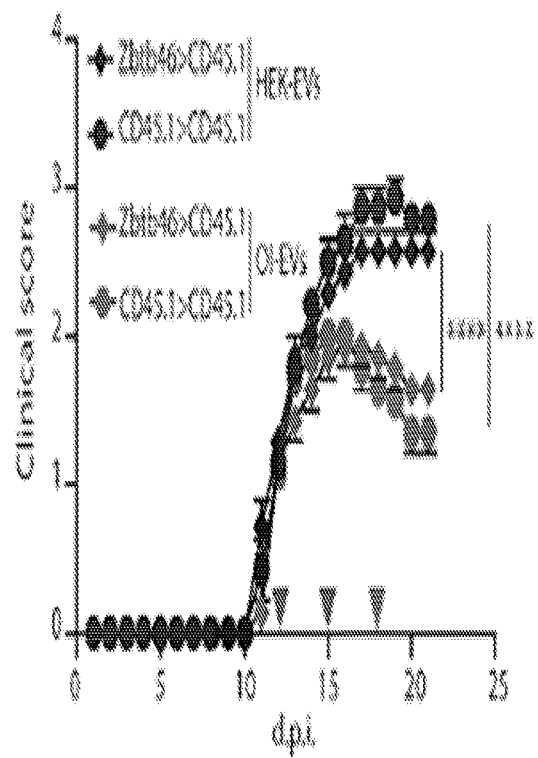
FIG. 4E
FIG. 4F

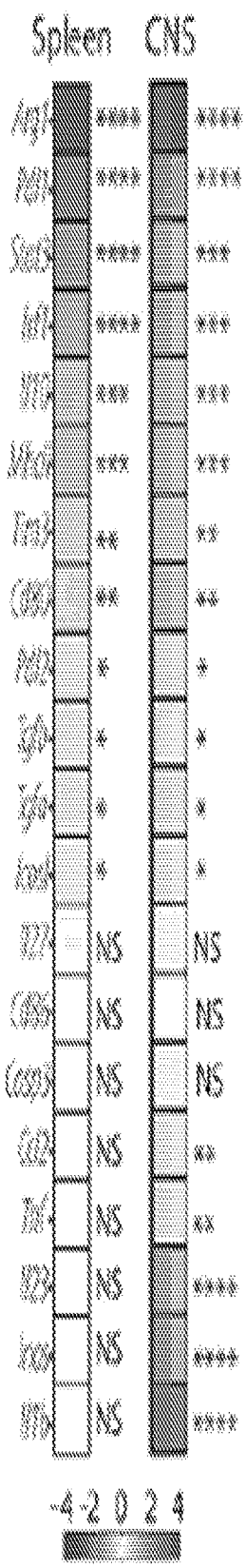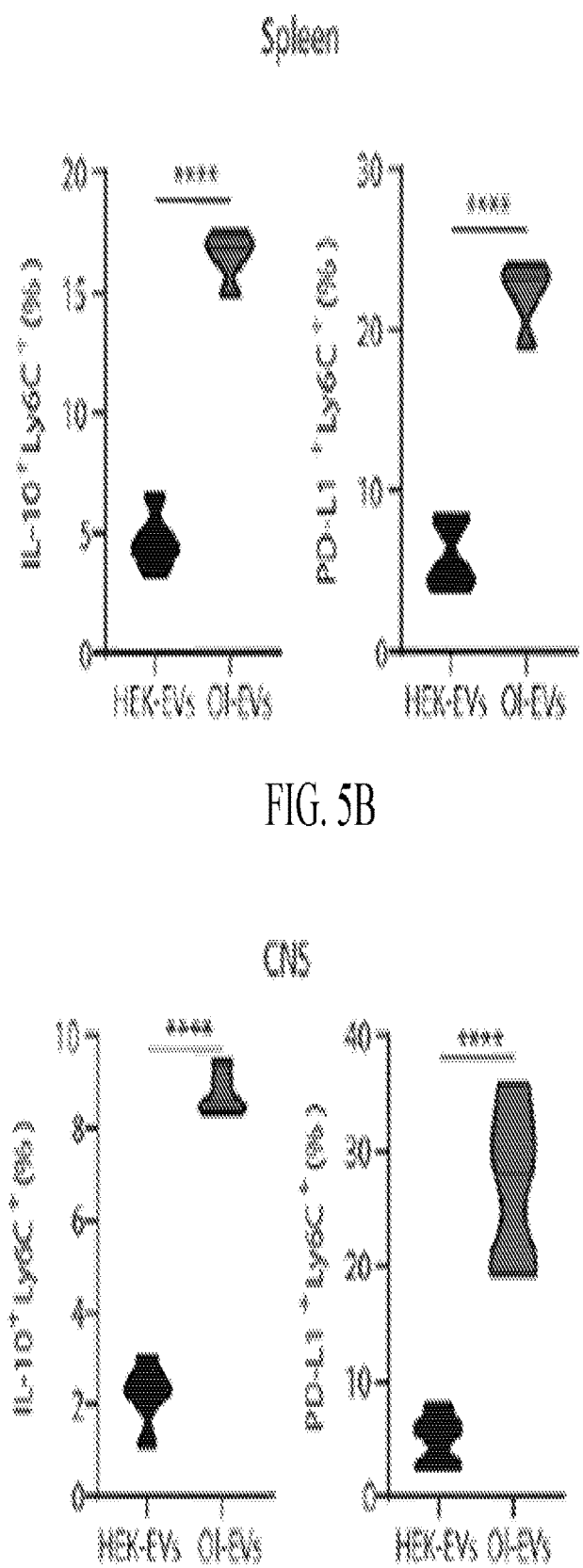
FIG. 5A
FIG. 5B
FIG. 5C

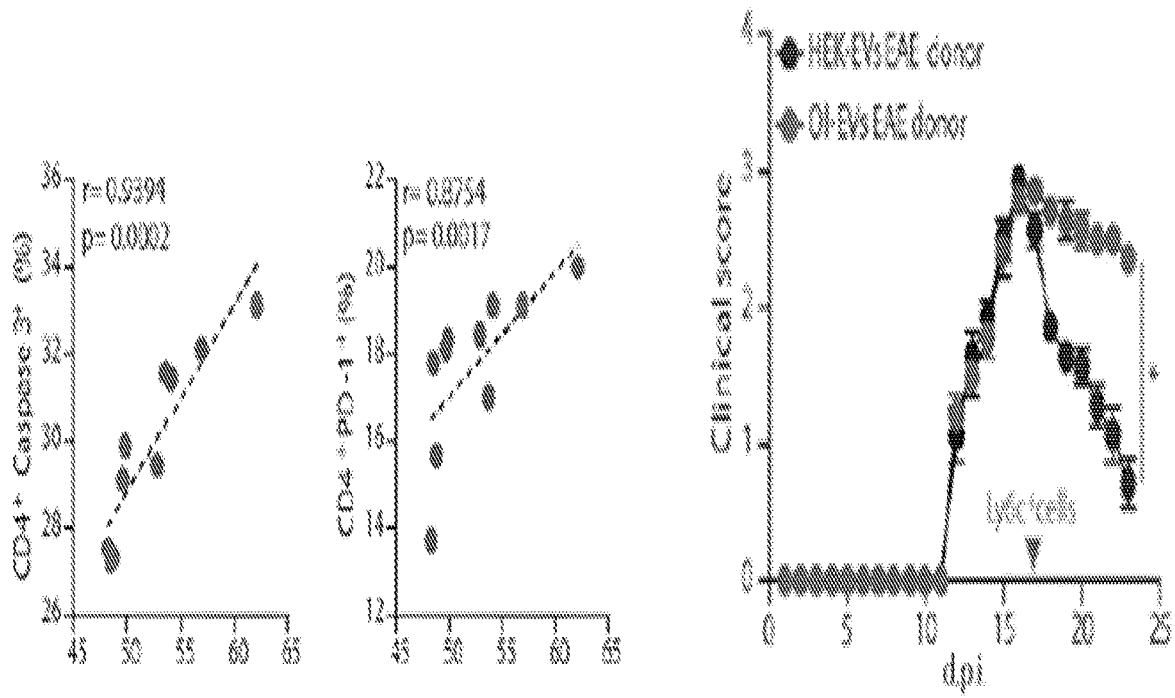
FIG. 5I
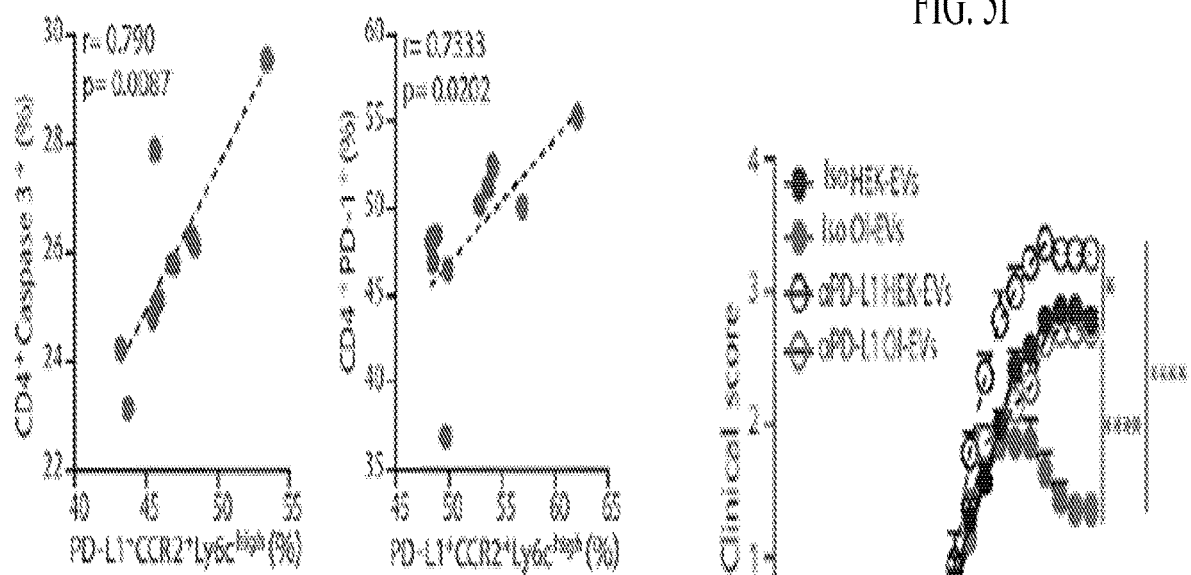
FIG. 5H
FIG. 5J

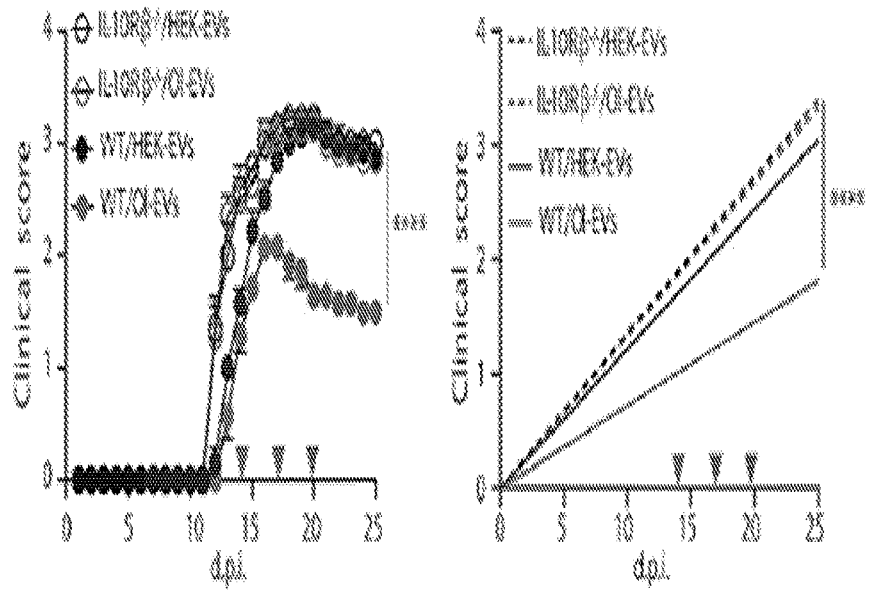
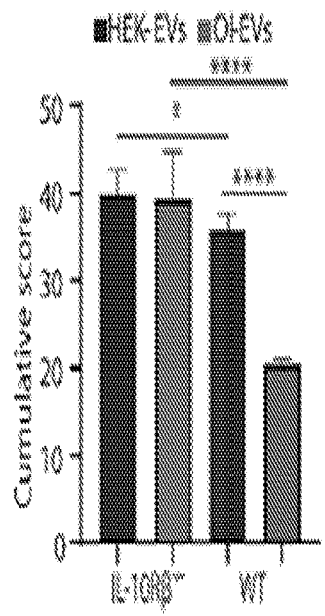
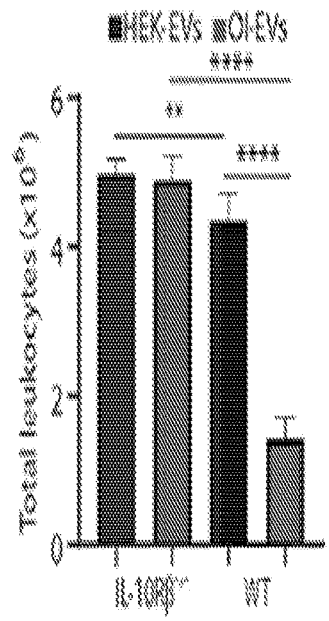
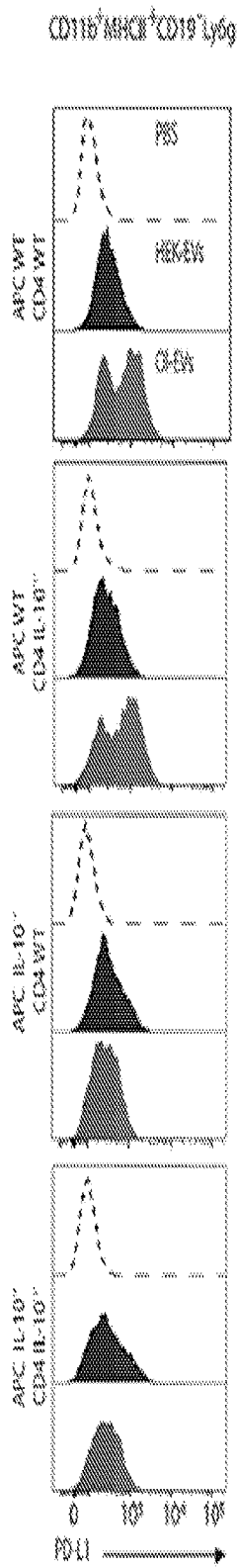
FIG. 6A
FIG. 6B
FIG. 6C
FIG. 6D

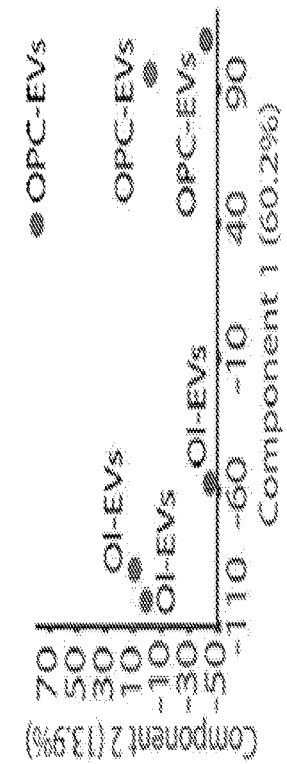
FIG. 7A
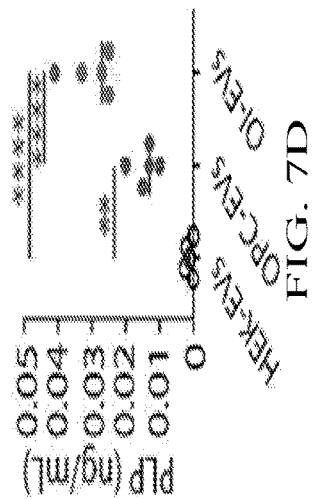
FIG. 7B
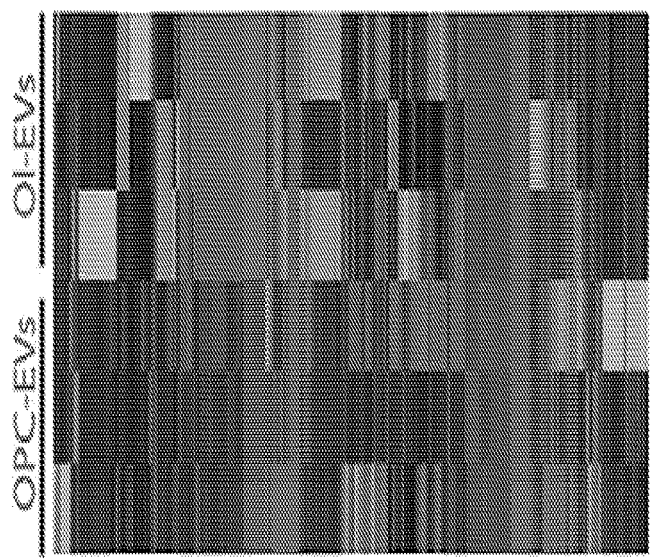
FIG. 7C
FIG. 7D

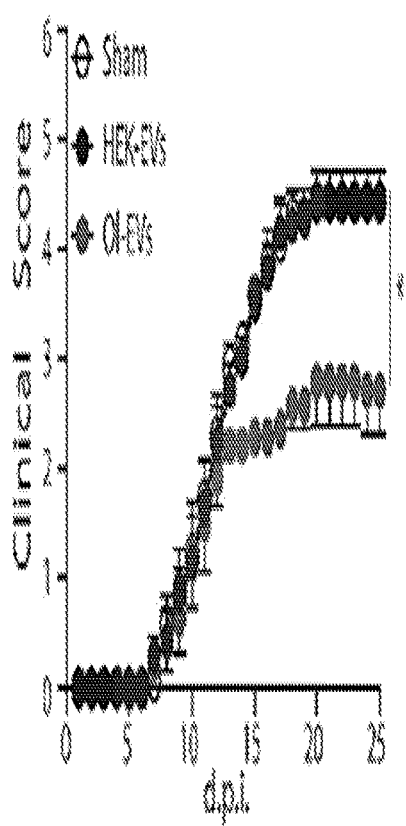
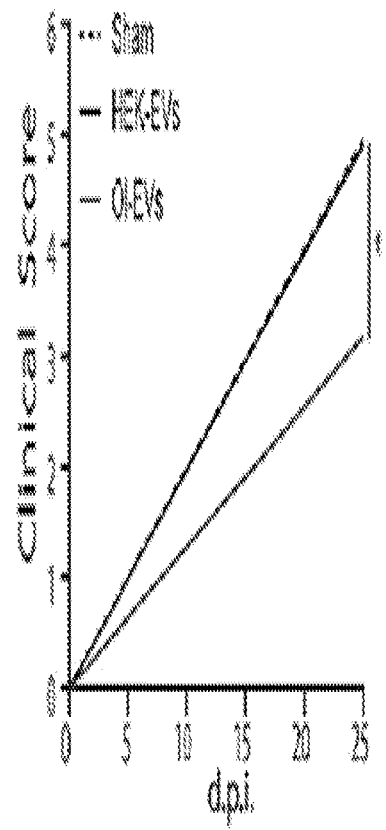
FIG. 9A
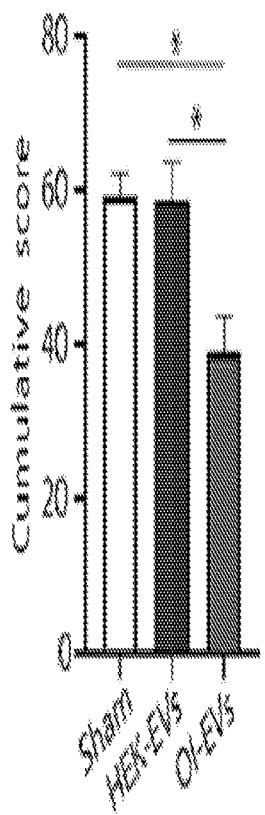
FIG. 9B

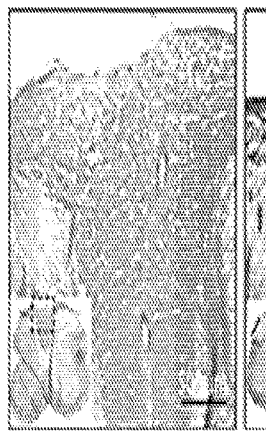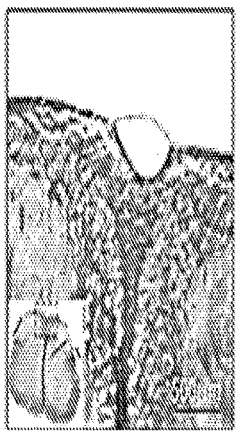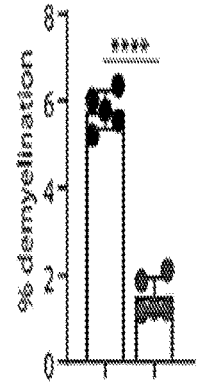
FIG. 10C
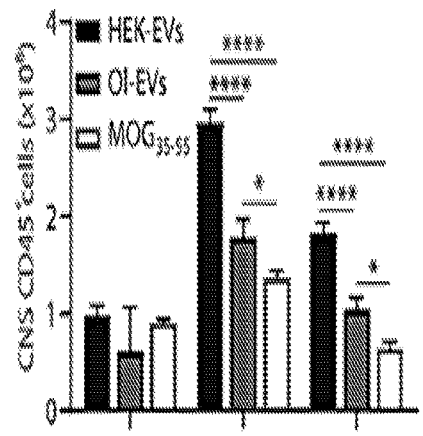
FIG. 10E
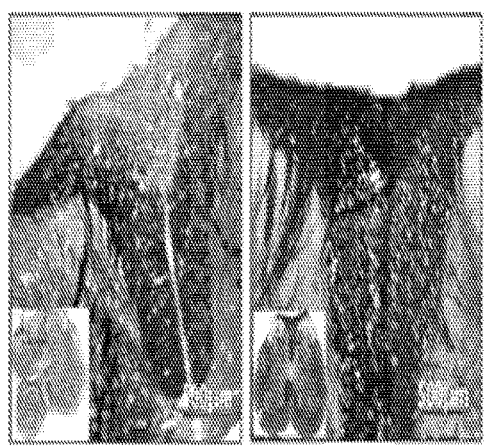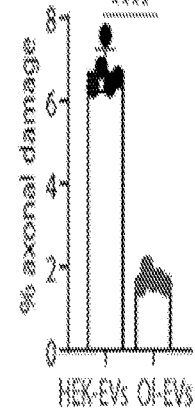
FIG. 10D
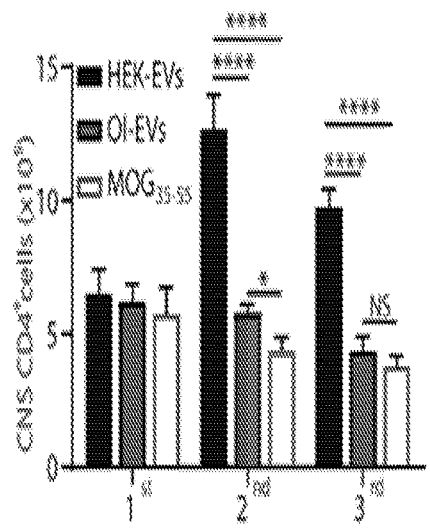
FIG. 10F

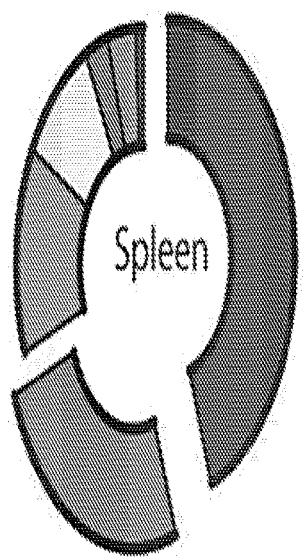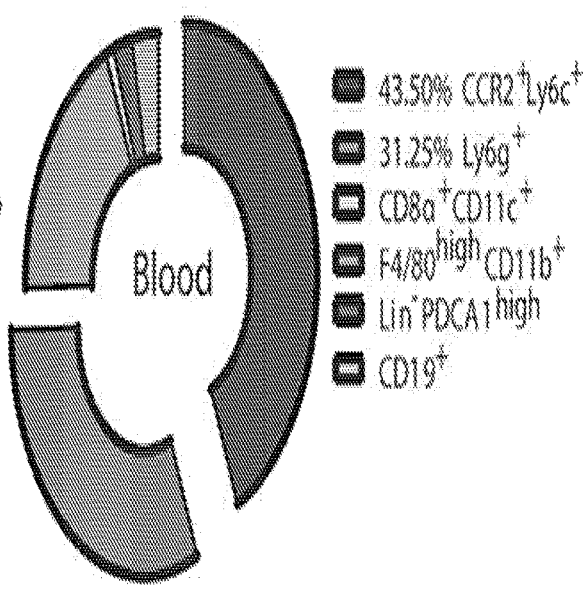
FIG. 15C                    FIG. 15D

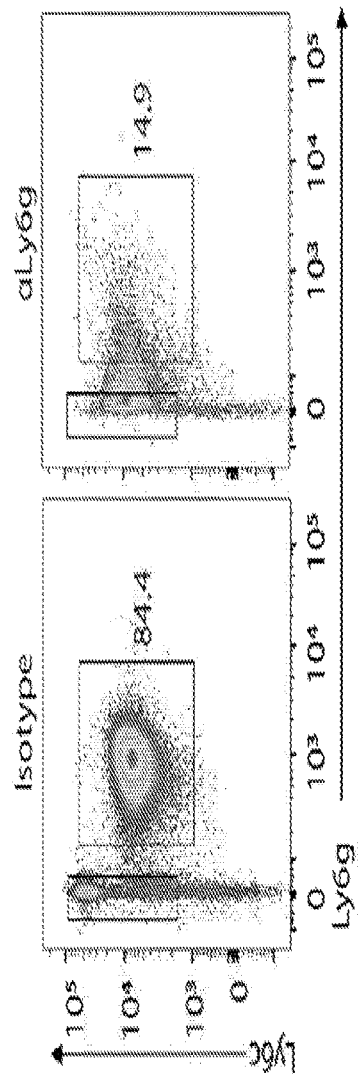
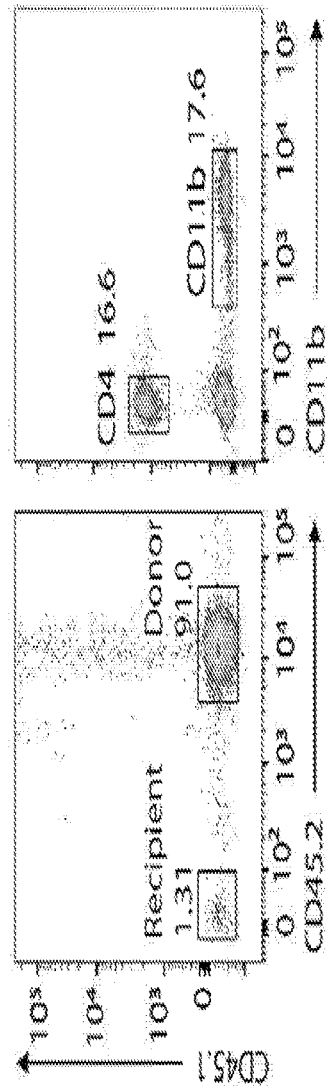
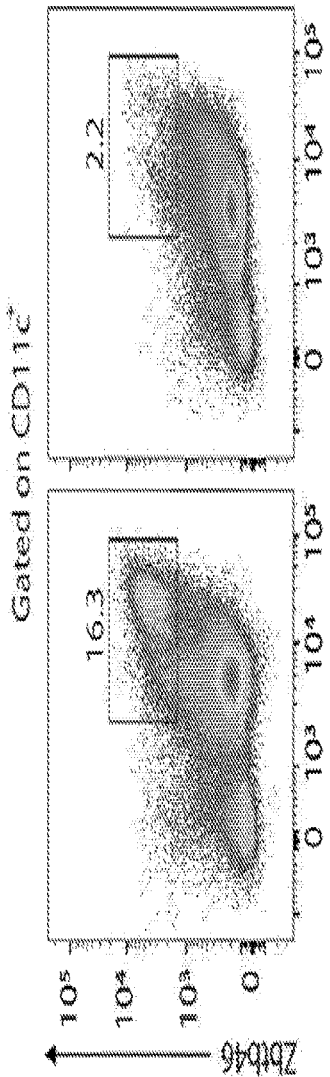

```
                             SEQUENCE LISTING

<160> NUMBER OF SEQ ID NOS: 8

<210> SEQ ID NO 1
<211> LENGTH: 36
<212> TYPE: DNA
<213> ORGANISM: Artificial Sequence
<220> FEATURE:
<223> OTHER INFORMATION: Forward primer - Cre gene

<400> SEQUENCE: 1
tactagtggc gcgccaccat gcccaagaag aagagg                                36

<210> SEQ ID NO 2
<211> LENGTH: 26
<212> TYPE: DNA
<213> ORGANISM: Artificial Sequence
<220> FEATURE:
<223> OTHER INFORMATION: Reverse primer - Cre gene

<400> SEQUENCE: 2
ggatccagcg taatctggaa catcgt                                           26

<210> SEQ ID NO 3
<211> LENGTH: 24
<212> TYPE: DNA
<213> ORGANISM: Artificial Sequence
<220> FEATURE:
<223> OTHER INFORMATION: mMOG sgRNA1 forward

<400> SEQUENCE: 3
caccgagcaa gcacctgaat accg                                             24

<210> SEQ ID NO 4
<211> LENGTH: 24
<212> TYPE: DNA
<213> ORGANISM: Artificial Sequence
<220> FEATURE:
<223> OTHER INFORMATION: mMOG sgRNA1 reverse

<400> SEQUENCE: 4
aaaccggtat tcaggtgctt gctc                                             24

<210> SEQ ID NO 5
<211> LENGTH: 25
<212> TYPE: DNA
<213> ORGANISM: Artificial Sequence
<220> FEATURE:
<223> OTHER INFORMATION: mMOG sgRNA2 forward

<400> SEQUENCE: 5
caccgtcacc tctaccgaaa tggca                                            25
```

```
<210> SEQ ID NO 6
<211> LENGTH: 25
<212> TYPE: DNA
<213> ORGANISM: Artificial Sequence
<220> FEATURE:
<223> OTHER INFORMATION: mMOG sgRNA2 reverse

<400> SEQUENCE: 6
aaactgccat tcggtagag gtgac                                          25

<210> SEQ ID NO 7
<211> LENGTH: 20
<212> TYPE: DNA
<213> ORGANISM: Artificial Sequence
<220> FEATURE:
<223> OTHER INFORMATION: mMOG DP forward

<400> SEQUENCE: 7
tcccactctt gtgtcttgga                                               20

<210> SEQ ID NO 8
<211> LENGTH: 20
<212> TYPE: DNA
<213> ORGANISM: Artificial Sequence
<220> FEATURE:
<223> OTHER INFORMATION: mMOG DP reverse

<400> SEQUENCE: 8
agcaggtgta gcctccttca                                               20
```

OLIGODENDROCYTE-DERIVED EXTRACELLULAR VESICLES FOR THERAPY OF MULTIPLE SCLEROSIS

CROSS-REFERENCE TO RELATED APPLICATIONS

The present application is a 35 U.S.C. § 371 national phase application from, and claims priority to, International Application No. PCT/US2020/035829, filed Jun. 3, 2020, which claims priority under 35 U.S.C. § 119(e) to U.S. Provisional Application No. 62/857,182, filed Jun. 4, 2019 and U.S. Provisional Application No. 62/953,257, filed Dec. 24, 2019, all of which applications are incorporated by reference herein in their entireties.

STATEMENT REGARDING FEDERALLY SPONSORED RESEARCH OR DEVELOPMENT

This invention was made with government support under Grant No. 5-RO1-AI106026-13 awarded by the National Institutes of Health (NIH). The government has certain rights in the invention.

BACKGROUND OF THE INVENTION

Multiple sclerosis (MS) is an autoimmune disease of the central nervous system (CNS), in which immune system attacks component(s) of CNS myelin produced by oligodendrocytes. Myelin contains multiple components, and it is not known which of them are targeted by autoimmune response in MS patients. The lack of knowledge on myelin component(s) targeted by immune system, the variability among patients, and likely changes in specificity of autoimmune response during disease course makes the development of antigen-specific therapy for MS difficult. So far, many antigen-specific therapies have been proposed; however, none has shown promising result in clinic. Therefore, there is a need in the art for a strategy for treating MS that does not require determination of the specific myelin components targeted by the immune system in multiple sclerosis. This disclosure addresses that need.

SUMMARY OF THE INVENTION

In one aspect, a method of treating and/or preventing multiple sclerosis (MS) in a subject in need thereof is provided, the method comprising administering to the subject an effective amount of an oligodendrocyte-derived extracellular vesicle (Ol-EVs). In some embodiments, the Ol-EVs comprise myelin antigens (Ags). In some embodiments, the myelin Ags comprise myelin basic protein (MBP), myelin oligodendrocyte glycoprotein (MOG), and/or myelin proteolipid protein (PLP). In some embodiments, the method is Ag-specific. In some embodiments, the administering induces immunosuppressive monocytes. In some other embodiments, the immunosuppressive monocytes express PD-L1. In some embodiments, the administering does not cause any deleterious or unwanted effect(s) on the immune system of the subject. In still other embodiments, the oligodendrocyte-derived extracellular vesicle is formulated in a pharmaceutical composition comprising at least one pharmaceutically acceptable carrier. In some embodiments, the pharmaceutical composition is administered intravenously, subcutaneously, intradermally, transdermally, orally or nasally. In some embodiments, the subject is a mammal. In some embodiments, the subject is human. In some embodiments, the MS is chronic MS or relapsing-remitting MS.

In another aspect, a pharmaceutical composition comprising an oligodendrocyte-derived extracellular vesicle (Ol-EVs) and at least one pharmaceutically acceptable carrier, is provided. In some embodiments, the Ol-EVs comprise myelin antigens (Ags). In some embodiments, the myelin Ags comprise myelin basic protein (MBP), myelin oligodendrocyte glycoprotein (MOG), and/or myelin proteolipid protein (PLP). In some other embodiments, the composition is formulated for intravenous, subcutaneous, intradermal, transdermal, oral or nasal administration.

BRIEF DESCRIPTION OF THE DRAWINGS

The following detailed description of selected embodiments of the invention will be better understood when read in conjunction with the appended drawings. For the purpose of illustrating the invention, selected embodiments are shown in the drawings. It should be understood, however, that the invention is not limited to the precise arrangements and instrumentalities of the embodiments shown in the drawings.

(FIG. 1A) Representative immunofluorescence (IF) of mature Ol stained for MBP (green), MOG (red), and nuclei (blue). Scale bar 20 μm, magnification 60×. (FIG. 1B) Cryo-electron microscopy of purified Ol-EVs; scale bar 200 nm. (FIG. 1C) Heat map of significantly enriched proteins associated with EVs, according to the MISEV 2018 guideline, from quantitative mass spectrometry analysis. Expression is based on Z-scored label-free quantification (LFQ) and expressed as Log 2. The mean of three replicates for each condition is shown. (FIG. 1D) Relevant myelin protein content of Ol-EVs determined by mass spectrometry. The mean of three replicates for each condition is shown. Values are normalized to OPC-derived EVs and shown as Log 2. (FIG. 1E) MBP, MOG, and PLP quantification by ELISA (mean±SEM) in Ol-EVs pellet, n=10/group. (FIG. 1F) Survival curves of naive C57BL/6 mice i.v. treated with Ol-EVs or HEK-EVs, n=15/group. (FIG. 1G) Anti-MOG Ig concentrations in serum of naïve C57BL/6 mice injected with Ol-EVs (red dots) were determined by ELISA (mean±SEM). Control sera were collected from naïve mice that were not injected (sham, open circles), or from EAE mice immunized with $rMOG_{1-125}$ ($Ctrl^+$, black dots), n≥5/group. All experiments were conducted at least twice. (E and G) ****$p<0.00001$ by one-way ANOVA with Bonferroni's with post hoc test.

(FIGS. 2A-2F) Approximately $10^{10}$ syngeneic Ol-EVs or HEK-EVs were i.v. injected (red arrows) in C57BL/6, B10.PL, or SJL/J mice, immunized for EAE induction with $MOG_{35-55}$, $MBP_{Ac1-11}$, or $PLP_{139-151}$, respectively. Ol-EVs treatment was prophylactic (FIGS. 2A-2C; 1, 4, and 7 d.p.i. in C57BL/6 and B10.PL EAE mice; or −7 and −2 d.p.i. in SJL/J EAE mice), or therapeutic (FIGS. 2D-2F; 11, 14, and 17 d.p.i. in C57BL/6 and B10.PL EAE mice; or 24, 27, and 30 d.p.i. in SJL/J EAE mice). The peptides $MOG_{35-55}$ (200 μg/mouse), $MBP_{Ac1-11}$ (400 μg/mouse), and $PLP_{139-151}$ (100 μg/mouse) were i.v. injected in parallel for comparison. The dose of each peptide/i.v. is the same as dose used in immunization for EAE induction. These experiments were done at least twice and had similar outcomes (n=10 mice/ group each experiment). Symbols depict daily mean S.E.M. Data were analyzed by two-way ANOVA with Bonferroni's multiple comparison; *p<0.01; p<0.001; *p<0.0005 **p<0.00001. (FIG. 2G) Survival (%) of EAE mice treated as described in (D-F), n=15-30 mice/group. Data were analyzed by Gehan-Breslow-Wilcoxon test *p<0.0001.

FIGS. 3A-3K illustrate that myelin Ag from Ol-EVs is presented to T cells in vivo, and EAE suppression by Ol-EVs is myelin Ag-dependent. (FIG. 3A) Time course (mean SEM) of circulating blood CD4+ T cells at 6, 24, and 48 h after treating MOG-specific TCR transgenic mice (2D2) i.v. with Ol-EVs, or control HEK-EVs, or $MOG_{35-55}$ peptide (100 μg), (n=5/group each experiment). (FIG. 3B and FIG. 3C) Caspase 3 expression (mean±SEM) in circulating blood CD4+ T cells from 2D2 mice injected with Ol-EVs. (FIGS. 3D-3I) $5 \times 10^6$ 2D2 or OT-II naïve CD4+ T cells labeled with CFSE were injected into CD45.1+ recipient mice. After 48 h, mice were immunized s.c. with an emulsion containing $MOG_{35-55}$+CFA, or $OVA_{323-339}$+CFA, or injected i.v. with $10^{10}$ HEK-EVs, or Ol-EVs. 72 h later, spleens were collected and $CD45.2^+$ $CD4^+$ T cells (2D2 and OT-II) analyzed by flow cytometry. (FIGS. 3D, 3F) Cytokine production (IFN-γ, IL-17A), PD-1 expression (FIGS. 3E, 3I) and proliferation (CFSE dilution, FIG. 3G and FIG. 3H) by 2D2 and OT-II cells (mean±SEM). These experiments were conducted twice with a similar outcome (n=5 mice/group each experiment). Data in (FIGS. 3A, 3F, 3H, and 3I) were analyzed by two-way ANOVA with Bonferroni's post hoc test; *p<0.05; p<0.001; *p<0.0005; **p<0.00001. Unpaired t-test (for OT-II CD4+ T cell groups); *p<0.0001; p<0.00001. (FIG. 3J) Approximately 1010 Ol-EVs from MOG-deficient Ols, control Ols, HEK-EVs, or PBS (sham) were i.v. injected into $MOG_{35-55}$-immunized C57BL/6 mice. Injections were given on d.p.i. indicated by red arrows in the figure. (FIG. 3K) Ol-EVs from either WT ($MBP^{+/+}$) or $MBP^{-/-}$ (shiverer mice) B10.PL Ols were i.v. injected into B10.PL EAE mice immunized with $MBP_{Ac(1-11)}$. Control mice were injected with HEK-EVs, or PBS (sham). These experiments were conducted twice with similar outcomes (n=5-7 mice/group each experiment). Symbols depict daily mean±S.E.M. Data were analyzed by two-way ANOVA with Bonferroni's multiple comparison; ****p<0.00001.

FIGS. 4A-4F illustrate that Ol-EVs are uptaken by monocytes, neutrophils and cDCs, but later two are dispensable for EAE suppression by Ol-EVs. (FIG. 4A, FIG. 4B) Gating strategy identifying Td-tomato+ CD11b+ neutrophils ($Ly6g^+$ $Ly6c^+$) and monocytes ($Ly6g^-$ $Ly6c^+$) from the CNS and spleen. These experiments were done twice with similar outcomes (n=5 mice/group in each experiment). (FIGS. 4C, 4D) Transgenic C57BL/6 Rosa26.stop.Td-tomato mice immunized with $MOG_{35-55}$ were i.v. injected at disease onset with approximately $10^{10}$ Ol-EVs containing Cre recombinase, or HEK-EVs also containing Cre. Two days later, spleen and CNS cells were analyzed by flow cytometry. Representative histogram of CD4+ T cells, B cells (CD19+), microglia ($CD45^{low}Ly6c^-CD11b^+$), neutrophils ($Ly6g^+$), and monocytes ($Ly6c^+$) expressing Td-tomato in the spleen (FIG. 4C) and CNS (FIG. 4D). The distribution of Td-tomato+ cells from mice injected with Cre+ HEK-EVs and Cre+ Ol-EVs (shown) was similar. (FIG. 4E) C57BL/6 EAE mice were depleted of neutrophils by i.p. injections of anti-Ly6g Ab (clone 1A8, 200 μg/mouse/injection) at disease onset (13 and 16 d.p.i.). Control mice were injected with isotype control Ab. Ol-EVs or HEK-EVs were i.v. injected 14, 17, and 20 d.p.i. (red arrows). Symbols depict daily mean S.E.M. (FIG. 4F) CD45.1+ mice were irradiated and transplanted with Zbtb46 iDTR or CD45.1+ bone marrow and immunized with $MOG_{35-55}$. cDCs depletion ($Zbtb46^+MHCII^+CD11c^+$) was accomplished by i.p. injecting DTX (20 ng/gram) every third day after EAE onset. Ol-EVs or HEK-EVs were i.v. injected at 13, 15, and 18 d.p.i. (red arrows). Symbols depict daily mean S.E.M. All EAE experiments were conducted at least twice with similar outcomes (n=5-7 mice/group). EAE experiments were analyzed by two-way ANOVA with Bonferroni's multiple comparison; ****p<0.00001.

FIGS. 5A-5J illustrate that Ol-EVs induce immunosuppressive moDCs. (FIG. 5A) Splenic and CNS monocytes ($CD45^+CD11b^+Ly6c^{high}CCR2^+Ly6g^-$ Td-tomato+) were sorted from Rosa26.stop.Td-tomato EAE mice 2 days post Cre+HEK-EVs or Cre+Ol-EVs injection, and gene expression analysis was performed by qPCR. Values are normalized relative to monocytes of Cre+HEK-EVs-treated mice and shown as Log 2. Data were analyzed using unpaired t-test; not significant (NS); *p<0.05; p<0.001; *p<0.0005; **p<0.00001. (FIGS. 5B, 5C) Percentages (mean±SEM) of splenic and CNS IL-10+ and PD-L1+ monocytes from EAE mice that received HEK- or Ol-EVs (n=5 mice/group each experiment). Data were analyzed using unpaired t-test; p<0.00001. (FIGS. 5D-5G) Flow cytometry analysis for caspase-3 and PD-1 (mean±SEM) in splenic and CNS CD4+ T cells of EAE mice injected with HEK- or Ol-EVs, three times, starting at disease onset. Data were analyzed using unpaired t-test; p<0.001; ***p<0.0005. These experiments were conducted twice with similar outcomes (n=5 mice/group each experiment). (FIG. 5H) Spearman's r correlation analysis of splenic and CNS monocytes ($PD-L1^+CCR2^+Ly6c^+$) with caspase-3+ and PD-1+ CD4 T cells (n=10). (FIG. 5I) C57BL/6 EAE mice were transplanted at the peak of disease with $2\times10^6$ sorted Td-tomato+ moDCs (red arrow) from the CNS of EAE mice treated with Ol-EVs (red), or HEK-EVs (black). (FIG. 5J) C57BL/6 EAE mice were i.p. injected with blocking anti-PD-L1 Ab (200 μg/mouse/injection; clone 10F.9G2), or isotype control Ab, on 12 and 15 d.p.i. HEK- or Ol-EVs were i.v. injected on 13, 16, and 19 d.p.i. (red arrows). Symbols depict daily mean S.E.M. All EAE experiments were conducted at least twice with similar outcomes (n=7 mice/group). EAE experiments were analyzed in (I) by Mann-Whitney test; *p<0.01. In (J) by two-way ANOVA with Bonferroni's multiple comparison; *p<0.01 and ****p<0.00001.

FIGS. 6A-6G illustrate that Ol-EVs induce PD-L1 in an IL-10-dependent manner. (FIG. 6A) Clinical course of WT and $IL-10Rb^{-/-}$ EAE mice injected three times (red arrows) with approximately $10^{10}$ Ol-EVs or HEK-EVs. EAE experiments were conducted at least twice with similar outcomes (n=7 mice/group). Data were analyzed by two-way ANOVA with Bonferroni's multiple comparison; ****p<0.00001. (FIG. 6B) Cumulative score of disease severity (mean±SEM). (C) Mice were sacrificed at day 25 p.i. and numbers of CD45+ leukocytes obtained from the CNS determined by flow cytometry and hemocytometer. Data are expressed as mean values±S.E.M from n=7/group each experiment. (FIGS. 6D-6F) APCs and total CD4+ T cells were isolated from the spleen and lymph nodes of $MOG_{35-55}$-immunized WT and IL-10-/- mice at 10 d.p.i. Mismatched cell co-cultures (WT APC+WT CD4+; WT APC+$IL-10^{-/-}$ CD4; $IL-10^{-/-}$ APC+WT CD4+; $IL-10^{-/-}$ APC+$IL-10^{-/-}$ CD4+) were treated for three days with Ol-EVs, HEK-EVs, or PBS. Flow cytometric analysis for PD-L1 expression in monocytes/dendritic cells (CD11b+

MHCII⁺CD19⁻Ly6g⁻) (FIGS. 6D, 6F), and for PD-1 in CD4⁺ T cells (FIGS. 6E, 6G). These experiments were conducted twice with similar outcomes. Data are expressed as mean values±S.E.M from n=5/group each experiment. (FIGS. 6B, 6C, 6F, and 6G) $*p<0.05$; $p<0.01$; $*p<0.0005$; $****p<0.00001$ by two-way ANOVA with Bonferroni's post hoc test.

FIGS. 7A-7D illustrate that hOLs release EVs containing multiple myelin proteins. (FIG. 7A) Cryo-electron microscopy of purified hOl-EVs; scale bar 200 nm. (FIG. 7B) Principal component analysis (PCA) of mass spectrometry data showing relatedness of OPC-EVs and Ol-EVs. (FIG. 7C) Heat map showing expression quantity of proteins present in OPC and Ol-EVs. (FIG. 7D) Concentrations (mean±SEM) of myelin proteins (MBP, MOG, PLP) in HEK-, hOPC-, and hOl-EVs pellets measured by ELISA. $p<0.001$; $**p<0.00001$ by one-way ANOVA with Bonferroni's post hoc test.

(FIG. 8A) Flow cytometry analyses for CNPase in OPCs and mature Ols, isolated from the CNS of 5-day-old mouse pups. (FIG. 8B) Gene expression analysis, by qPCR, of pdgfrα, ng2, sox10, olig2, olig4, mobp, mag, plp, mog, cnp, mbp, and galc mRNAs in OPCs and Ols. Values are normalized relative to those in OPCs and shown as Log 2. These experiments were conducted twice with similar outcomes (n=3/group each experiment). Data were analyzed using unpaired t-test; NS (not significant); $*p<0.05$; $p<0.001$; $*p<0.0005$; $**p<0.00001$. (FIG. 8C) Representative immunofluorescence (IF) of mature Ols stained for CNPase (green) and nuclei (dapi). Scale bar 20 µm, magnification 60×. (FIGS. 8D-8E) Percentage (mean±SEM) of MBP⁺, MOG⁺, and PLP⁺ CNPase⁺ Ols determined by flow cytometry after three weeks of differentiation in culture. These experiments were conducted twice with similar outcomes (n=5/group each experiment). Data were analyzed using unpaired t-test; $**p<0.00001$. (FIG. 8F) Protocol used for EVs purification from OPCs, Ols, and HEK cell culture supernatants. (FIG. 8G) Size profile of Ol-EVs determined by NTA. (FIG. 8H) Western blot for ALIX, FLOT-1, TSG101, ANAX1, and GAPDH in Ol-EVs pellet.

FIGS. 9A-9B illustrate that Ol-EV/i.v. stop EAE progression in adoptive EAE mice. WT C57BL/6 mice were transplanted with $1\times10^7$ Th17 cells derived from $MOG_{35-55}$-immunized donor mice and injected with PTX at days 0 and 2 post cell transplantation. Approximately $10^{10}$ of Ol-EVs (prepared from C57BL/6 Ols) or HEK-EVs were i.v injected at disease onset three times once every third day (FIG. 9A). Symbols depict daily mean S.E.M. EAE experiments were conducted at least twice with similar outcomes (n=7 mice/group). EAE experiments were analyzed by two-way ANOVA with Bonferroni's multiple comparison; $*p<0.05$. (FIG. 9B) Cumulative score (mean±SEM) of adoptive EAE shown in (A). Data are expressed as daily mean values±S.E.M from n=7/group each experiment $**p<0.05$; by one-way ANOVA with Bonferroni's post hoc test.

FIGS. 10A-10H illustrate that Ol-EVs protect mice from CNS tissue damage in EAE. (FIG. 10A, FIG. 10B) Approximately $10^{10}$ of Ol-EVs (prepared from C57BL/6 Ols) or HEK-EVs were s.c. injected (red arrows) in mice immunized with $MOG_{35-55}$ for EAE induction. Ol-EVs treatment was given prophylactically (FIG. 10A), 1, 4, and 7 d.p.i., or therapeutically (FIG. 10B), 13, 16, and 19 d.p.i. These experiments were conducted twice with similar outcomes (n=5 mice/group each experiment). Symbols depict daily mean±S.E.M. Data were analyzed by two-way ANOVA with Bonferroni's multiple comparison. (FIG. 10C) Kluber Barrera, and (FIG. 10D) silver staining of spinal cord sections were used for analyses of demyelination and axonal loss. Demyelinated areas and axonal loss were quantified on an average in 5 cross-sections of spinal cord/mouse taken at 8 different levels and expressed as percentage of damaged area (mean±SEM). Unpaired two-tailed t-test was used for analyses (n=5/group); $****p<0.00001$. (FIGS. 10E, 10F) Numbers of total CNS CD45⁺ and CD4⁺ cells, from mice with EAE immunized with $MOG_{35-55}$ and i.v. injected (three injections) with HEK-EVs, or Ol-EVs, or $MOG_{35-55}$, (n=5/group), as determined by flow cytometry. (FIGS. 10G, 10H) Proliferation assay of splenocytes isolated from mice with EAE i.v. injected with HEK-EVs, or Ol-EVs, or peptide (auto-Ag), and re-challenged with auto-Ag (20 µg/mL) (n=5/group each experiment). (FIGS. 10E-10H) Data are expressed as mean values±S.E.M. $*p<0.01$; $p<0.001$; $*p<0.0005$; $****p<0.00001$ by one-way ANOVA with Bonferroni's post hoc test.

(FIG. 11A) Time course of splenic CD4⁺ T cell content 6, 24, and 48 h after MOG-specific TCR transgenic mice (2D2) were treated i.v. with Ol-EVs, HEK-EVs, or $MOG_{35-55}$ peptide (100 µg), (n=5/group each experiment, conducted twice). (FIGS. 11B and 11C) Caspase 3 expression (mean S.E.M) in splenic CD4+ T cells of 2D2 mice injected with Ol-EVs, HEK-EVs, or $MOG_{35-55}$ peptide (100 µg), (n=5/group each experiment, in total twice) 6, 24, and 48 h after the treatment.

(FIG. 12A) Crispr/Cas9 plasmid for knockout of MOG in Rosa26-LSL-Cas9 Ols. (FIGS. 12B, 12C) Representative images of Cas9⁺GFP⁺ OPCs transduced with a lentivirus expressing Cre and scrambled (control) gRNA (FIG. 12B), or Cre and MOG-specific gRNA (FIG. 12C) and selected by Puromycin (2 µg/mL). Scale bar 200 µm. (FIG. 12D) T7 endonuclease digested PCR products from Cas9⁺ Ols transduced with a lentivirus expressing Cre and MOG-specific gRNA. Knockout of MOG gene (in PCR product) was compared with positive control (Cas9 cell line transduced with same lentivirus). (FIG. 12E) MOG quantification, by ELISA, in scramble gRNA- and MOG gRNA-transduced Ols, and EVs derived from them. Data are expressed as mean values±S.E.M. from 3 independent experiments. $****p<0.00001$ by one-way ANOVA with Bonferroni's post hoc test.

(FIG. 13B) Representative images of MOG⁺ HEK cells (red) transduced with the lentivirus and selected with Puromycin. Cells were stained with primary αMOG MAb, and secondary goat αmouse-alexafluor546 Ab. Scale bar 10 µm and magnification 20×. (FIG. 13C) MOG quantification (mean±S.E.M), by ELISA, in HEK, MOG⁺ HEK, and Ol-derived EVs (n=5/group). (FIG. 13D) Approximately $10^{10}$ of Ol-EVs (prepared from C57BL/6 Ols), HEK-EVs, or MOG+HEK-EVs were i.v. injected at disease onset three times in $MOG_{3555}$-immunized mice with EAE (n=7 mice/group). Symbols depict daily mean S.E.M. (FIG. 13E) Cumulative disease score for EAE shown in (D). Symbols depict mean S.E.M. EAE experiments were analyzed by two-way ANOVA with Bonferroni's multiple comparison; $*p<0.0005$. (FIG. 13F) Mice were sacrificed at day 25 p.i. and numbers of CD45⁺ leukocytes were determined by flow cytometry. (FIG. 13G) Flow cytometry plot showing lymphoid (1) and infiltrating myeloid (2) cells from the CNS of mice with EAE shown in (D). (FIGS. 13H, 13I) Intensity (mean S.E.M) of PD-1 and Annexin V staining in CNS CD4+ T cells from mice with EAE injected with Ol-EVs, HEK-EVs, or MOG+HEK-EVs, as determined by flow cytometry. (FIGS. 13J, 13K) Percentage and absolute numbers (mean S.E.M) of CD25+ Foxp3+ Tregs cells from the CNS of mice with EAE shown in (D). (FIGS. 13L, 13M) Intensity (mean±S.E.M) of IL-10 and PD-L1 staining in monocytes from the CNS of mice with EAE shown in (D). Data in FIGS. 13E, 13F, 13I, and 13M (n=5-7/group are expressed as mean values±S.E.M. p<0.001; ****p<0.00001 by one-way ANOVA with Bonferroni's post hoc test.

FIGS. 15A-15D illustrate cellular distribution of Ol-EVs/ i.v. injected into naïve R26.stop.Td-tomato reporter mice. (FIG. 15A) Approximately $10^{10}$ of Cre+ or Cre- Ol-EVs were injected i.v. into naïve ROSA26-stop-Td-tomato reporter mice. (FIG. 15B) Flow cytometric analysis of Td-tomato+ cells in the blood, CNS, lymph nodes, and spleen at 6, 24, and 48 h after injection of the Ol-EVs. (FIGS. 15C, 15D) Percentage of Td-tomato+ cells in the spleen and blood 24 h after injection of Ol-EVs (n=3/group). Experiments were conducted twice.

FIGS. 16A-16F illustrate Ly6g+ and Zbtb46+ cells depletion. (FIG. 16A, FIG. 16B) Flow cytometry analysis of depletion of neutrophils with anti-Ly6g MAb or isotype Ab, in blood of mice 18 days after immunization with $MOG_{35-55}$ for EAE induction. (FIGS. 16C, 16D) Percentage of BM donor cells (CD45.2+ CD4+ and CD11b+) in blood of BM chimera mice (CD45.1+ recipient mice). (FIGS. 16E, 16F) Depletion of splenic CD11c+Zbtb46+ classic DCs with DTX (20 ng/g) in BM chimera Zbtb46-DTR→CD45.1+ mice with EAE.

(FIG. 18A, FIG. 18B) Representative confocal microscopy images of spinal cord sections from mice with EAE treated with HEK-EVs or Ol-EVs that were stained for CD11b (red) and arginase 1 (green). Scale bar 100 µm; magnification 20× and 40×. (FIG. 18C) C57BL/6 mice with EAE were i.p. injected with blocking anti-PD-L2 Ab (200 µg/injection; clone TY25), or isotype control Ab, on 11 and 14 d.p.i. HEK-EVs or Ol-EVs were i.v. injected on 13, 16, and 19 d.p.i. (FIG. 18D) $RAG^{-/-}$ mice were reconstituted with $5\times10^6$ total CD4+ T cells from WT or $PD-1^{-/-}$ mice. 72 h post reconstitution, recipient mice were immunized for EAE induction and Ol-EVs or HEK-EVs were given i.v. three times, starting from EAE onset. All EAE experiments were conducted twice with similar outcomes (n=5-7 mice/group). Symbols depict daily mean S.E.M. EAE experiments were analyzed by two-way ANOVA with Bonferroni's multiple comparison; *p<0.0005; **p<0.00001.

DETAILED DESCRIPTION

Figure 1A:
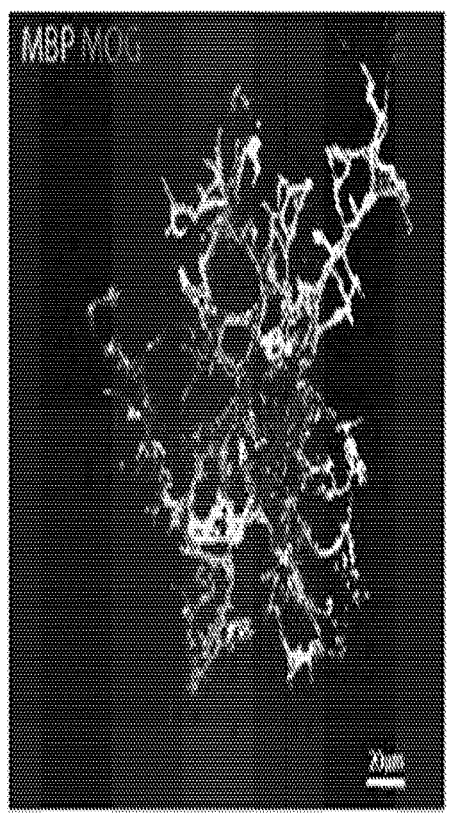
FIGS. 1A-1G illustrate that mature oligodendrocytes (Ols) release extracellular vesicles (EVs) containing myelin proteins.

Autoimmune diseases such as multiple sclerosis (MS) develop because of failed peripheral immune tolerance for a specific self-antigen (Ag). Numerous approaches for Ag-specific suppression of autoimmune neuroinflammation have been proven in experimental autoimmune encephalomyelitis (EAE), an animal model of MS. One such approach is intravenous (i.v.) tolerance induction by injecting a myelin Ag used for EAE induction. However, the translation of this and similar experimental strategies into therapy for MS has been hampered by uncertainty regarding relevant myelin Ags in MS patients. To address this issue, a novel therapeutic strategy was developed that relies on oligodendrocyte (Ol)-derived extracellular vesicles (Ol-EVs), which naturally contain multiple myelin Ags. Ol-EVs injected i.v. suppressed disease in a myelin Ag-dependent manner, both prophylactically and therapeutically, in several EAE models. The treatment was safe and restored immune tolerance by inducing immunosuppressive monocytes and apoptosis of autoreactive encephalitogenic CD4+ T cells. Finally, the results described herein show that human Ols also release EVs containing most relevant myelin Ags, providing a basis for their use in MS therapy. These findings introduce a novel approach for suppressing central nervous system autoimmunity in a myelin Ag-specific manner.

Definitions

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, selected materials and methods are described herein. In describing and claiming the present invention, the following terminology will be used.

It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of 20% or ±10%, more preferably ±5%, even more preferably ±1%, and still more preferably ±0.1% from the specified value, as such variations are appropriate to perform the disclosed methods.

A disease or disorder is "alleviated" if the severity of a symptom of the disease or disorder, the frequency with which such a symptom is experienced by a patient, or both, is reduced.

As used herein, the term "composition" or "pharmaceutical composition" refers to a mixture of at least one compound useful within the invention with a pharmaceutically acceptable carrier. The pharmaceutical composition facilitates administration of the compound to a patient or subject. Multiple techniques of administering a compound exist in the art including, but not limited to, intravenous, subcutaneous, oral, aerosol, parenteral, ophthalmic, pulmonary and topical administration.

An "effective amount" or "therapeutically effective amount" of a compound is that amount of compound that is sufficient to provide a beneficial effect to the subject to which the compound is administered. An "effective amount" of a delivery vehicle is that amount sufficient to effectively bind or deliver a compound.

As used herein, "extracellular vesicles" means protein-lipid membrane-enclosed particles secreted by almost all cells and containing proteins, lipids, DNA, and different RNAs. The term extracellular vesicles encompass both exosomes (30 nm-100 nm) and microvesicles (100 nm-1 µm).

As used herein, "oligodendrocyte-derived extracellular vesicles" refer to extracellular vesicles generated by, or isolated from oligodendrocytes.

The terms "patient," "subject," "individual," and the like are used interchangeably herein, and refer to any animal, or cells thereof whether in vitro or in situ, amenable to the methods described herein. In certain non-limiting embodiments the subject is a non-human mammal. Non-human mammals include, for example, livestock and pets, such as sheep, cattle, pigs, cats, dogs, mice, and rats. In certain non-limiting embodiments, the patient, subject or individual is a human.

As used herein, the term "pharmaceutically acceptable" refers to a material, such as a carrier or diluent, which does not abrogate the biological activity or properties of the compound, and is relatively non-toxic, i.e., the material may be administered to an individual without causing undesirable biological effects or interacting in a deleterious manner with any of the components of the composition in which it is contained.

As used herein, the term "pharmaceutically acceptable carrier" means a pharmaceutically acceptable material, composition or carrier, such as a liquid or solid filler, stabilizer, dispersing agent, suspending agent, diluent, excipient, thickening agent, solvent or encapsulating material, involved in carrying or transporting a compound useful within the invention within or to the patient such that it may perform its intended function. Typically, such constructs are carried or transported from one organ, or portion of the body, to another organ, or portion of the body. Each carrier must be "acceptable" in the sense of being compatible with the other ingredients of the formulation, including the compound useful within the invention, and not injurious to the patient. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations. As used herein, "pharmaceutically acceptable carrier" also includes any and all coatings, antibacterial and antifungal agents, and absorption delaying agents, and the like that are compatible with the activity of the compound useful within the invention, and are physiologically acceptable to the patient. Supplementary active compounds may also be incorporated into the compositions. The "pharmaceutically acceptable carrier" may further include a pharmaceutically acceptable salt of the compound useful within the invention. Other additional ingredients that may be included in the pharmaceutical compositions used in the practice of the invention are known in the art and described, for example in Remington's Pharmaceutical Sciences (Genaro, Ed., Mack Publishing Co., 1985, Easton, PA), which is incorporated herein by reference.

As used herein, "treating a disease or disorder" means reducing the frequency with which a symptom of the disease or disorder is experienced by a patient. Disease and disorder are used interchangeably herein.

As used herein, the term "treatment" or "treating" encompasses prophylaxis and/or therapy. Accordingly, the compositions and methods of the present invention are not limited to therapeutic applications and can be used in prophylactic ones. Therefore "treating" or "treatment" of a state, disorder or condition includes: (i) preventing or delaying the appearance of clinical symptoms of the state, disorder or condition developing in a subject that may be afflicted with or predisposed to the state, disorder or condition but does not yet experience or display clinical or subclinical symptoms of the state, disorder or condition, (ii) inhibiting the state, disorder or condition, i.e., arresting or reducing the development of the disease or at least one clinical or subclinical symptom thereof, or (iii) relieving the disease, i.e. causing regression of the state, disorder or condition or at least one of its clinical or subclinical symptoms.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

Multiple sclerosis (MS) is the most common autoimmune demyelinating disease of the central nervous system (CNS) (1, 2). MS therapy based on restoration of antigen (Ag)-specific peripheral immune tolerance has been a longstanding goal in MS research, as all current MS therapies target the immune system in an Ag-nonspecific manner (3). The prerequisite for Ag-specific therapy is knowledge of the relevant self-Ag targeted by the autoimmune response. It is widely believed that MS pathogenesis is driven by autoimmunity against oligodendrocyte (Ol)-produced myelin Ags. However, the relevant Ag(s) in MS remains speculative, with the possibility that these Ags differ among patients, and overtime in the same patient (4). Based on findings in MS experimental models, several approaches for induction of Ag-specific tolerance have been proposed, and some of them have been clinically tested (3, 4). It was previously reported that administration of free encephalitogenic peptide, or of the peptide coupled to nanoparticles or apoptotic cells (5-10) via various routes [intravenous (i.v.), oral, nasal, etc.], induces Ag-specific immune tolerance and ameliorates disease. Mechanisms of tolerance induction include eliciting tolerogenic dendritic cells (DCs) and immunosuppressive macrophages, reducing pathogenic Th1 and Th17 cell responses (11), and inducing both T regulatory (Tregs) and type 1 regulatory T (Tr1) cells (12). Even though i.v. tolerance induction has shown significant therapeutic effects in experimental autoimmune encephalomyelitis (EAE), the safety of this approach remains a matter of concern, due to the possibility that i.v. injected myelin Ag could worsen disease rather than ameliorate it (3, 4, 13).

In the study described herein, a novel therapeutic approach was developed for restoring immune tolerance in CNS autoimmunity by using Ol-derived extracellular vesicles (Ol-EVs) that naturally contain the most relevant myelin Ags (14). EVs are protein-lipid membrane-enclosed particles secreted by virtually all cells that play a significant role in cell-cell communication (15, 16). Multiple studies have used EVs for therapy of experimental autoimmune diseases, reporting on their safety, and promise for clinical use (17-20). It is shown that i.v. injection of Ol-EVs suppresses clinical disease prophylactically and therapeutically in chronic and relapsing-remitting EAE models. The effect of Ol-EVs is myelin Ag-dependent, given that Ol-EVs lacking a myelin Ag used for EAE induction failed to suppress EAE. The beneficial effect of Ol-EVs in EAE was dependent on monocytes, as they upregulate PD-L1 expression in an IL-10-dependent manner, leading to apoptosis of encephalitogenic CD4+ T cells.

Overall, the study herein describes a novel therapeutic approach for treating autoimmune demyelinating disease of the CNS in an Ag-specific manner. The study described herein shows that intravenous injection of oligodendrocyte-derived extracellular vesicles has an antigen-specific therapeutic effect in an animal model of multiple sclerosis, demonstrating the potential of this novel approach for therapy of human disease.

Without wishing to be limited by theory, the invention is based in part on the discovery that the administration of oligodendrocyte-derived extracellular vesicles can treat multiple sclerosis by inducing tolerance to one or more myelin antigens. Oligodendrocyte-derived extracellular vesicles contain multiple myelin proteins and therefore the administration to the subject simultaneously induces tolerance to any antigen that may be the target of MS-associated autoimmune attack. Accordingly, in one aspect the invention provides a method of treating or preventing multiple sclerosis in a subject in need thereof, the method comprising administering to the subject an effective amount of oligodendrocyte-derived extracellular vesicles (Ol-EVs). In another aspect, the invention provides a method of inducing tolerance to a myelin antigen in a subject, the method comprising administering to the subject an effective amount of oligodendrocyte-derived extracellular vesicles (Ol-EVs).

In certain embodiments, the Ol-EVs comprise myelin antigens (Ags). In certain embodiments, the myelin Ags are selected from the group consisting of myelin basic protein (MBP), myelin oligodendrocyte glycoprotein (MOG), and myelin proteolipid protein (PLP).

In certain embodiments, the Ol-EVs comprise exosomes. In certain embodiments, the Ol-EVs comprise microvesicles. In certain embodiments, the Ol-EVs comprise exosomes and microvesicles.

In certain embodiments, administering Ol-EVs treats MS in Ag-specific manner.

In certain embodiments, administering induce immunosuppressive monocytes. In certain embodiments, administering induces immunosuppressive monocytes in a IL-10 dependent manner.

In certain embodiments, the monocytes are PD-L1 expressing monocytes.

In certain embodiments, the administration does not cause any deleterious or unwanted effect on the immune system of the subject.

In various embodiments, the oligodendrocyte-derived extracellular vesicles are formulated in a pharmaceutical composition comprising at least one pharmaceutically acceptable carrier. In various embodiments, the pharmaceutical composition is intravenously, subcutaneously, intradermally, transdermally, orally or nasally. In various embodiments, the subject is a mammal. In various embodiments, the subject is a human. In various embodiments, the oligodendrocyte-derived extracellular vesicle is derived from human oligodendrocyte.

In various embodiments, the multiple sclerosis is chronic multiple sclerosis. In various embodiments, the multiple sclerosis is relapse-remitting multiple sclerosis.

In various embodiments, the oligodendrocyte-derived extracellular vesicles are derived from an in vitro culture of oligodendrocytes. In various embodiments, the oligodendrocyte-derived extracellular vesicles are derived from an in vitro culture of human oligodendrocytes. Without intending to be bound by theory, it is believed the oligodendrocyte-derived extracellular vesicles derived from in vitro culture of oligodendrocytes can have different characteristics than vesicles released by oligodendrocytes in vivo. In some embodiments, EVs used for therapy express relatively high levels of several myelin proteins, while not expressing Major Histocompatibility Complex proteins. In some embodiments, the source cells of EVs are genetically altered to optimize the quality of their EVs.

In various embodiments, oligodendrocyte-derived extracellular vesicles may be obtained by performing a first centrifuging step on oligodendrocyte cell culture supernatant, filtering the resulting supernatant, performing a step ultra-centrifuging the filtrate and collecting the pelleted extracellular vesicles (Casella G et al, 2018. PMD: 30017878; Colombo F et al., 2018. PMD: 29467770).

In various embodiments, the oligodendrocyte-derived extracellular vesicles do not express Major Histocompatibility Complex proteins. In various embodiments, the oligodendrocytes from which the extracellular vesicles are derived do not express MHC class II molecules. In various embodiments, MHC Class I molecule expression may be prevented using any means known in the art. In various embodiments, the In another aspect, a pharmaceutical composition comprising an oligodendrocyte-derived extracellular vesicle and at least one pharmaceutically acceptable carrier is provided. In another aspect, an isolated oligodendrocyte-derived extracellular vesicle is provided. In various embodiments, the isolated oligodendrocyte-derived extracellular vesicle is for use in the treatment of multiple sclerosis (MS). In still another aspect, a pharmaceutical composition for use in the treatment of multiple sclerosis (MS) is provided, the composition comprising an oligodendrocyte-derived extracellular vesicle and a pharmaceutically acceptable carrier. In another aspect, use of a an oligodendrocyte-derived extracellular vesicle in treating multiple sclerosis (MS) is provided. In various embodiments, the multiple sclerosis is chronic multiple sclerosis. In various embodiments, the multiple sclerosis is relapse-remitting multiple sclerosis.

In certain embodiments, the oligodendrocyte-derived extracellular vesicles (Ol-EVs) comprise myelin antigens (Ags). In certain embodiments, the oligodendrocyte-derived extracellular vesicle is derived from human oligodendrocyte. In various embodiments, the myelin Ags comprise myelin basic protein (MBP), myelin oligodendrocyte glycoprotein (MOG), and/or myelin proteolipid protein (PLP). In various embodiments, the composition comprising oligodendrocyte-derived extracellular vesicles comprise exosomes. In certain embodiments, the composition comprises microvesicles. In certain embodiments, the composition comprise exosomes and microvesicles. In various embodiments, the composition is formulated for intravenous, subcutaneous, intradermal, transdermal, oral or nasal administration. In various embodiments, the composition is formulated for intravenous administration.

It was also demonstrated herein that the effect of Ol-EVs was dependent on myelin Ag present in them and not on other components specifically produced by Ol-EVs. Thus, in another aspect, an extracellular vesicle derived from a cell is provided, wherein the extracellular vesicle comprises myelin antigens (Ags). The cell can be a cell other than an oligodendrocyte. In certain embodiments, the cell expresses a myelin antigen. In certain embodiments, the cell is engineered to express a myelin antigen. In various embodiments, the myelin antigen is myelin basic protein (MBP), myelin oligodendrocyte glycoprotein (MOG), or myelin proteolipid protein (PLP). In various embodiments, the cell is engineered to express one or more types of myelin antigen. In various embodiments, the cell is engineered to express at least one myelin antigen selected from: myelin basic protein (MBP), myelin oligodendrocyte glycoprotein (MOG), and myelin proteolipid protein (PLP). In certain embodiments, the cell is a mammalian cell. In certain embodiments, the cell is a human cell.

Another aspect provides a method of treating or preventing multiple sclerosis in a subject in need thereof, the method comprising administering to the subject an effective amount of extracellular vesicles (EVs) comprising a myelin antigen. Another aspect of the invention provides a method of inducing tolerance to a myelin antigen in a subject, the method comprising administering to the subject an effective amount of extracellular vesicles (EVs) comprising a myelin antigen.

In various embodiments, the EVs are derived from a cell expressing a myelin antigen. In certain embodiments, the cell is engineered to express a myelin antigen. In certain embodiments, the cell is engineered to express a myelin antigen at a high level. In certain embodiments, the cell does not express or has reduced expression of Major Histocompatibility proteins (e.g., MHC Class I, MH-RC Class II molecules). In certain embodiments, the cell is genetically modified to reduce or abolish expression of a Major Histocompatibility protein (e.g., MH-RC Class I, MH-IC Class II molecules).

In certain embodiments, the EVs comprise myelin antigens (Ags). In certain embodiments, the myelin Ags are selected from the group consisting of myelin basic protein (MBP), myelin oligodendrocyte glycoprotein (MOG), and myelin proteolipid protein (PLP).

In certain embodiments, the EVs comprise exosomes. In certain embodiments, the Ol-EVs comprise microvesicles. In certain embodiments, the EVs comprise exosomes and microvesicles.

In certain embodiments, the administration does not cause any deleterious or unwanted effect on the immune system of the subject.

In various embodiments, the extracellular vesicles are formulated in a pharmaceutical composition comprising at least one pharmaceutically acceptable carrier. In various embodiments, the pharmaceutical composition is intravenously, subcutaneously, intradermally, transdermally, orally or nasally. In various embodiments, the subject is a mammal. In various embodiments, the subject is a human. In various embodiments, the extracellular vesicle is derived from a human cell.

In various embodiments, the multiple sclerosis is chronic multiple sclerosis. In various embodiments, the multiple sclerosis is relapse-remitting multiple sclerosis.

In another aspect, a pharmaceutical composition comprising an extracellular vesicle comprising a myelin antigen, and at least one pharmaceutically acceptable carrier is provided. In another aspect, an isolated extracellular vesicle comprising a myelin antigen is provided. In various embodiments, the isolated extracellular vesicle is for use in the treatment of multiple sclerosis (MS). In still another aspect, a pharmaceutical composition for use in the treatment of multiple sclerosis (MS) is provided, wherein the composition comprises an extracellular vesicle comprising a myelin antigen, and a pharmaceutically acceptable carrier. In another aspect, use of a an extracellular vesicle in treating multiple sclerosis (MS) is provided, wherein the extracellular vesicle comprises a myelin antigen. In various embodiments, the myelin antigen is myelin basic protein (MBP), myelin oligodendrocyte glycoprotein (MOG), or myelin proteolipid protein (PLP). In various embodiments, the extracellular vesicle comprises one or more myelin antigens selected from myelin basic protein (MBP), myelin oligodendrocyte glycoprotein (MOG), or myelin proteolipid protein (PLP). In various embodiments, the multiple sclerosis is chronic multiple sclerosis. In various embodiments, the multiple sclerosis is relapse-remitting multiple sclerosis.

Administration/Dosing

In clinical settings, delivery systems for the compositions described herein can be introduced into a subject by any of a number of methods, each of which is familiar in the art. For instance, a pharmaceutical formulation of the composition can be administered by inhalation or systemically, e.g. by intravenous injection.

The regimen of administration may affect what constitutes an effective amount. The therapeutic formulations may be administered to the subject either prior to or after the manifestation of symptoms associated with the disease or condition. Further, several divided dosages, as well as staggered dosages may be administered daily or sequentially, or the dose may be continuously infused, or may be a bolus injection. Further, the dosages of the therapeutic formulations may be proportionally increased or decreased as indicated by the exigencies of the therapeutic or prophylactic situation.

Administration of the composition of the present invention to a subject, preferably a mammal, more preferably a human, may be carried out using known procedures, at dosages and for periods of time effective to treat a disease or condition in the subject. An effective amount of the composition necessary to achieve a therapeutic effect may vary according to factors such as the time of administration; the duration of administration; other drugs, compounds or materials used in combination with the composition; the state of the disease or disorder; age, sex, weight, condition, general health and prior medical history of the subject being treated; and like factors well-known in the medical arts. Dosage regimens may be adjusted to provide the optimum therapeutic response. For example, several divided doses may be administered daily or the dose may be proportionally reduced as indicated by the exigencies of the therapeutic situation. One of ordinary skill in the art would be able to study the relevant factors and make the determination regarding the effective amount of the composition without undue experimentation. Formulations may be employed in admixtures with conventional excipients, i.e., pharmaceutically acceptable organic or inorganic carrier substances suitable for oral, parenteral, nasal, intravenous, subcutaneous, enteral, or any other suitable mode of administration, known to the art. The pharmaceutical preparations may be sterilized and if desired mixed with auxiliary agents, e.g., lubricants, preservatives, stabilizers, wetting agents, emulsifiers, salts for influencing osmotic pressure buffers, coloring, flavoring and/or aromatic substances and the like. They may also be combined where desired with other active agents, e.g., other analgesic agents.

Routes of administration of any of the compositions of the invention include oral, nasal, rectal, intravaginal, parenteral, buccal, sublingual or topical. The compounds or agents (e.g., extracellular vesicles (EVs)) for use in the invention may be formulated for administration by any suitable route, such as for oral or parenteral, for example, transdermal, transmucosal (e.g., sublingual, lingual, (trans)buccal, (trans)urethral, vaginal (e.g., trans- and perivaginally), (intra)nasal and (trans)rectal), intravesical, intrapulmonary, intraduodenal, intragastrical, intrathecal, subcutaneous, intramuscular, intradermal, intra-arterial, intravenous, intrabronchial, inhalation, and topical administration.

Suitable compositions and dosage forms include, for example, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for intravesical administration and the like. It should be understood that the formulations and compositions that would be useful in the present invention are not limited to the particular formulations and compositions that are described herein.

Oral Administration

For oral application, particularly suitable are tablets, dragees, liquids, drops, suppositories, or capsules, caplets and gelcaps. The compositions intended for oral use may be prepared according to any method known in the art and such compositions may contain one or more agents selected from the group consisting of inert, non-toxic pharmaceutically excipients that are suitable for the manufacture of tablets. Such excipients include, for example an inert diluent such as lactose; granulating and disintegrating agents such as cornstarch; binding agents such as starch; and lubricating agents such as magnesium stearate. The tablets may be uncoated or they may be coated by known techniques for elegance or to delay the release of the active ingredients. Formulations for oral use may also be presented as hard gelatin capsules wherein the active ingredient is mixed with an inert diluent.

For oral administration, the compounds of the invention may be in the form of tablets or capsules prepared by conventional means with pharmaceutically acceptable excipients such as binding agents (e.g., polyvinylpyrrolidone, hydroxypropylcellulose or hydroxypropyl methylcellulose); fillers (e.g., cornstarch, lactose, microcrystalline cellulose or calcium phosphate); lubricants (e.g., magnesium stearate, talc, or silica); disintegrates (e.g., sodium starch glycollate); or wetting agents (e.g., sodium lauryl sulphate). If desired, the tablets may be coated using suitable methods and coating materials such as OPADRY™ film coating systems available from Colorcon, West Point, Pa. (e.g., OPADRY™ OY Type, OYC Type, Organic Enteric OY-P Type, Aqueous Enteric OY-A Type, OY-PM Type and OPADRY™ White, 32K18400). Liquid preparation for oral administration may be in the form of solutions, syrups or suspensions. The liquid preparations may be prepared by conventional means with pharmaceutically acceptable additives such as suspending agents (e.g., sorbitol syrup, methyl cellulose or hydrogenated edible fats); emulsifying agent (e.g., lecithin or acacia); non-aqueous vehicles (e.g., almond oil, oily esters or ethyl alcohol); and preservatives (e.g., methyl or propyl p-hydroxy benzoates or sorbic acid).

Parenteral Administration

For parenteral administration, the compounds or agents (e.g., extracellular vesicles (EVs)) of the invention may be formulated for injection or infusion, for example, intravenous, intramuscular or subcutaneous injection or infusion, or for administration in a bolus dose and/or continuous infusion. Suspensions, solutions or emulsions in an oily or aqueous vehicle, optionally containing other formulatory agents such as suspending, stabilizing and/or dispersing agents may be used.

Controlled Release Formulations and Drug Delivery Systems

In certain embodiments, the formulations of the present invention may be, but are not limited to, short-term, rapid-offset, as well as controlled, for example, sustained release, delayed release and pulsatile release formulations.

The term sustained release is used in its conventional sense to refer to a drug formulation that provides for gradual release of a drug over an extended period of time, and that may, although not necessarily, result in substantially constant blood levels of a drug over an extended time period. The period of time may be as long as a month or more and should be a release that is longer that the same amount of agent administered in bolus form.

For sustained release, the compounds may be formulated with a suitable polymer or hydrophobic material that provides sustained release properties to the compounds. As such, the compounds for use the method of the invention may be administered in the form of microparticles, for example, by injection or in the form of wafers or discs by implantation.

In certain embodiments, the compounds of the invention are administered to a patient, alone or in combination with another pharmaceutical agent, using a sustained release formulation.

The term delayed release is used herein in its conventional sense to refer to a drug formulation that provides for an initial release of the drug after some delay following drug administration and that mat, although not necessarily, includes a delay of from about 10 minutes up to about 12 hours.

The term pulsatile release is used herein in its conventional sense to refer to a drug formulation that provides release of the drug in such a way as to produce pulsed plasma profiles of the drug after drug administration.

The term immediate release is used in its conventional sense to refer to a drug formulation that provides for release of the drug immediately after drug administration.

As used herein, short-term refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes and any or all whole or partial increments thereof after drug administration after drug administration.

As used herein, rapid-offset refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes, and any and all whole or partial increments thereof after drug administration.

Dosing

The therapeutically effective amount or dose of a compound or agent (e.g., extracellular vesicles (EVs)) of the present invention depends on the age, sex and weight of the patient, the current medical condition of the patient and the progression of a disease or disorder contemplated herein in the patient being treated. The skilled artisan is able to determine appropriate dosages depending on these and other factors.

A suitable dose of a compound of the present invention may be in the range of from about 0.001 mg to about 5,000 mg per day, such as from about 0.01 mg to about 1,000 mg, for example, from about 1 mg to about 500 mg, such as about 5 mg to about 250 mg per day. The dose may be administered in a single dosage or in multiple dosages, for example from 1 to 4 or more times per day. When multiple dosages are used, the amount of each dosage may be the same or different. For example, a dose of 1 mg per day may be administered as two 0.5 mg doses, with about a 12-hour interval between doses.

It is understood that the amount of compound dosed per day may be administered, in non-limiting examples, every day, every other day, every 2 days, every 3 days, every 4 days, or every 5 days. For example, with every other day administration, a 5 mg per day dose may be initiated on Monday with a first subsequent 5 mg per day dose administered on Wednesday, a second subsequent 5 mg per day dose administered on Friday, and so on.

Actual dosage levels of the cells in the pharmaceutical formulations of this invention may be varied so as to obtain an amount of the composition that are effective to achieve the desired therapeutic response for a particular subject, composition, and mode of administration, without being toxic to the subject.

Toxicity and therapeutic efficacy of such therapeutic regimens are optionally determined in cell cultures or experimental animals, including, but not limited to, the determination of the $LD_{50}$ (the dose lethal to 50% of the population) and the $ED_{50}$ (the dose therapeutically effective in 50% of the population). The dose ratio between the toxic and therapeutic effects is the therapeutic index, which is expressed as the ratio between $LD_{50}$ and $ED_{50}$. The data obtained from cell culture assays and animal studies are optionally used in formulating a range of dosage for use in human. The dosage of such compounds lies preferably within a range of circulating concentrations that include the $ED_{50}$ with minimal toxicity. The dosage optionally varies within this range depending upon the dosage form employed and the route of administration utilized.

The disclosures of each and every patent, patent application, and publication cited herein are hereby incorporated by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out selected embodiments of the present invention, and are not to be construed as limiting in any way the remainder of the disclosure.

The materials and methods employed in these experiments are now described.

Mice

Age- and sex-matched B10.PL, SJL, C56BL/6 WT, B6.Ly5.1 (CD45.1$^+$), RAG1$^{-/-}$, 2D2, OT-II, Zbtb46 iDTR, ROSA26-stop-Tdtomato, IL-10Rβ$^{-/-}$, IL-10$^{-/-}$, and Rosa26-LSL-Cas9 mice were purchased from The Jackson Laboratory (Bar Harbor, ME, USA). Mice were kept in specific pathogen-free conditions with a maximum of 5 mice per cage, in 12/12 h of light/dark cycles and food ad libitum throughout the experimental procedures. Every effort was made to minimize suffering of mice. Experimental protocols using mice were approved by the Institutional Animal Care and Use Committee of Thomas Jefferson University.

HEK Cells

HEK cells were cultured in Dulbecco Modified Eagle's Medium (DMEM, Gibco) supplemented with 10% EV-depleted fetal bovine serum (FBS), penicillin, streptomycin (100 U/ml) and 2 mM L-glutamine. For harvesting all cell culture supernatants for EVs isolation, media was supplemented with FBS depleted of EVs, by overnight ultracentrifugation at 110,000 g at 4° C. All cells were maintained at 37° C. with 5% $CO_2$.

PDGFRα$^+$ Cells Isolation

Whole mouse brains were harvested from 5-day-old C56BL/6 and Rosa26-LSL-Cas9 pups, manually dissociated, and enzymatically digested using a neural dissociation kit (Miltenyi). The suspension was quenched with DMEM (Gibco) supplemented with 10% EV-depleted FBS and centrifuged at 1200 rpm for 5 min. Tissue was then homogenized by passing through an 18-gauge needle and then filtered through a 70 μm cell strainer (Fisher) to remove any remaining debris. PDGFRα+ cells were isolated from this cell suspension utilizing a positive selection with magnetic beads separation kit (Miltenyi).

Culturing OPCs and Mature Ols

PDGFRα$^+$ cells were plated in OPC differentiation media consisting of DMEM/F2, N-2, B-27, Glutamax (2 mM), SHH (200 ng/mL), R-FGF, PDGF-AA (20 ng/mL), and Normycin and incubated at 37° C. in 5% $CO_2$. After 3-5 days, media was replaced with fresh Ol maturation media consisting of DMEM/F2, N-2, and B-27 was added. Glutamax (2 mM), T3 (40 ng/mL), SHH (200 ng/mL), Noggin (100 ng/mL), cAMP (50 μM), TGF (100 ng/mL) and NT3 (10 ng/mL). Cells were kept in Ol maturation media for up to 3 weeks with media changes every 5 days.

Human OPCs derived from NIH-approved H9 human ESCs (Millipore) were grown for three weeks and differentiated into mature Ols, according to Millipore protocol.

Cell Transduction

OPCs and HEK cells were transduced with a lentivirus coding for Cre recombinase (Lv-Cre; Addgene #12106), or mouse MOG (Lv-MOG, Origene). Briefly, approximately 2×10$^6$ cells were transduced with Lv-Cre or Lv-MOG in complete media supplemented with 10% EV-depleted serum for HEK cells, while for OPCs we used the same media described in the previous section. EVs were purified from cell culture supernatant of HEK cells after 2-3 days, and after 2-3 weeks from the supernatants of mature Ols.

MOG$^{-/-}$ Ols Generation

PDGFRα+ cells were isolated from brains of Rosa26-LSL-Cas9 pups. OPCs were transduced with a lentivirus expressing Cre and MOG sgRNA or scrambled sgRNA. Mature MOG−/− Ols were obtained by puromycine selection. MOG knockout was confirmed by PCR and Duoset ELISA (LSBio), both in Ols and Ol-EVs.

MOG+ HEK Cell Generation

HEK cells were transduced with a lentivirus coding for MOG. MOG+ HEK cells were obtained by puromycine selection, in complete media supplemented with 10% EV-depleted serum. MOG expression was confirmed by immunofluorescence and Duoset ELISA (LSBio), both in HEK cells and HEK-EVs.

CRISPR/CAS9

LentiCRISPR v2 was purchased from Addgene (plasmid #52961). Cre gene was amplified using forward primer: TACTAGTGGCGCGCCACCATGCCCAAGAAGAAG-AGG (SEQ ID NO: 1), and reverse primer: GGATCCAGCGTAATCTGGAACATCGT (SEQ ID NO: 2), and used to replace Cas9 sequence in lentiCRISPR v2 through XbaI and BamHI enzyme sites (XbaI site was then removed after ligation). Then a new XbaI site was introduced after KpnI site for multiple sgRNA expression. The final plasmid was named Lenti-sgRNA backbone-EFS-Cre-P2A-puro.

MOG sgRNAs was designed using Benchling (https://www.benchling.com/crispr/), oligos were synthesized from IDT and annealed at room temperature to get sgRNAs. sgRNA fragment was inserted into pLenti-sgRNA backbone-EFS-Cre-P2A-puro through BsmBI separately. sgRNA activity was analyzed in N2A-Cas9 cell line and the sgRNA with higher activity was selected for further use.

TABLE 1

The sequences of sgRNA oligos and detection primers.

| Name | Sequence |
|---|---|
| mMOG sgRNA1 forward | CACCgagcaagcacctgaataccg (SEQ ID NO: 3) |
| mMOG sgRNA1 reverse | AAACcggtattcaggtgatgctc (SEQ ID NO: 4) |
| mMOG sgRNA2 forward | CACCgtcacctctaccgaaatggca (SEQ ID NO: 5) |
| mMOG sgRNA2 reverse | AAACtgccatttcggtagaggtgac (SEQ ID NO: 6) |
| mMOG DP forward | Tcccactcttgtgtcttgga (SEQ ID NO: 7) |
| mMOG DP reverse | Agcaggtgtagcctccttca (SEQ ID NO: 8) |

EV Purification

EVs were purified from the cell culture supernatants using a standardized protocol (17): supernatants were collected and centrifuged for 10 min at 300 g to remove cells and debris. Resulting supernatants were further clarified through a 0.45 μm syringe-filter (Millex, Millipore), then ultracentrifuged at 100,000 g for 2 h to pellet EVs. Pellets were suspended in either lysis buffer with protease inhibitor, 0.1 μm-filtered PBS, or fixative, depending on intended use for EVs.

Nanoparticle Tracking Analysis (NTA) of EVs

EVs were resuspended in 0.1 μm-filtered PBS and diluted 1:100 or 1:1000. The samples were analyzed using the NTA 3.1 Build 3.1.46 software and the NS 300 instrument (Malvern Instruments, MA).

Mass Spectrometry and Data Processing

Liquid chromatography tandem mass spectrometry (LC-MS/MS) analysis was performed using a Q Exactive HF mass spectrometer (ThermoFisher Scientific) coupled with a Nano-ACQUITY UPLC system (Waters). Samples were digested in-gel with trypsin and injected onto a UPLC Symmetry trap column (180 μm i.d.×2 cm packed with 5 μm C18 resin; Waters). Tryptic peptides were separated by reversed phase HPLC on a BEH C18 nanocapillary analytical column (75 μm i.d.×25 cm, 1.7 μm particle size; Waters) using a 240 min gradient formed by solvent A (0.1% formic acid in water) and solvent B (0.1% formic acid in acetonitrile). Eluted peptides were analyzed by the mass spectrometer set to repetitively scan m/z from 400 to 2000 in positive ion mode. The full MS scan was collected at 60,000 resolution followed by data-dependent MS/MS scans at 15,000 resolution on the 20 most abundant ions exceeding a minimum threshold of 10,000. Peptide match was set as preferred; exclude isotope option and charge-state screening were enabled to reject unassigned, and single charged ions. Peptide sequences were identified using MaxQuant 1.6.2.3 (39). MS/MS spectra were searched against a UniProt mouse protein database (October 2017) and a common contaminants database using full tryptic specificity with up to two missed cleavages, static carboxamidomethylation of Cys, and variable oxidation of Met, and protein N-terminal acetylation. "Match between runs" feature was used to help transfer identifications across experiments to minimize missing values. Consensus identification lists were generated with false discovery rates set at 1% for protein and peptide identifications.

EAE Induction and Scoring

EAE was induced as previously described (11, 40, 41). EAE immunization protocols are summarized in Table 2.

Mice were weighed and scored for clinical signs daily. Clinical assessment of EAE was performed according to the following scoring criteria: 0=healthy; 1=limp tail; 2=ataxia and/or paresis of hindlimbs; 3=paralysis of hindlimbs and/or paresis of forelimbs; 4=tetraparalysis; and 5=705 moribund or death (42).

TABLE 2

EAE models

| Genetic background | Disease model | Emulsion | Pertussis toxin |
|---|---|---|---|
| C57BL/6 | Chronic | 200 μg MOG$_{35-55}$ peptide + CFA supplemented with 10 mg/mL of MBT H37Ra | 200 ng at days 0 and 2 |
| B10.PL | Chronic | 400 μg MBP$_{Ac(1-11)}$ peptide + CFA supplemented with 10 mg/mL of MBT H37Ra | 240 ng at days 0 and 2 |
| SJL | Relapsing-remitting | 90 μg PLP$_{139-151}$ peptide + CFA supplemented with 2.75 mg/mL of MBT H37Ra | 100 ng at days 0 and 2 |
| C57BL/6 | Adoptive EAE | 1 × 10$^7$ Th17 cells i.v. | 200 ng at days 0 and 2 |

Bone Marrow Chimeras

B6.Ly5.1 (CD45.1+) congenic hosts were lethally irradiated with 2×2.5 Gy with an 8 h interval between irradiation and were reconstituted by tail vein injection of 5×10$^6$ CD45.2+ bone marrow cells from WT, or Zbtb46-dtr donors. Mice were allowed to reconstitute for 6 weeks prior to use.

DT Ablation

Diphtheria toxin (DTX; Sigma-Aldrich) was administered i.p. at 1 µg/20 g mouse in 200 µl of PBS 1 day before i.v. injection of EVs. Mice received 2 injections of DTX.

PD-L1 Blockade and Ly6g Depletion

WT and R26-stop-Tdtomato EAE mice were i.p. injected with 200 µg/mouse of αPD-L1 Ab (clone 10F.9G2, BioXCell) or with 200 µg/mouse of αLy6g Ab (clone 1A8, BioXCell), one day before EV injection. Mice received 2 Ab injections in each treatment.

i.v. Administration of Auto-Ag and EVs

I.v. tolerance was induced as previously described (11). Briefly, after disease onset each mouse received dissolved in PBS of either 200 µg $MOG_{35-55}$, 400 µg $MBP_{Ac(1-11)}$, 100 µg $PLP_{139-151}$, or at least $10^{10}$ EVs, every third day, 3 times in total. Control mice received PBS only.

Ag-Specific Recall Response

EAE mice were dissected and their draining lymph nodes and spleens dissociated through a 70 µm strainer to prepare single cell suspensions in IMDM, supplemented with 10% heat-inactivated fetal bovine serum, penicillin (100U), streptomycin (10 µg/mL), L-glutamine (0.3 mg/mL), and 2-mercaptoethanol (55 µM). After treatment with RBC lysis buffer (Biolegend, CA, USA), cells were extensively washed with complete IMDM by centrifugation at 1,300 rpm for 5 min at 4° C. and the cell density was adjusted to $2 \times 10^6$/mL. 100 µL of adjusted cell suspension was added to each well of a 96-well plate. $MOG_{35-55}$ was added to a final concentration of 20 µg/mL. Cells were incubated at 37° C. for 72 h. For negative control, cells were cultured without $MOG_{35-55}$. Cell culture supernatants were collected and stored at −20° C. until use, and cells were analyzed for proliferation and cytokine production by flow cytometry.

Reconstitution of WT and $RAG1^{-/-}$ Mice

WT EAE mice received i.v. $2 \times 10^6$ FACS-sorted Tdtomato+CD11b+CD11c+Ly6c+ cells from spleens and CNS of Rosa26-stop-tdtomato EAE mice. RAG1−/− mice were reconstituted with i.v. $3 \times 10^6$ magnetic bead-isolated total CD4+ T cells from spleens of WT and $PD1^{-/-}$ mice. After 72 h of adoptive transfer, mice were immunized for EAE induction.

Histological Evaluation

At least five mice per group were perfused for 10 min through the left cardiac ventricle with saline containing 0.5 mM EDTA, followed by fixation with cold 4% paraformaldehyde (PFA; Sigma-Aldrich). Spinal cords and brains from EAE mice were dissected out and post-fixed in 2% PFA overnight. Following staining were used: Kluver Barrera (demyelination), Bielshowsky (axonal damage). The number of perivascular inflammatory infiltrates was calculated and expressed as the number of inflammatory infiltrates per $mm^2$; demyelinated areas and axonal loss were expressed as percentage of damaged area.

Cryo-Electron Microscopy

Three microliters of EV samples were applied onto 200-mesh copper grids (Quantifoil R1.2/1.3) that were glow discharged for 60 s. The excess solution was blotted with filter paper for 6 s, using Vitrobot Mark IV (FEI Netherlands) at 4° C. and the grids were immediately flash frozen by rapidly plunging the grid into liquid ethane at −165° C. CryoEM data for both the samples were collected on a Tecnai F 200 KeV TEM microscope operated at 200 keV. Images were recorded on Falcon III direct electron detector at a magnification of 25,000×. Each micrograph was generated by averaging individual dose fractionated frames collected at a rate of 40 frames/s for 4 s exposure. The frames were motion corrected and summed into a single micrograph. The micrographs collected were in the range of 2.0-4.0 µm under focus.

Fluorescence Microscopy

Ols were fixed with 4% PFA for 15 min at 4° C., quenched with 0.1 M glycine, and processed for indirect immunofluorescence. A Nikon NX1 (Nikon Microsystems) confocal microscope was used for image acquisitions. Images were analyzed with ImageJ software (GraphPad). Anti-MBP (ThermoFisher), anti-MOG (Millipore) were used as primary antibodies.

Spinal cord sections of EAE mice were washed 2 times with PBS1X, and incubated in blocking solution PBS, 10% serum of secondary Ab species with or without Triton 0.1% (depending on the nature of the Ag), for up to 1 h at room temperature. Primary antibodies were diluted in the blocking mix (1% serum) and incubated at +4° C. overnight. A Nikon NX1 (Nikon Microsystems) confocal microscope was used for image acquisitions. Images were analyzed with ImageJ software (GraphPad). Anti-CD11b (Abcam) and anti-Arginase1 (GeneTex) were used as primary antibodies.

ELISA

Mouse and human MBP and PLP1 were measured in EV pellet by ELISA (Biomatik and LSBio). MOG was measured in WT Ols, Ol-EVs, MOG−/−Ols, and MOG−/−Ol-EVs ELISA (LSBio).

Measurement of MOG-Specific Ig in Sera of EAE Mice

ELISA plates were coated with 10 µg/ml $MOG_{35-55}$ peptide in PBS overnight at 4° C. The plates were blocked for 2 h at 37° C. with 2% BSA in PBS. Sera were diluted 1:100 with blocking buffer and added to the plates for overnight incubation at 4° C. Sera from WT C57BL/6 mice injected with Ol-EVs were applied to the plates without prior dilution. Bound αMOG Abs from sera were detected with peroxidase-conjugated goat α-mouse secondary Ab (Thermo Scientific) for 30 min at room temperature and tetramethyl benzidine (BioFX Laboratories).

Western Blot Analyses

20 µg of proteins of cells and 5-10 µg of EVs, were diluted with Laemmli buffer and loaded onto 8-14% polyacrylamide gels. Purified EVs were re-suspended in lysis buffer supplemented with a protease inhibitor cocktail (Sigma-Aldrich). Protein concentrations were measured with BCA (Micro BCA, Pierce). Mouse anti-mouse flotillini (BD Bioscience), rabbit anti-Alix (Millipore), goat anti-Tsg101 (Millipore), mouse anti-MOG (Millipore), Rabbit Gapdh (Cell Signaling) were used as primary antibodies.

Isolation of CNS Infiltrating Leukocytes

Brain and spinal cord tissues were incubated for 30 min at 37° C. with 0.4 mg/mL type IV collagenase (Sigma-Aldrich) and dissociated using a 19-gouge needle to obtain a homogenous cell suspension. Finally, CNS cells were enriched by centrifugation on a Percoll gradient as previously described. (43)

Flow Cytometry and Cell Sorting

Flow cytometry was performed using a FACSaria II (Becton Dickinson) and analyzed with FlowJo software (Tree Star). Fluorochrome-conjugated MAbs specific for CD45 (clone 30-F11), CD45.1 (A20), CD11b (M1/70), CD3 (17A2), CD8a (53-6.7) CD4 (RM4-5), CD19 (1D3/CD19), CD11c (N418), PDCA1 (927), Ly6c (AL-21), F4/80 (MB8), Ly6g (1A8), MHC-II (M5/114.15.2), PD-1 (29F.1A12), PD-L1 (1° F.9G2), Caspase 3 (cat. #550480), CCR2 (47503), MBP (P82H9 FITC), MOG (sc-166172 PE) and PLP (ab28486) were purchased either from BD Biosciences, R&D, Biolegend, Santa Cruz, or Abcam.

For intracellular staining, cells were stimulated for 4 h with phorbol 12-myristate 13-acetate (50 ng/ml, Sigma-Aldrich) and ionomycin (500 ng/ml, Sigma-Aldrich) in the presence of GolgiPlug (1:1000, BD Pharmigen), permeabilized using a Cytofix/Cytoperm Plus kit (BD Bioscience) and stained with the following fluochrome-conjugated MAbs: CNPase (836408 alexa fluor 647), GM-CSF (MP1-22E9), IL-17A (TC11-18H10.1), IL-10 (JES5-16E3), IFN-γ (XMG1.2), Zbtb46 (U4-1374) from Biolegend and BD Pharmingen. Dead cells were excluded using L/D BD Pharmingen.

qPCR

Total RNA was extracted from OPCs, mature Ols, moDCs and neutrophils with RNeasy Mini Kit (Qiagen). Genomic DNA was removed by treatment with DNAse I type (Qiagen). cDNA synthesis was performed using Thermoscript™ RT-PCR system (Invitrogen). Pdgfra (Mm00440701_m1); ng2 (Mm00507257_m1); sox10 (Mm01300162_m1); olig2 (Mm01210556_m1); mobp (Mm02745649_m1); mag (Mm00487538_m1); plp1 (Mm01297210_m1); mog (Mm01279062_m1); cnp (Mm01306641_m1); mbp (Mm01262037_m1); gale (Mm01337517_m1); Arg-1 (Mm00475988_m1); pd-l1 (Mm03048248_m1); stat3 (Mm01219775_m1); irf1 (Mm01288580_m1); il-10 (Mm00439164_m1); tim-3 (Mm00454540_m1); pd-12 (Mm00451734_m1); tgf-β (Mm01178820_m1); tgf-α (Mm00446232_m1); icosL (Mm00497237_m1); il-27 (Mm00461162_m1); casp3 (Mm01195085_m1); ccl2 (Mm00441242_m1); tnf-α (Mm00443258_m1); il-23 (Mm00518984_m1); inos (Mm00440502_m1); il-1β (Mm00434228_m1); cd-80 (Mm00711660_m1); cd-86 (Mm00444540_m1), and gapdh (4352339E). mRNA levels were measured by real-time RT-PCR (Applied Biosystems, Invitrogen). The 2-ΔΔCT method was used to calculate relative changes in gene expression (44).

Statistical Analysis

Statistical analysis was performed by GraphPad Prism 8 software. Statistical evaluations are expressed as mean±s.d. or mean±s.e.m., as appropriate. Results were analyzed using two- or one-way ANOVA and posttested with Bonferroni, and with unpaired, two-tailed Student's t-test. Statistical significance was ranked *p<0.05; p<0.001; *p<0.0001.

The results of the experiments are now described.

Example 1: Mature Ols Release EVs Containing Most Relevant Myelin Ags

Figure 1B:
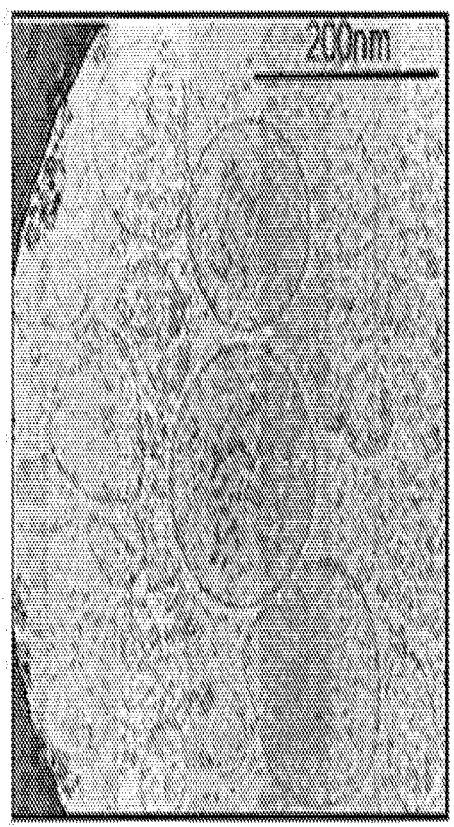
Figure 1C:
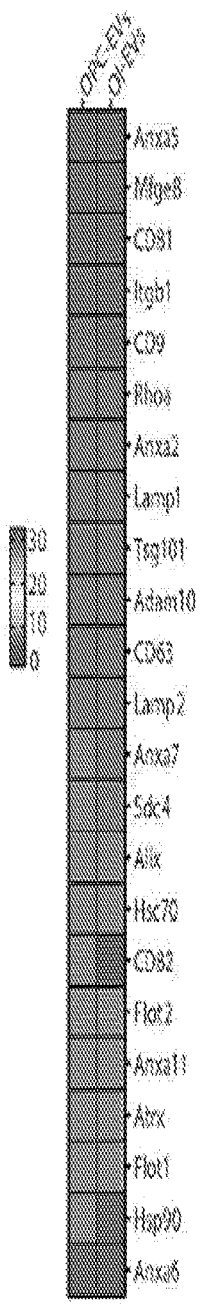
Figure 1D:
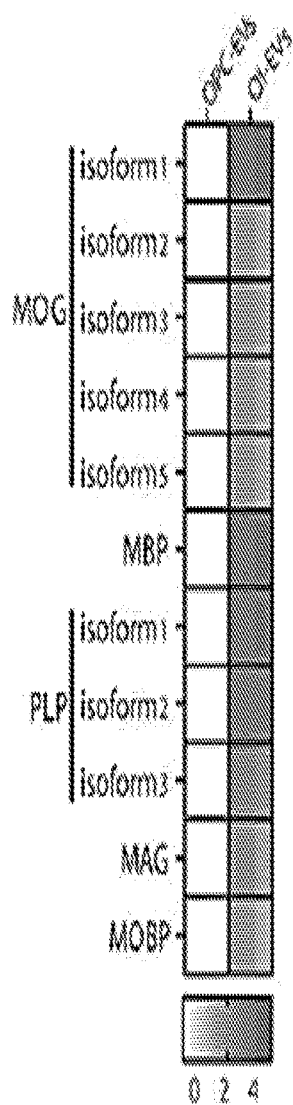
Figure 1E:
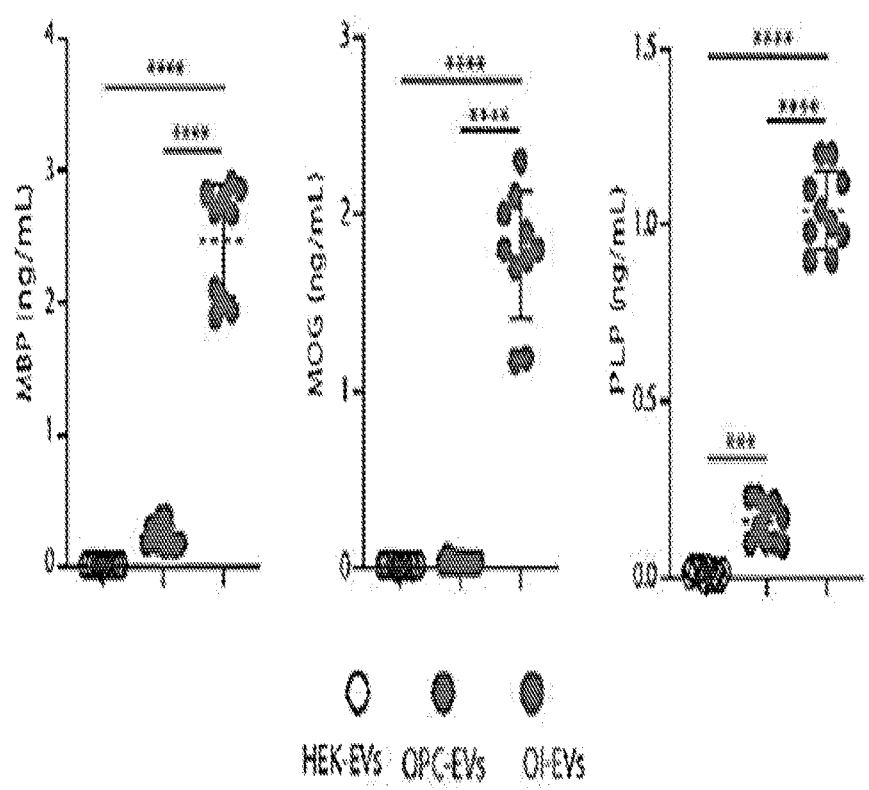
Figures 8A, 8B, 8C:
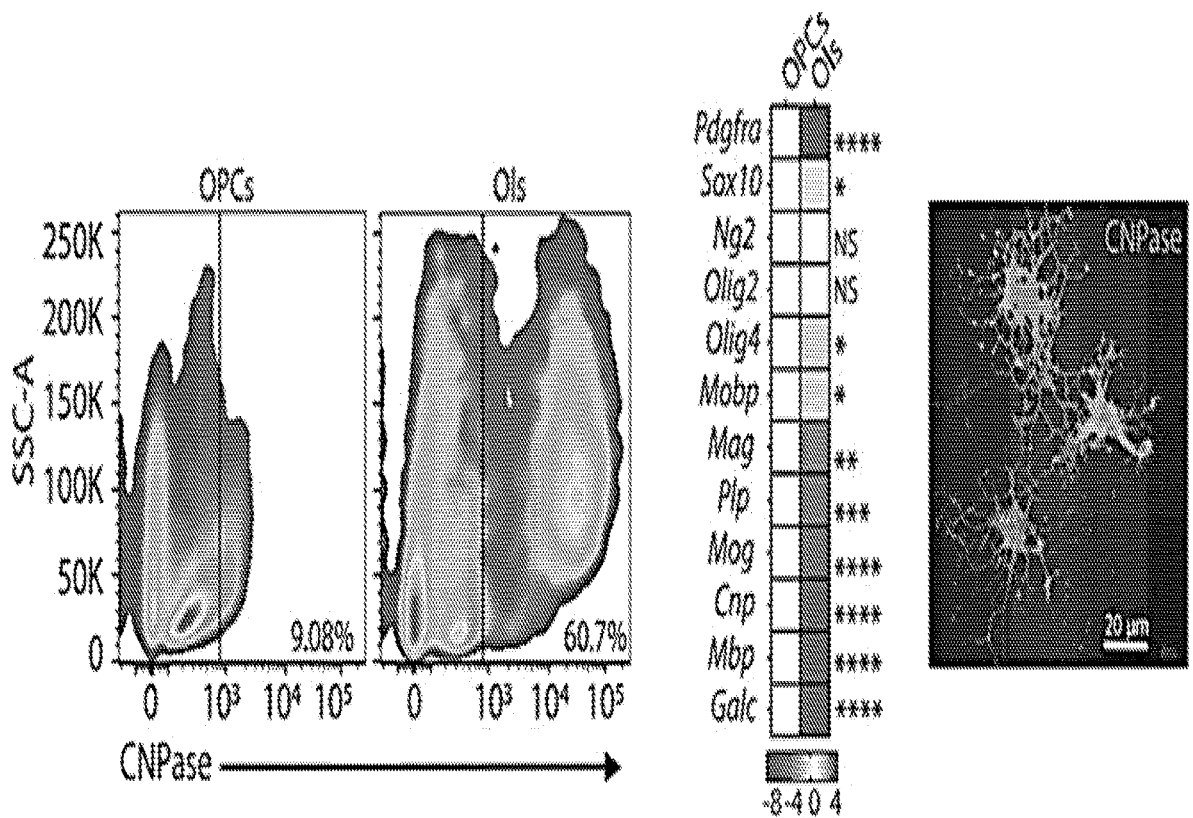
FIGS. 8A-8H illustrate characterization of Ols and Ol-EVs.
Figures 8D, 8E:
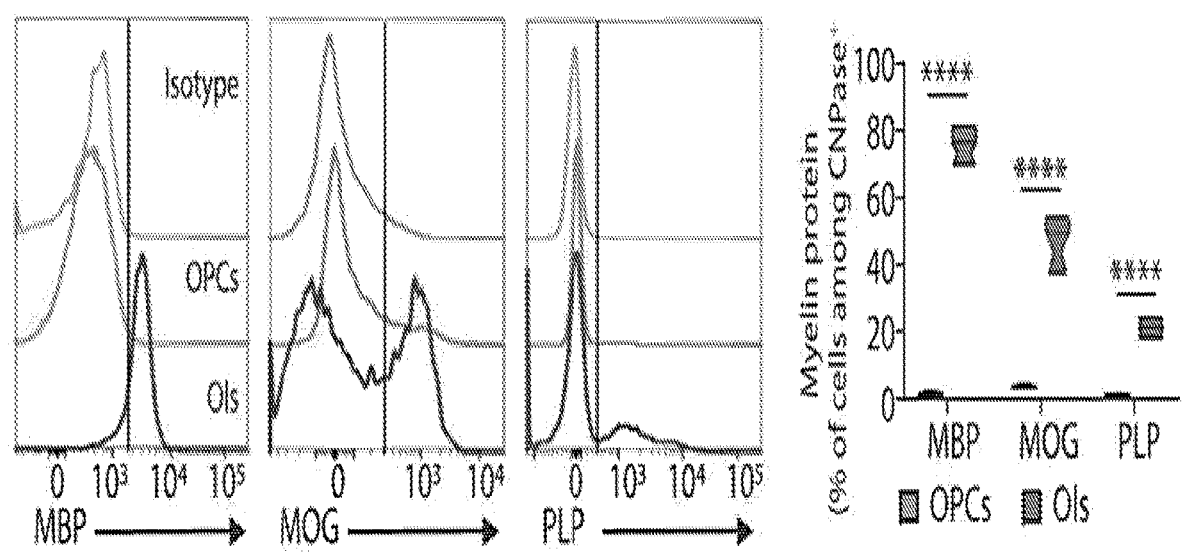
Figure 8F:
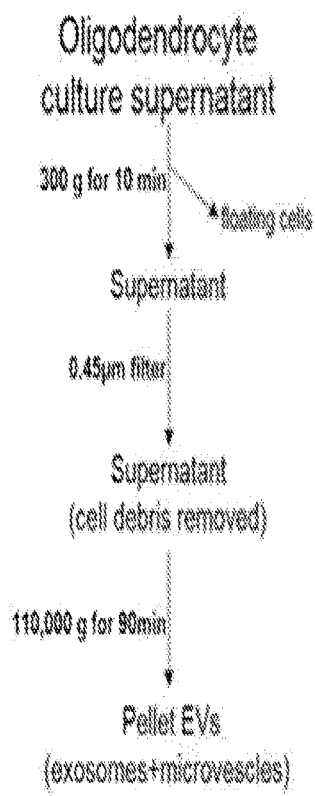
Figure 8G:
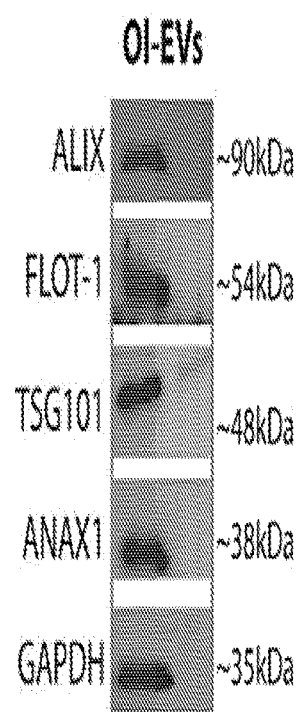
Figure 8H:
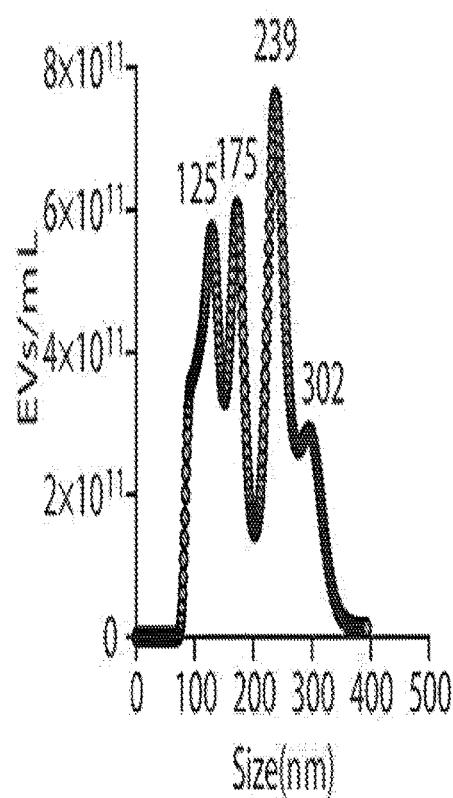

To generate Ol-EVs, mouse CNS PDGFR+ cells were harvested, differentiated into Ol progenitor cells (OPCs), and finally into mature Ols (21). After 3 weeks in culture, over 60% of OPCs became mature Ols (CNPase$^+$ and GalC$^{high}$) and expressed myelin proteins: myelin basic protein (MBP), myelin oligodendrocyte glycoprotein (MOG), and myelin proteolipid protein (PLP), (FIG. 1A and FIGS. 8A-8E). OPCs and mature Ols produced large quantities of EVs with an average diameter of 240 nm, as determined by Cryo-EM and nanoparticle tracking analysis (NTA) (FIG. 1B and FIG. 8G). Mass spectrometry analysis of Ol-EVs and principal EV markers, according to minimal information for studies of extracellular vesicles (MISEV) guidelines (22) are shown in FIG. 1C and FIG. 8H. Multiple myelin proteins were also detected, including MBP, MOG, and PLP (FIG. 1D), and quantified their levels by ELISA (FIG. 1E).

Figure 1F:
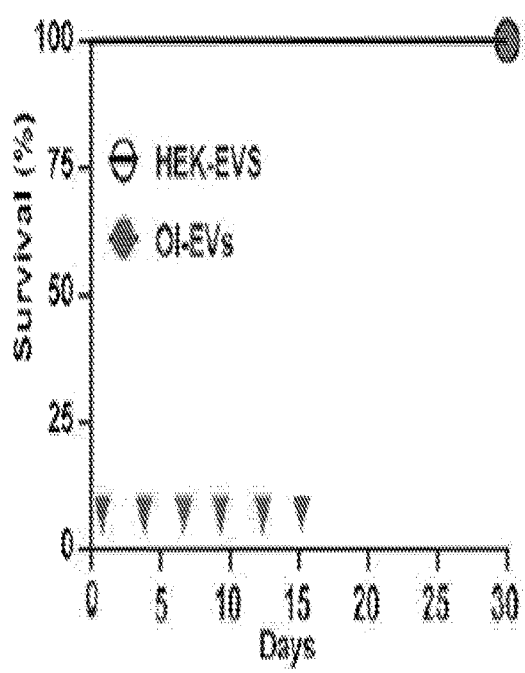
Figure 1G:
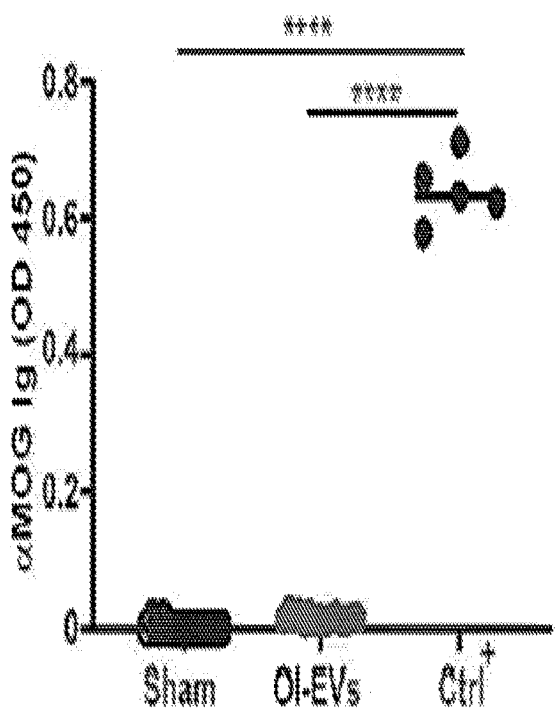

To determine whether Ol-EVs could be harmful to mice, Ol-EVs were i.v. administered to naïve C57BL/6 mice every third day, for a total of six injections. As a control, HEK cell-derived EVs (HEK-EVs) were injected. No effect of Ol-EV and HEK-EVs injections on mice was noticed (FIG. 1F), and antibodies against MOG (contained in injected Ol-EVs) one month after starting Ol-EV administration were not detected (FIG. 1G). Overall, these data show that mature Ols release EVs containing multiple myelin Ags, and that Ol-EVs are well tolerated in vivo.

Figure 10A:
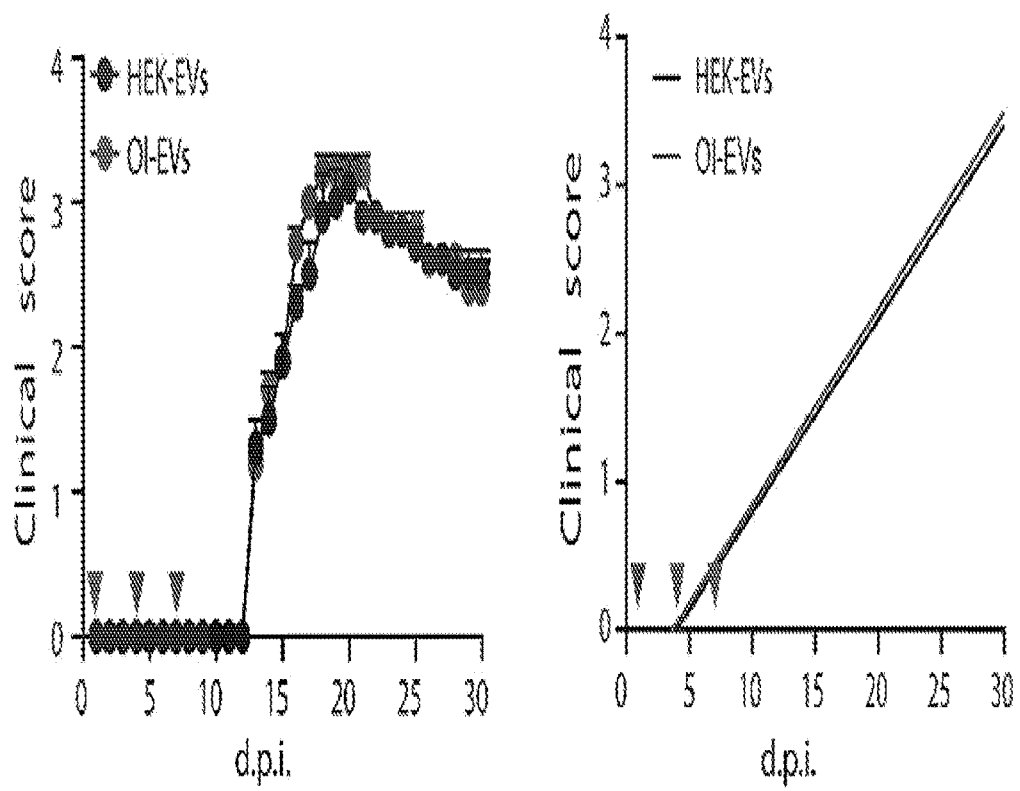
Figure 10B:
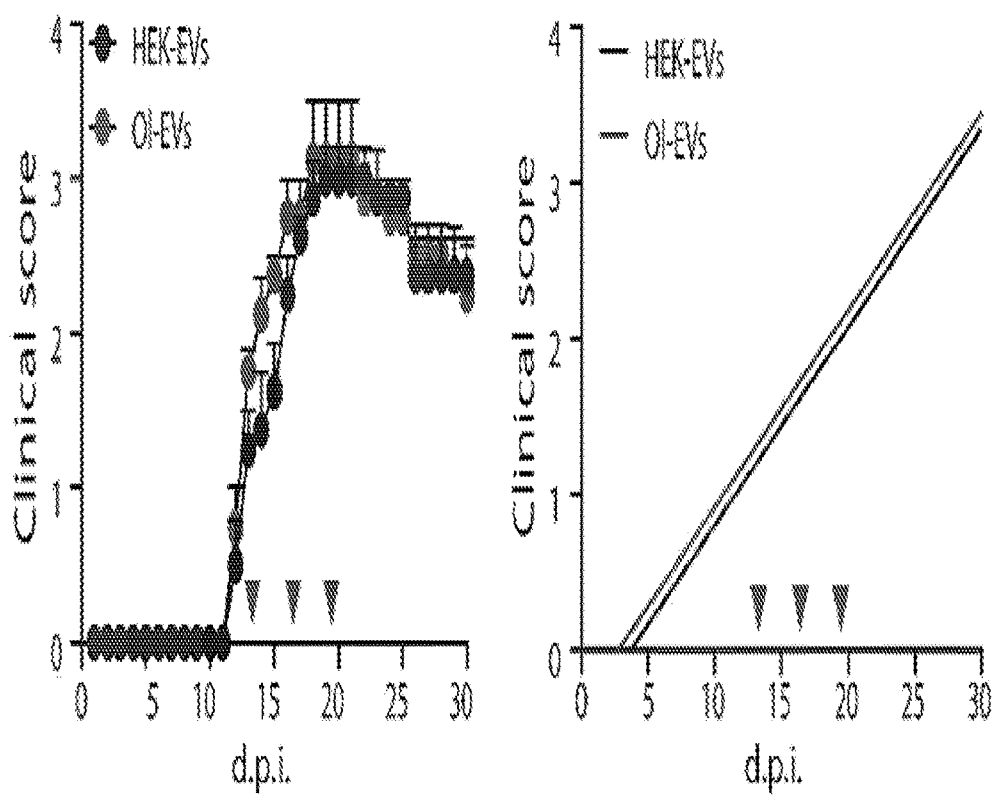
Figure 10G:
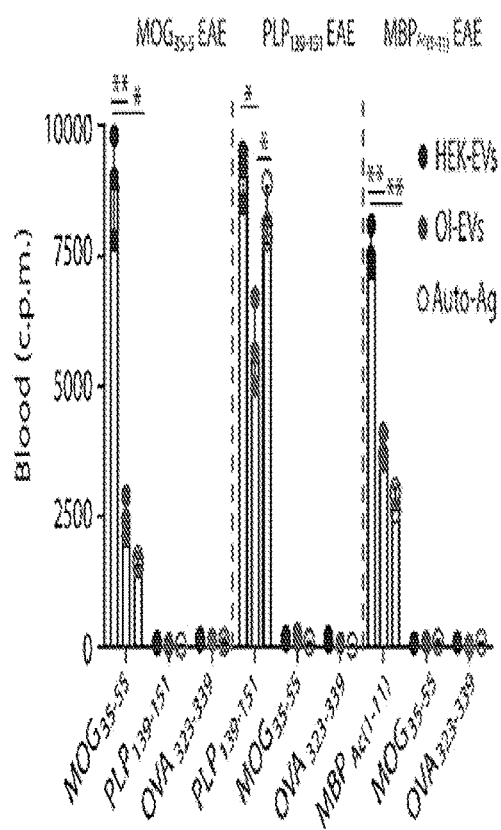
Figure 10H:
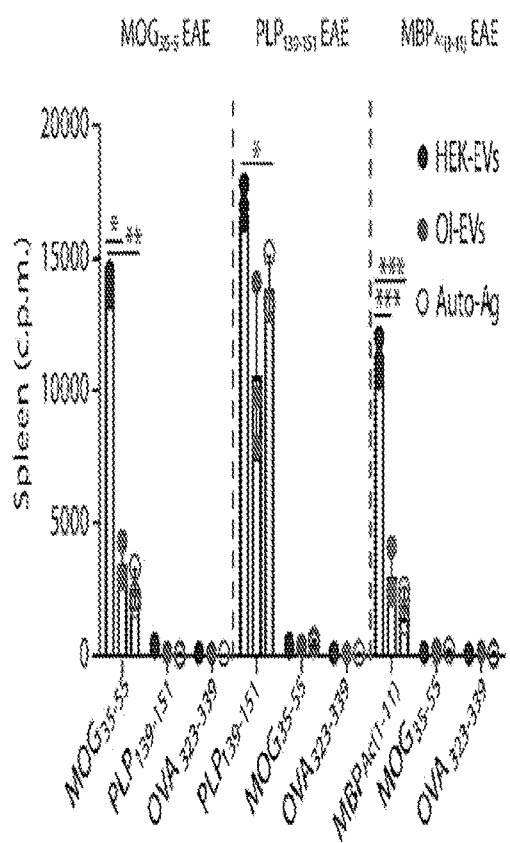

Example 2: Injection of Ol-EVs i.v. Suppresses Disease in Several Models of Active EAE To determine whether Ol-EVs can restore immune tolerance in EAE, the effect of Ol-EVs was tested in three models of active EAE, representing chronic (MOG$_{35-55}$/C57BL/6, MBP$_{Ac(1-11)}$/B10.PL) and relapsing-remitting (PLP$_{139-151}$/SJL) courses of clinical disease. Syngeneic Ol-EVs (Ol-EV/i.v.) in PBS were i.v. administered, three times, three days apart, before clinical disease developed, or after disease onset. Control mice were i.v. injected either with PBS (sham treated), immunizing peptides in PBS, or HEK-EVs in PBS. Ol-EVs significantly ameliorated clinical disease in both prophylactic and therapeutic regimens in all three EAE models, while HEK-EVs did not have an effect (FIGS. 2A-2F). The therapeutic effect lasted for at least 2 weeks after the last injection, when mice were sacrificed. In the PLP$_{139-151}$/SJL EAE model, Ol-EV treatment had significant therapeutic effect, but was somewhat less efficient in suppressing ongoing disease than in the other two EAE models. Relative resistance of PLP$_{139-151}$/SJL EAE to i.v. tolerance induction has been reported by other researchers (23). The therapeutic efficacy of Ol-EVs in adoptive EAE was also tested, in which recipient naïve C57BL/6 mice were transplanted with MOG$_{35-55}$-specific CD4$^+$ T cells derived from donor EAE mice. Ol-EVs treatment halted EAE progression (FIGS. 9A-9C), thus exhibiting similar therapeutic effect in both active and adoptive EAE. In contrast to i.v. administration, Ol-EVs injected subcutaneously (s.c.) did not ameliorate EAE (FIG. 10A, FIG. 10B), suggesting that the i.v. route might be crucial for induction of tolerance with Ol-EVs.

Consistent with amelioration of clinical disease, Ol-EV treatment protected EAE mice from neuropathological signs, demyelination, and axonal damage (FIG. 10C, FIG. 10D). Furthermore, Ol-EV treatment reduced numbers of infiltrating CD45$^+$ and CD4$^+$ cells in the CNS, and splenocytes had significantly diminished recall response to immunizing peptides (FIGS. 10E-10H).

Figure 2A:
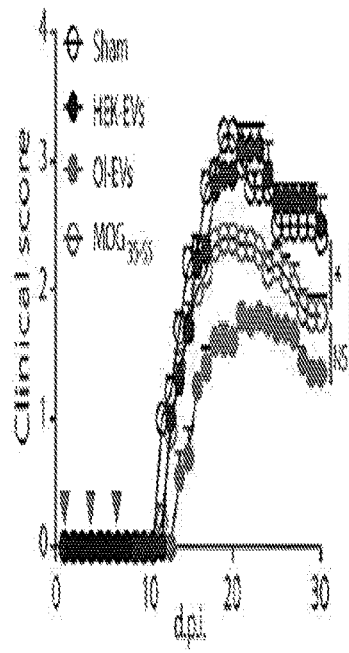
FIGS. 2A-2G illustrate that Ol-EV/i.v. suppress active EAE, prophylactically and therapeutically.
Figure 2B:
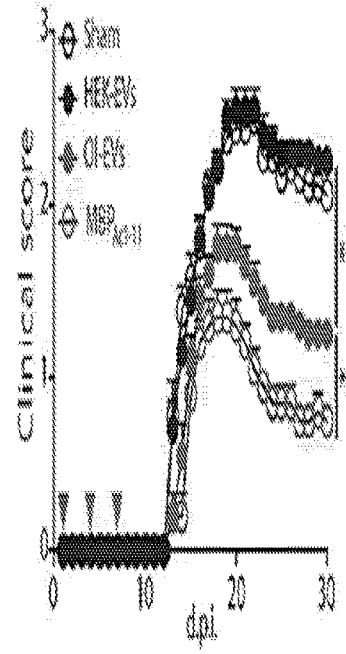
Figure 2C:
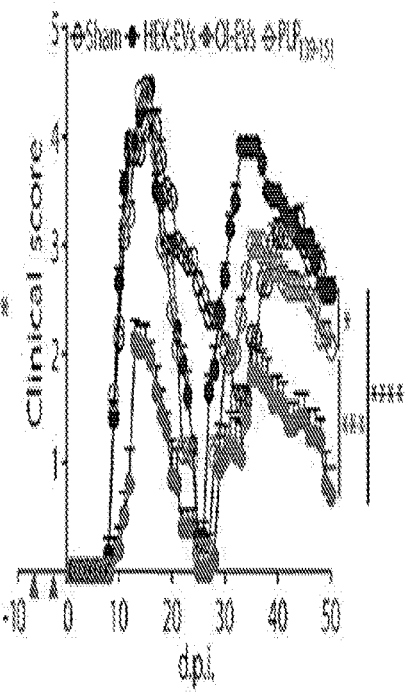
Figure 2D:
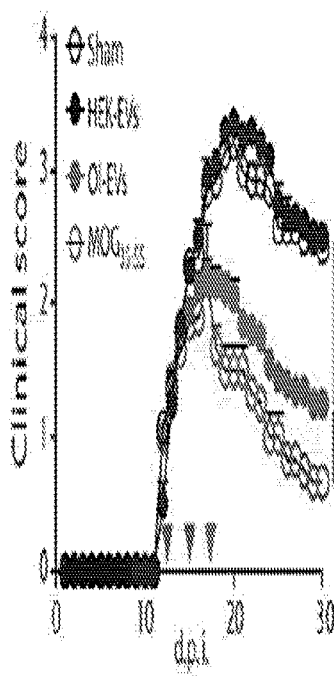
Figure 2E:
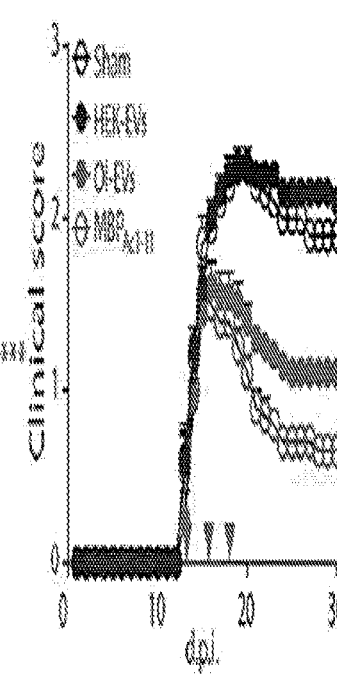
Figure 2F:
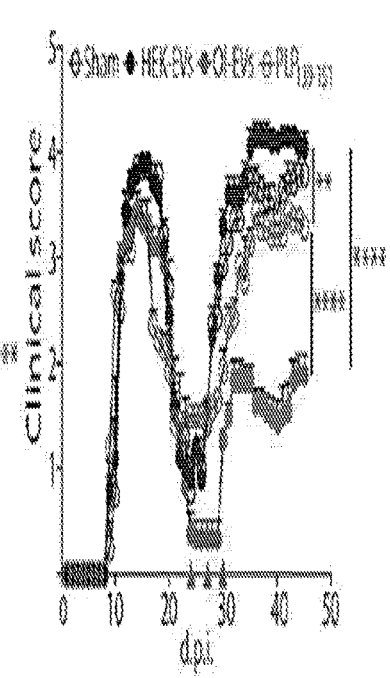
Figure 2G:
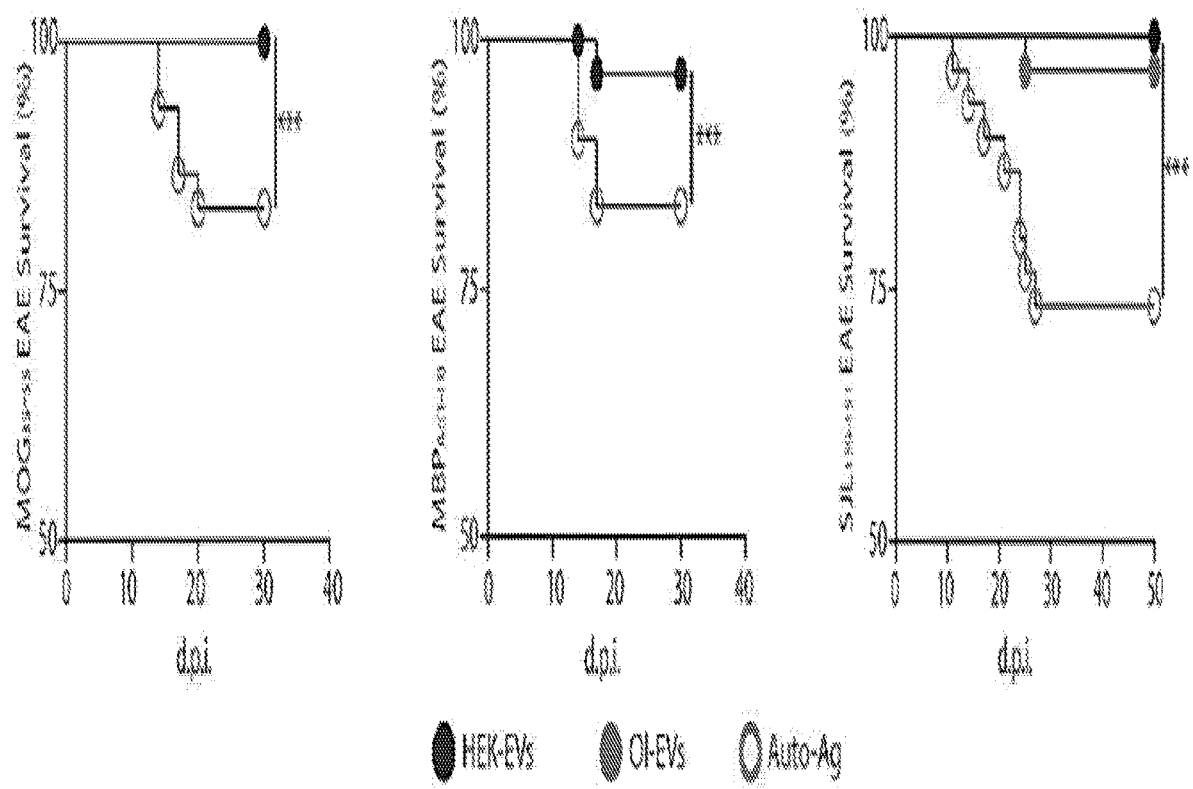

Even though i.v. injections of free encephalitogenic peptides produce significant therapeutic benefit in EAE, their repeated injections can induce anaphylactic shock and death in a number of mice (24). Overall, the effect of Ol-EVs was similar to that of peptides included in these experiments as a positive control; however, Ol-EV/i.v. proved to be safer than peptide/i.v. (FIG. 2G).

These data show that i.v. injections of Ol-EVs suppress ongoing clinical disease in multiple EAE models.

Example 3: The Suppressive Effect of Ol-EV in EAE is Myelin Ag-Dependent

Figure 3A:
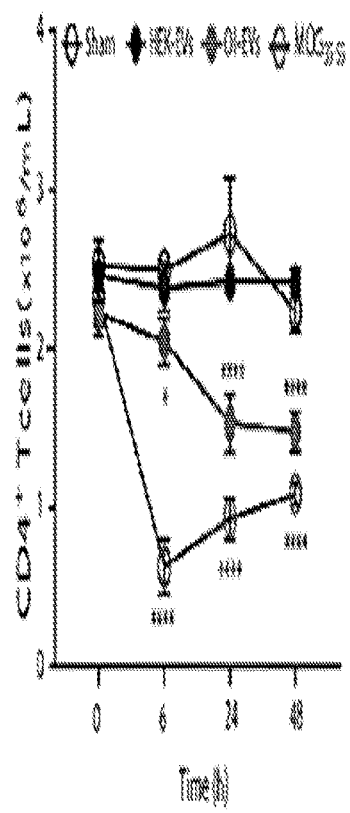
Figure 3B:
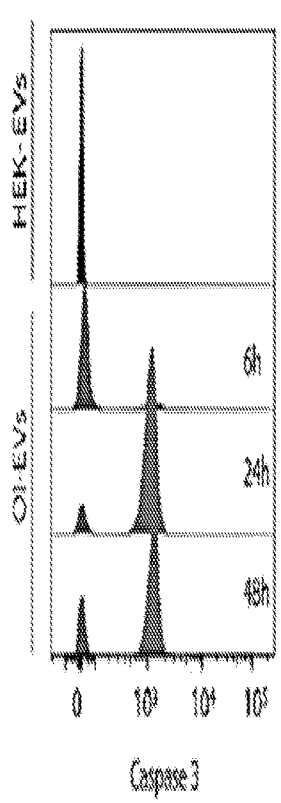
Figure 3C:
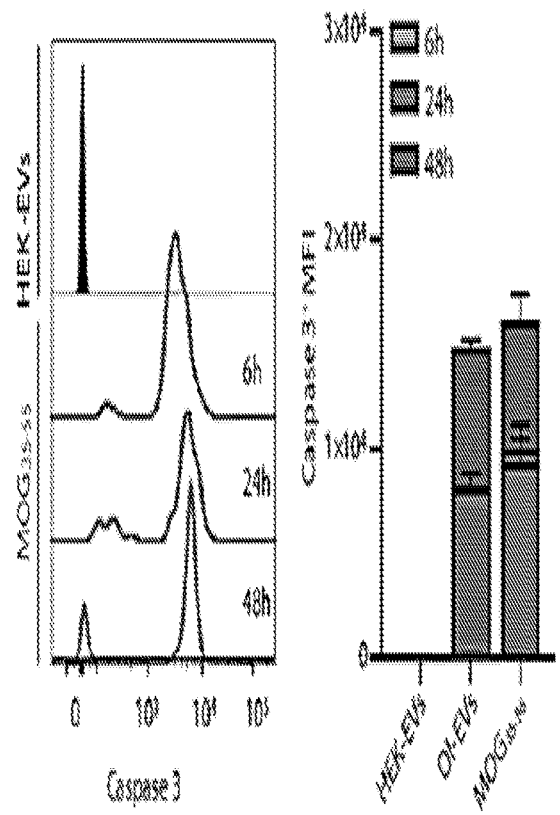
Figure 11A:
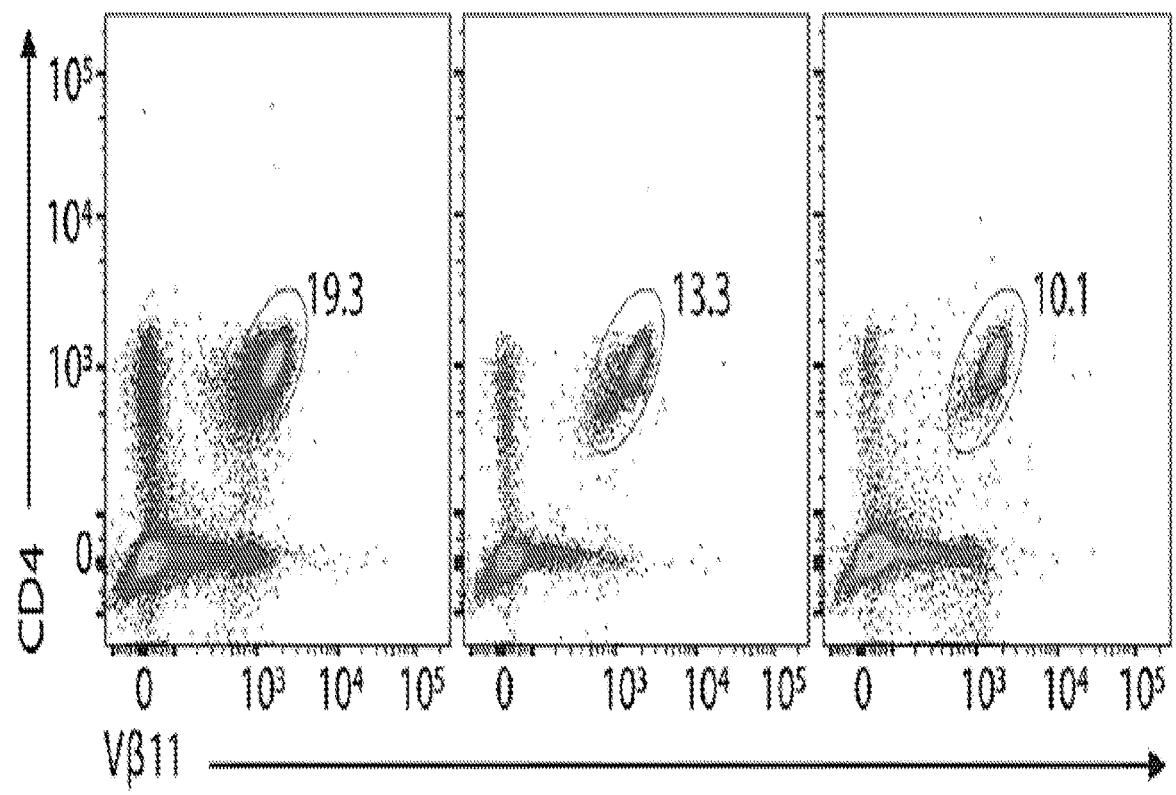
FIGS. 11A-11C illustrate that Ol-EV treatment induces caspase 3 expression in splenic 2D2 CD4⁺ T cells.
Figures 11B, 11C:
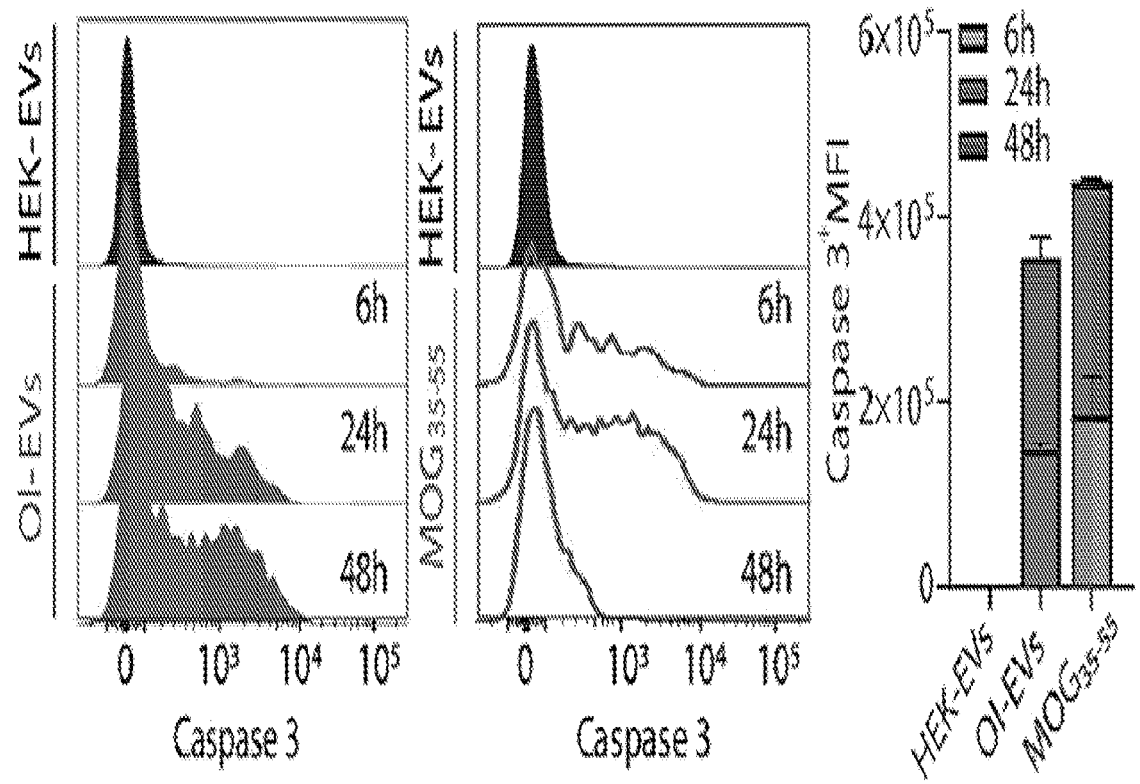

To elucidate the mechanisms whereby Ol-EVs suppress EAE, the temporal effects of Ol-EVs on blood T cells was first determined using MOG$_{35-55}$-specific T cell receptor transgenic 2D2 mice. Ol-EV/i.v. injection into 2D2 mice decreased the numbers of CD4$^+$ T cells in peripheral blood (FIG. 3A) and spleen (FIGS. 11A-11C), but with markedly slower kinetics than MOG$_{35-55}$/i.v. injection. CD4+ T cells became caspase 3$^+$ after 24 h of Ol-EV injection, while MOG$_{35-55}$ induced a robust caspase 3 expression after only 6 h (FIG. 3B, FIG. 3C). These data suggest that apoptosis of CD4$^+$ T cells was Ag-specific, as it was not induced by HEK-EVs treatment. The delay in the effects of Ol-EVs compared to free peptide can likely be attributed to the time required to process and present full-length MOG protein from the vesicles, while presentation of the injected MOG$_{35-55}$ peptide occurs through a different pathway and is more rapid. Possibly, the much larger quantity of injected free peptide compared to peptide generated by processing of MOG protein from the vesicles also facilitates a rapid response to the peptide.

Figure 3D:
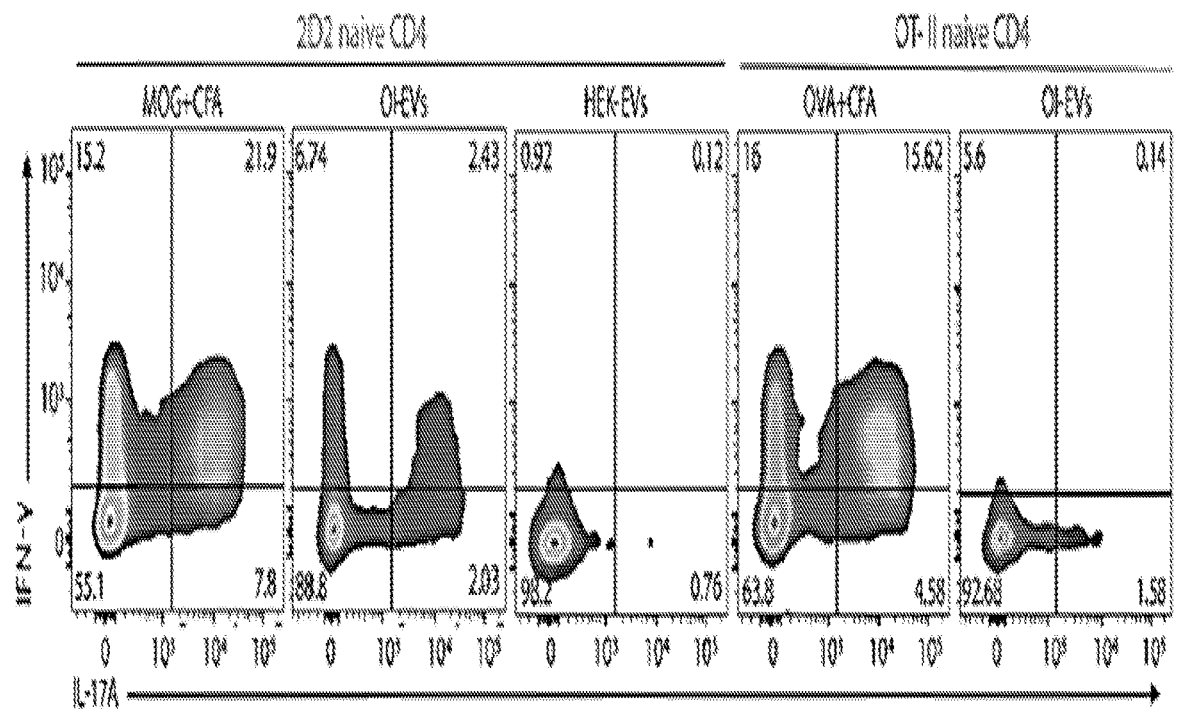
Figure 3E:
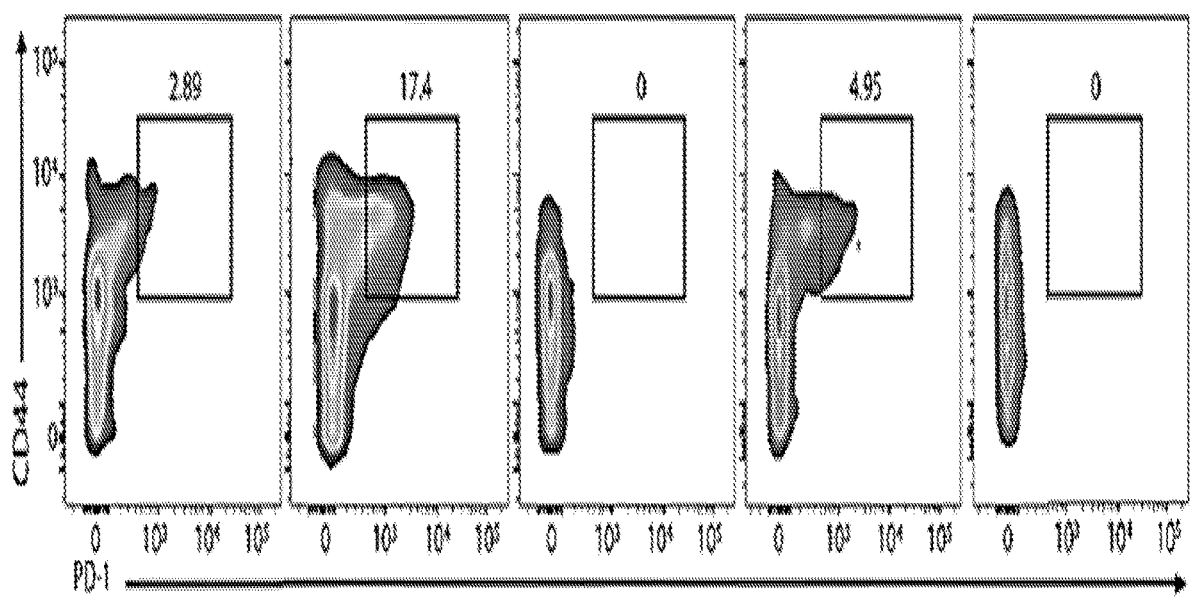

To further explore the effects of Ol-EVs on T-cell activation, CFSE-labeled naïve CD4$^+$ T cells specific for MOG (2D2) or OVA (OT-II) were adoptively transferred into CD45.1$^+$ naïve mice, and two days later we injected Ol-EV/i.v. The effect of Ol-EVs was Ag-specific, as it induced activation and proliferation only of MOG-specific, but not OVA-specific CD4$^+$ T cells, as determined by their IFN-γ and IL-17A production, (FIG. 3D, FIG. 3F) and CFSE dilution (FIG. 3G, FIG. 3H). Furthermore, Ol-EVs induced significant PD-1 expression on 2D2, but not on OT-II CD4$^+$ T cells (FIG. 3E, FIG. 3I), Similar results were obtained using CD4$^+$ T cells of MBP$_{Ac(1-11)}$ T cell receptor transgenic mice (25) (data not shown), demonstrating that these effects are not limited to MOG-specific T cells. Overall, these data show that Ol-EVs deliver myelin Ags that are processed and presented to CD4$^+$ T cells in vivo.

Figure 3J:
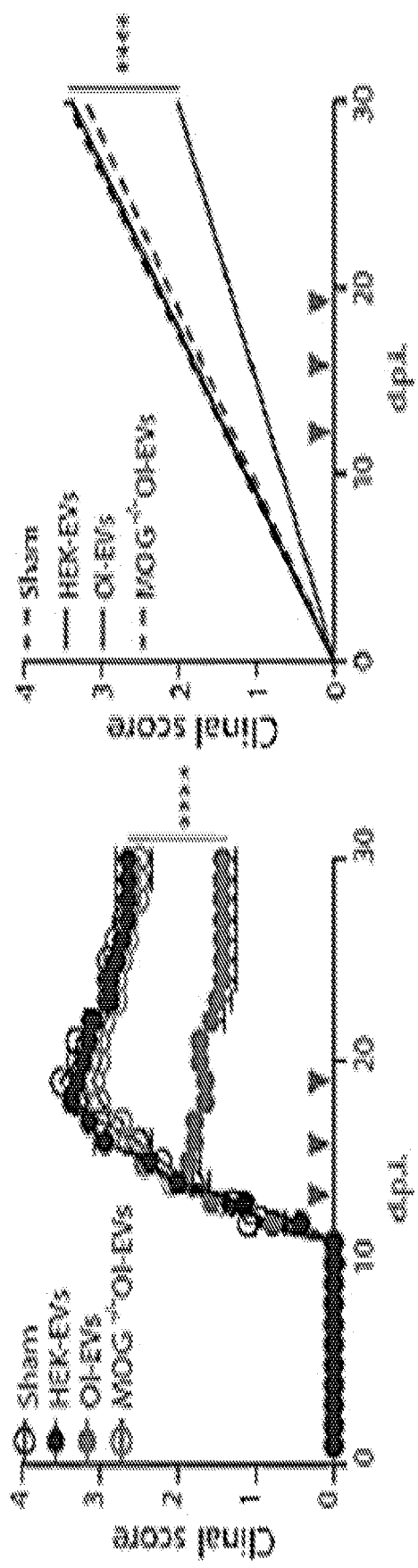
Figure 3K:
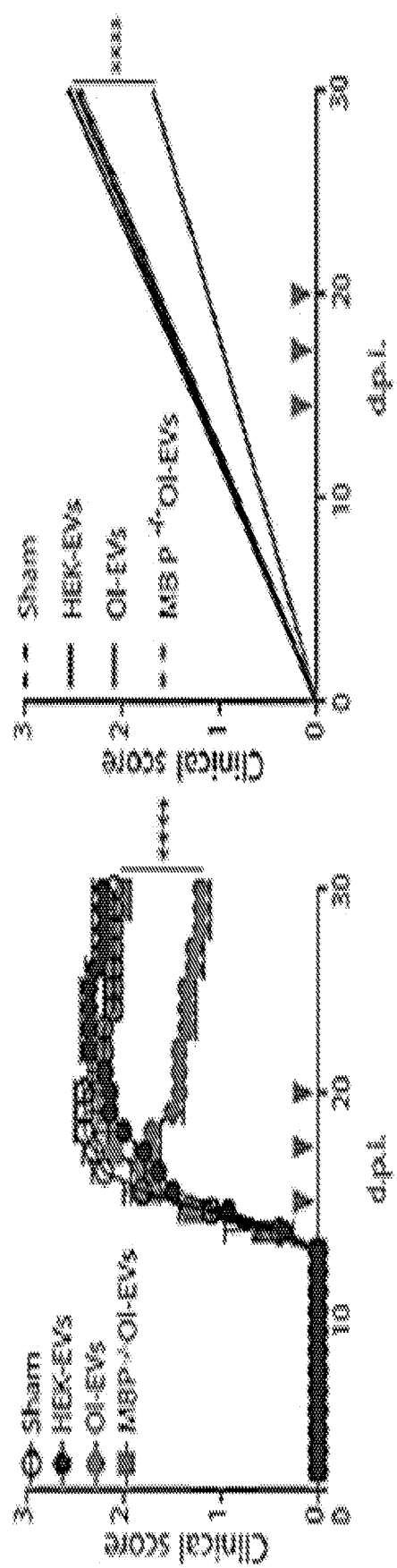
Figure 12A:
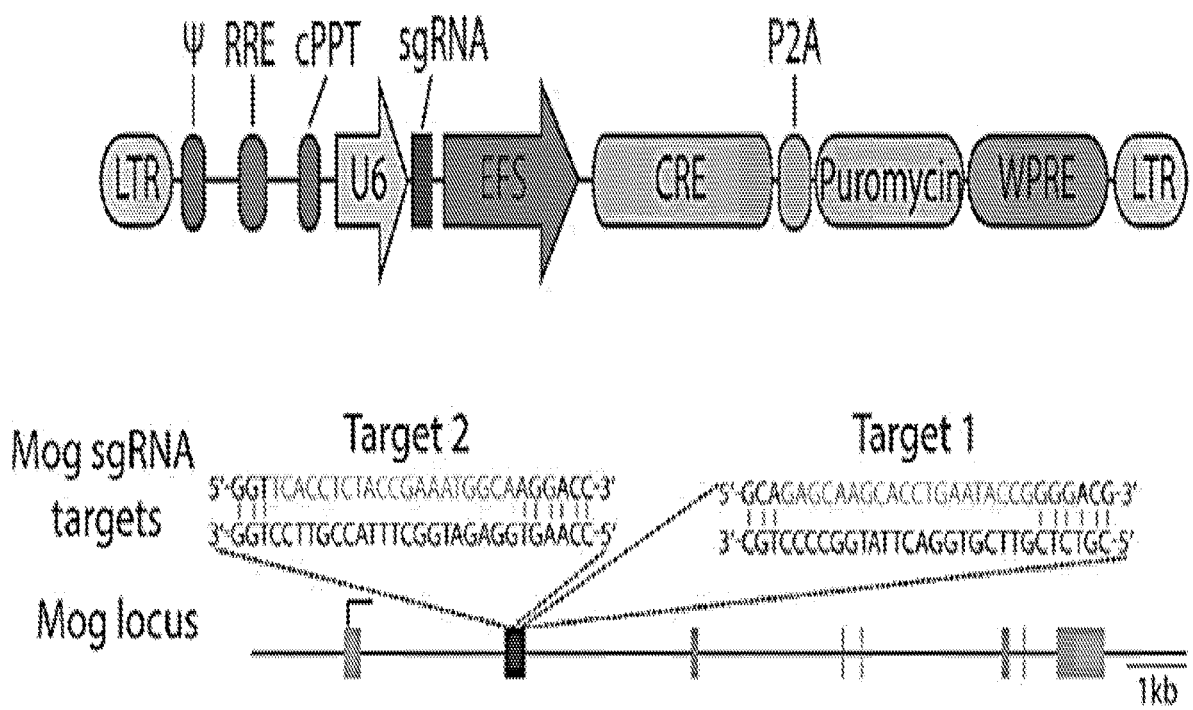
FIGS. 12A-12E illustrate knockout of MOG in Ols.
Figure 12B:
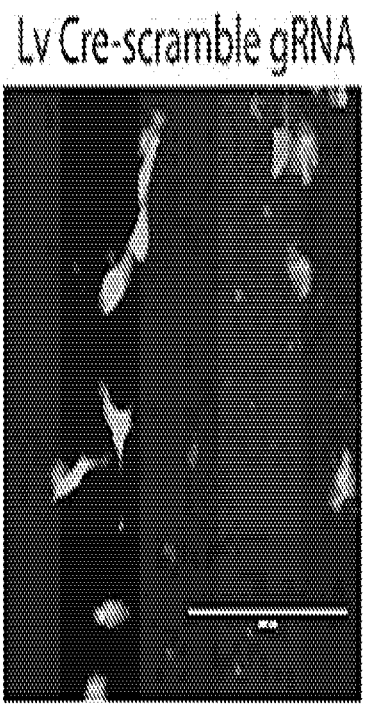
Figure 12C:
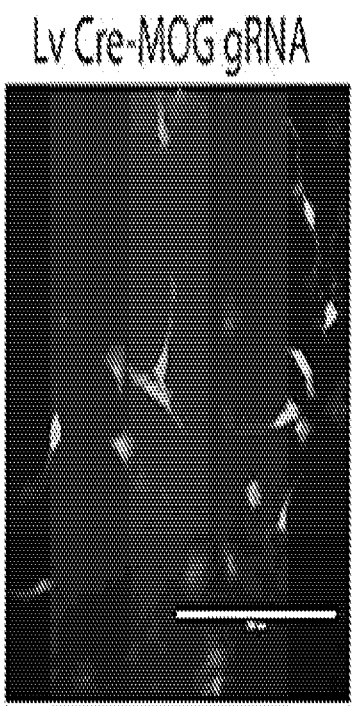
Figure 12D:
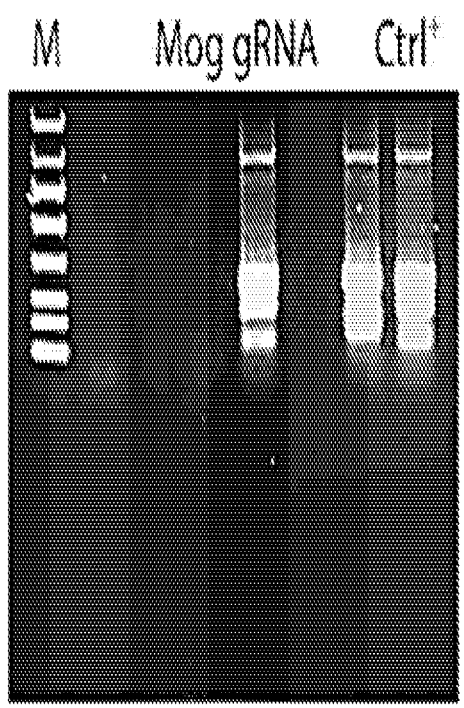
Figure 12E:
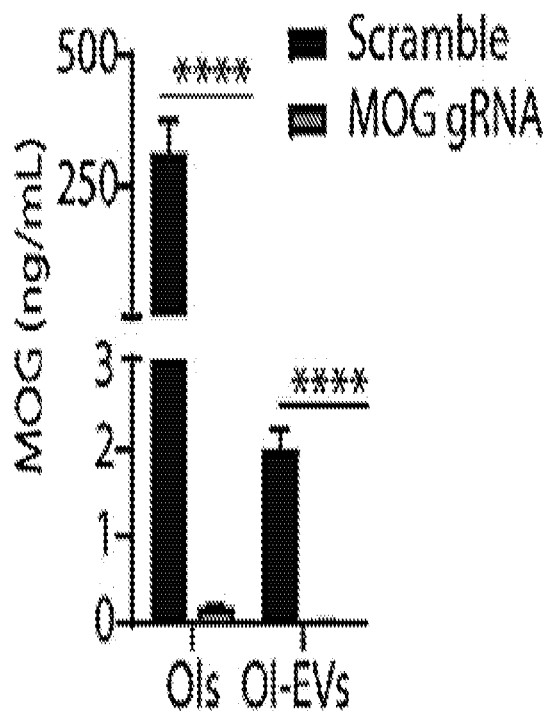

Finally, to determine if Ol-EV/i.v. suppress EAE in a myelin Ag-dependent manner, C57BL/6/MOG$_{35-55}$-EAE mice were injected with MOG-deficient Ol-EVs, while B10.PL/MBP$_{Ac(1-11)}$-EAE mice were injected with MBP-deficient Ol-EVs. MOG-deficient Ol-EVs were generated using the CRISPR/Cas9 system; Ol-EVs from Ols derived from Cas9-transgenic mice that were transduced with lentivirus containing MOG-specific sgRNA and Cre, while control Ol-EVs were derived from Ols of Cas9-transgenic mice that were transduced with lentivirus containing scramble sgRNA and Cre (FIGS. 12A-12C). MOG knock-out, in Ols and derived EVs, was confirmed by PCR and ELISA (FIG. 12D, FIG. 12E). MBP-deficient Ol-EVs were generated from Ols of "shiverer mice", which are MBP$^{-/-}$ (26). In both EAE models, myelin Ag-deficient Ol-EVs failed to suppress disease (FIG. 3J, FIG. 3K), demonstrating that Ol-EV/i.v. suppress EAE in an Ag-dependent manner.

Figure 13A:
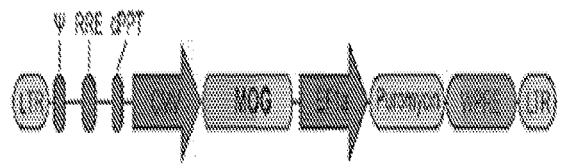
FIGS. 13A-13M illustrate that the therapeutic effect of Ol-EVs in EAE is dependent on myelin Ag (FIG. 13A) Lentivirus plasmid for MOG expression in HEK cells.
Figure 13B:
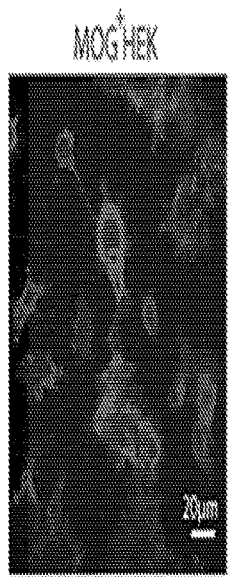
Figure 13C:
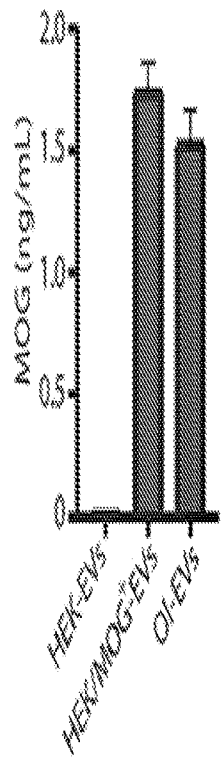
Figure 13D:
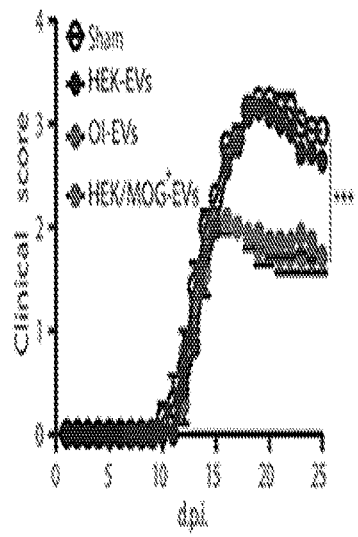
Figure 13E:
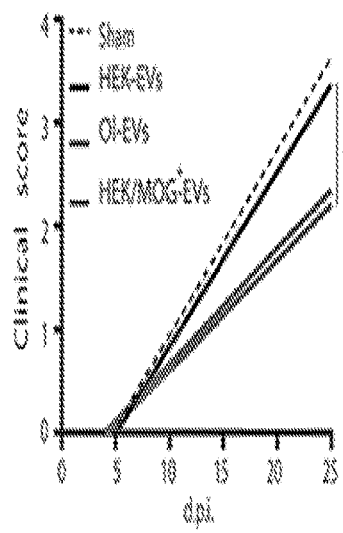
Figure 13F:
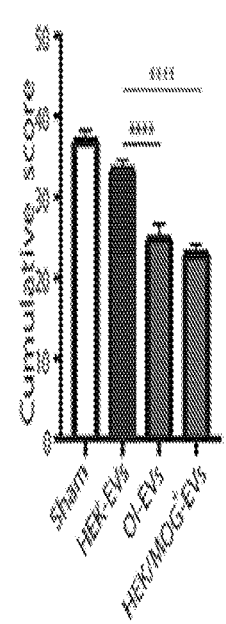
Figures 13G, 13H, 13I:
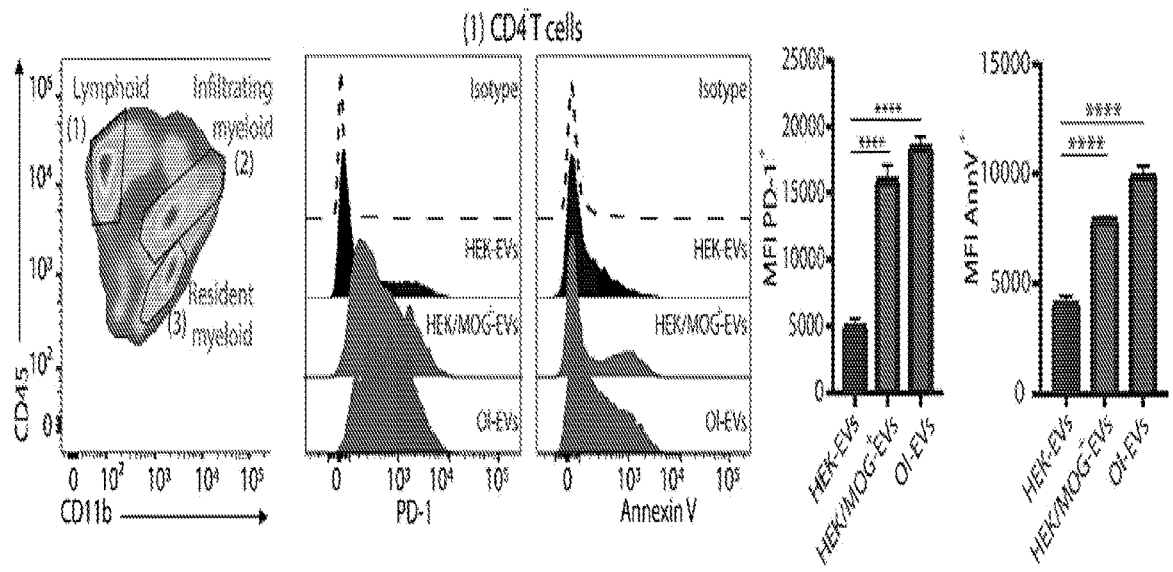

To test if the suppressive effect of Ol-EVs on EAE is solely dependent on myelin Ag, and independent of other components present in Ol-EVs, specifically produced by Ols, HEK cells were engineered to express mouse MOG and it was confirmed that EVs of these cells also contain MOG (FIGS. 13A-13C). Next, C57BL/6/MOG$_{35-55}$-EAE mice were injected with HEK/MOG-EVs or Ol-EVs. Both treatments had a similar suppressive effect on EAE (FIGS. 13D-13F), confirming that the effect of Ol-EVs is dependent on myelin Ag present in them, but not on other components specifically produced by Ols.

Example 4: Ol-EV/i.v. Are Preferentially Uptaken by Monocytes and Neutrophils

Figure 14:
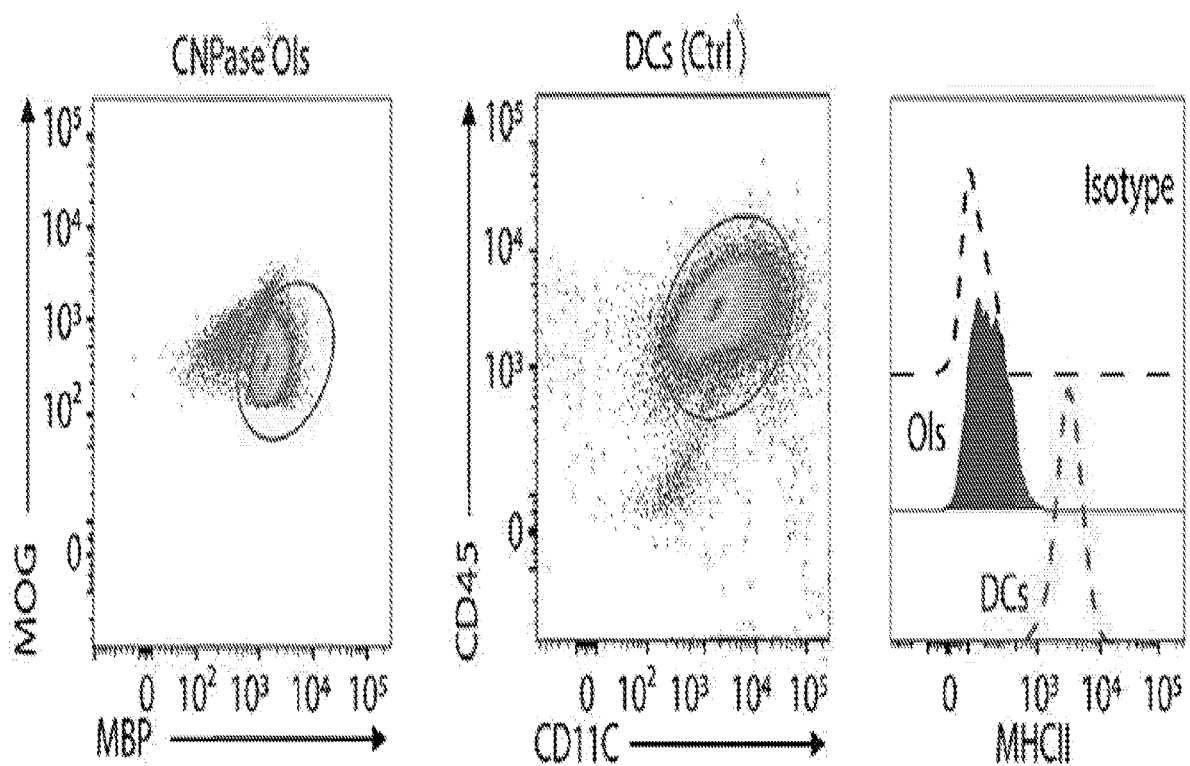
FIG. 14 illustrates that Ols in culture express little MHC class II. Flow cytometry plots comparing MHCII expression by Ols that had developed in vitro from OPCs, and bone marrow-derived DCs.

Cultured Ols express very low levels of MHC class II molecules, as shown by flow cytometry analysis (FIG. 14), or Ol-EVs do not express these molecules, as determined by mass spectrometry (data not shown). This is typical for Ols under non-inflammatory conditions (27, 28), eliminating the possibility that Ol-EVs directly present myelin Ags to CD4$^+$ T cells. It was hypothesized that i.v. injected Ol-EVs are uptaken by phagocytic APCs, which process their proteins and present them on MHC class II to encephalitogenic Th cells.

Figure 4A:
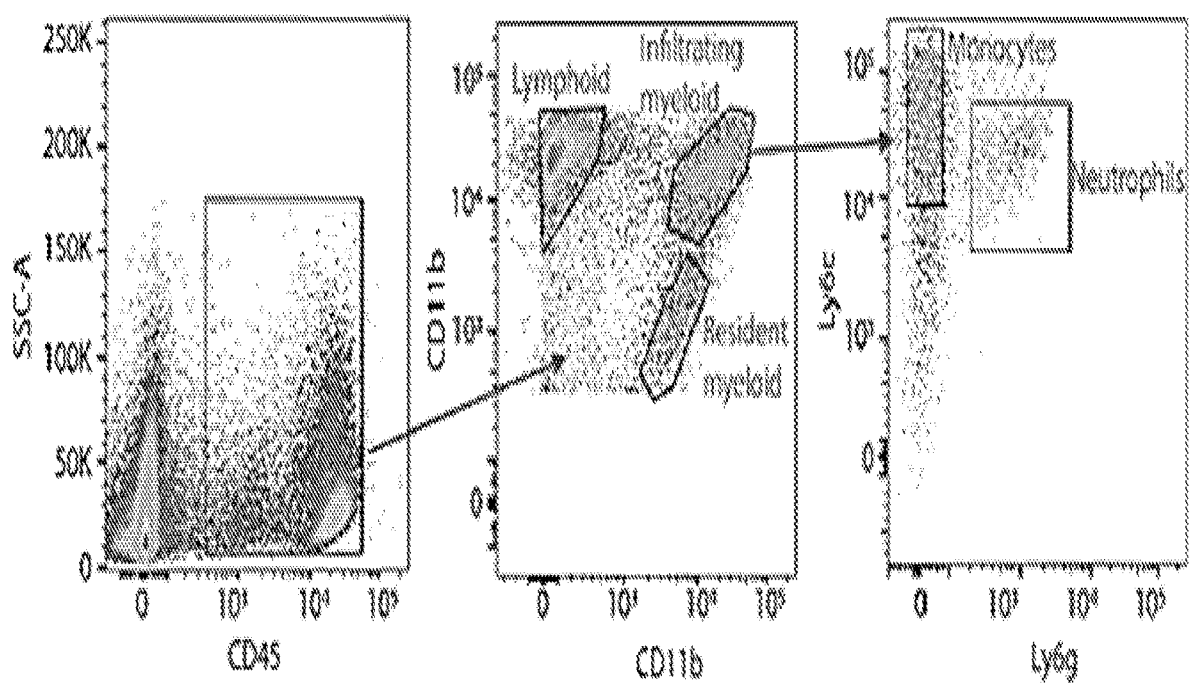
Figure 4B:
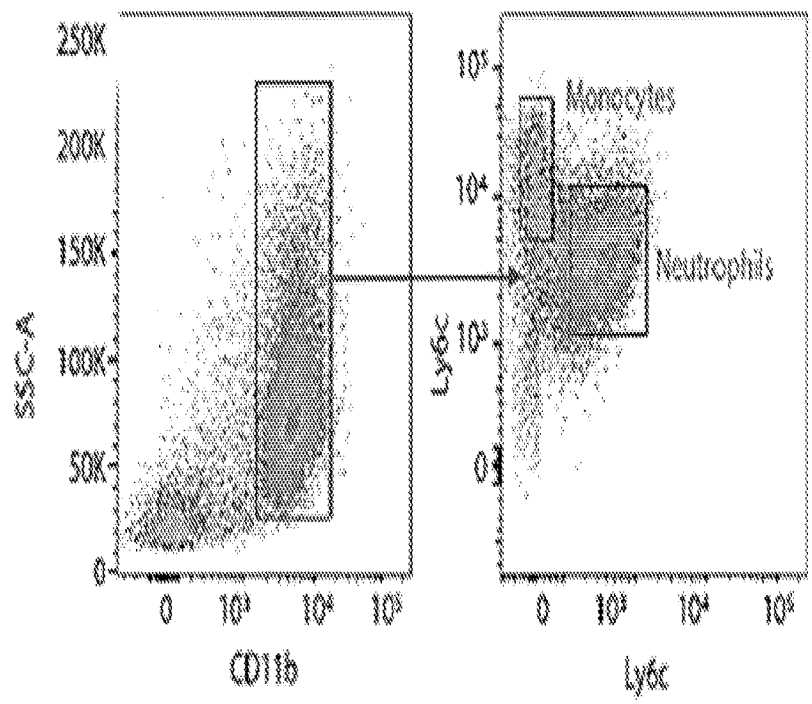
Figure 4C:
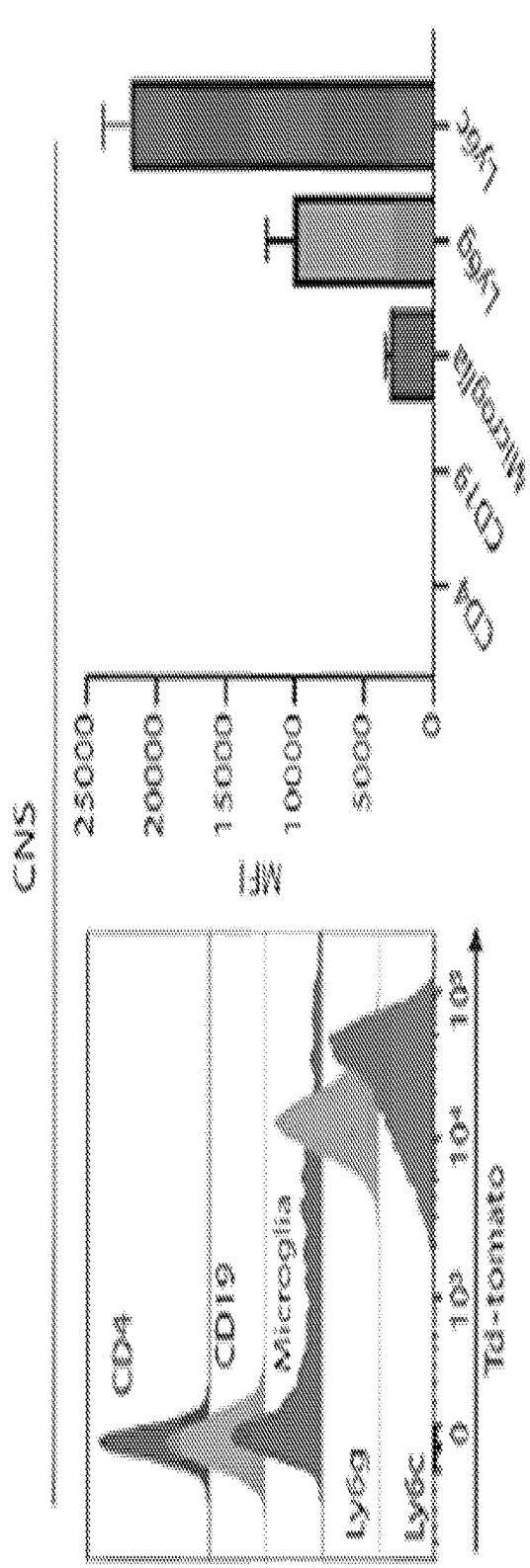
Figure 4D:
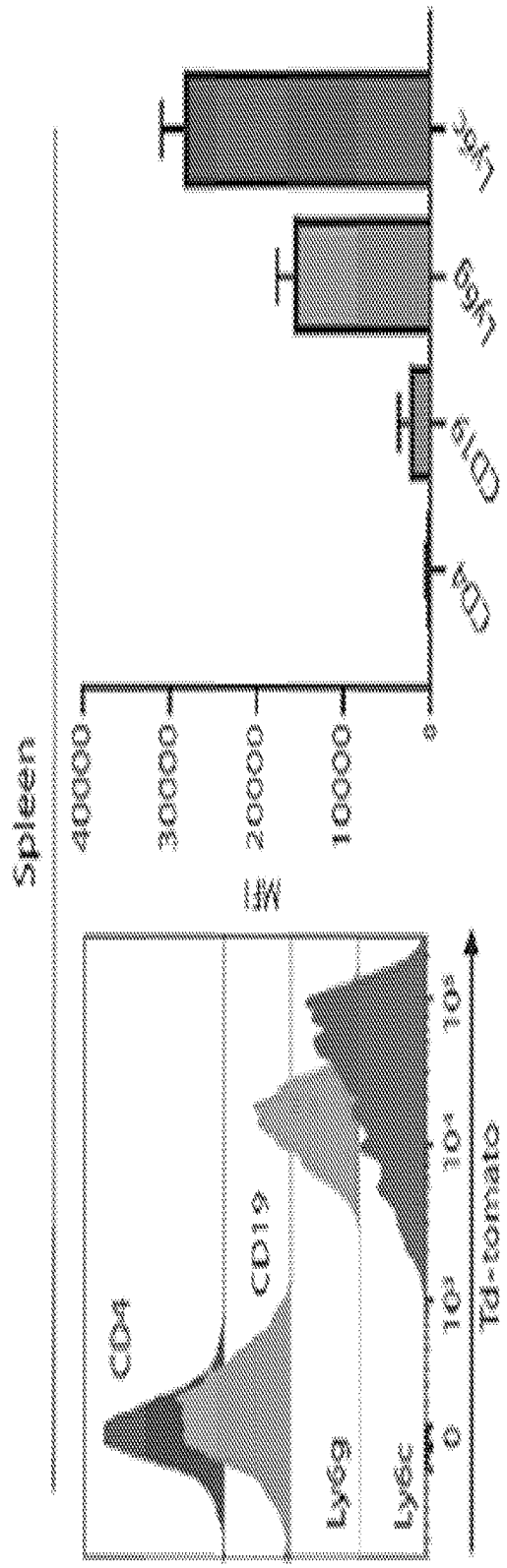
Figures 15A, 15B:
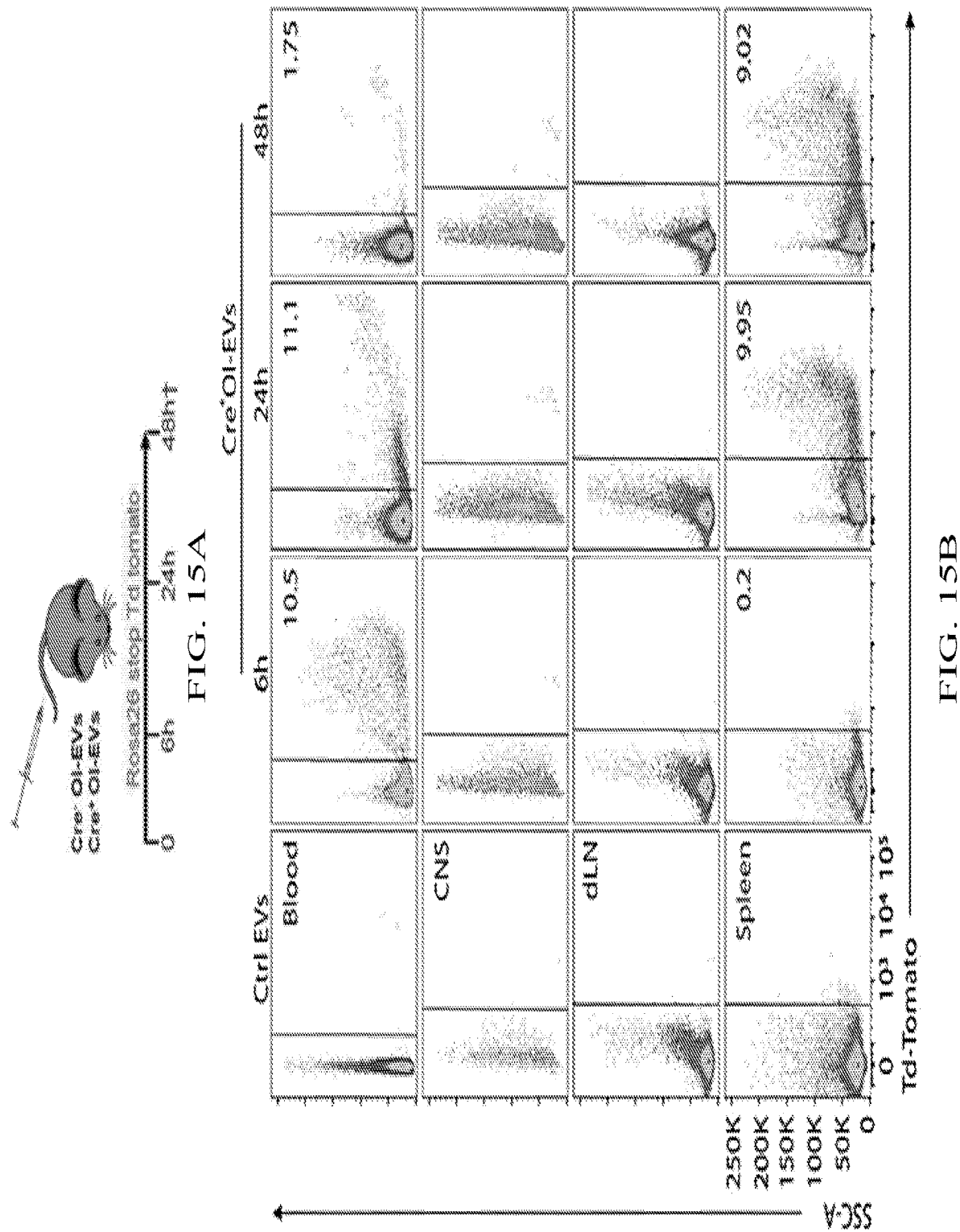
Figures 17A, 17B:
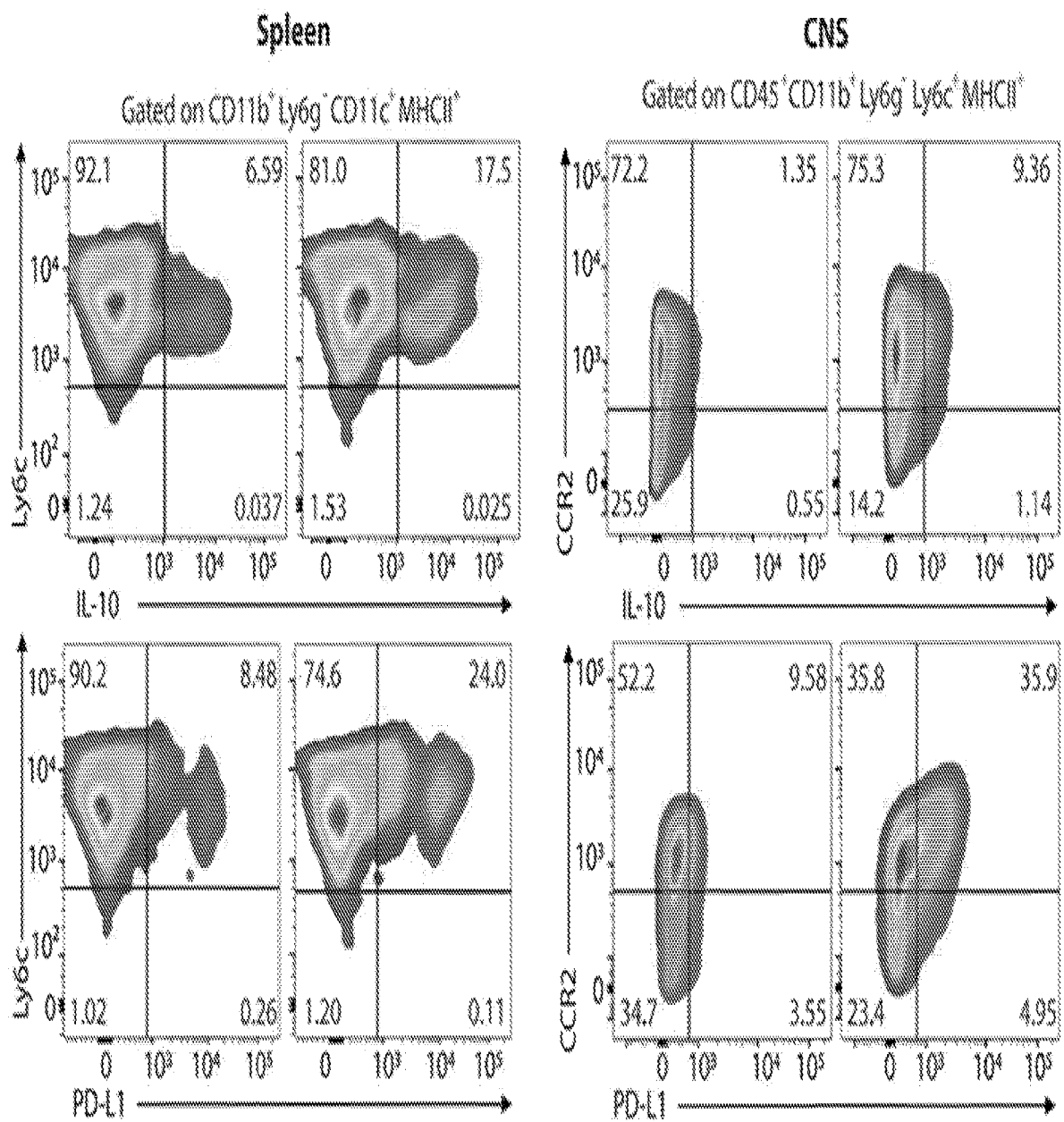
FIGS. 17A-17B illustrate Ol-EVs treatment induces IL-10 and PD-L1 expression in monocytes. Flow cytometry analysis of monocytes (CD11b+ Ly6g- Cd11c+ MHCII+) from the spleen (FIG. 17A) and CNS (FIG. 17B) of mice with EAE injected, at disease onset for three times, with HEK-EVs or Ol-EVs. This experiment was conducted twice with similar outcome (n=5 mice/group each experiment).

To unambiguously identify which cells uptake Ol-EV/i.v. and present myelin Ags, Ol-EVs containing Cre recombinase were generated, by transducing OPCs with Cre-expressing lentivirus (data not shown). Cre$^+$ Ol-EVs were i.v. injected into naïve Rosa26.stop.Td-tomato reporter mice and mice were sacrificed at different times post-injection (6, 24, and 48 h) (FIG. 15A, FIG. 15B). The vast majority of Td-tomato$^+$ cells were splenic and blood phagocytes, such as monocytes (43%), neutrophils (28%), and different DC subsets (26%), whereas only 4% of B cells and almost no CD3$^+$ T cells were Td-tomato$^+$ (FIG. 15C, FIG. 15D). No Td-tomato$^+$ cells were found in the lymph nodes (LNs) or CNS, demonstrating that Ol-EVs do not reach LNs or cross intact blood-brain barrier (BBB). However, in the CNS of EAE mice, where the integrity of BBB has been compromised (29), a large number of Td-tomato$^+$ cells were found, including virtually all monocyte-derived DCs (moDCs; CD11b$^+$CD11c$^+$Ly6c$^{high}$CCR2$^+$Ly6g$^-$) and neutrophils (CD11b$^+$CD11c$^-$Ly6c$^+$Ly6g$^+$), while only a small portion of microglia (CD45$^{int}$CD11b$^+$Ly6c$^-$) was Td-tomato$^+$ (FIG. 4C). No Td-tomato$^+$ cells were found in lymphoid populations (CD4$^+$, CD8$^+$, and CD19$^+$), or in neurons, astrocytes, and Ols (data not shown). Similar to naïve mice (FIG. 15A, FIG. 15B), the vast majority of Td-tomato$^+$ cells among splenocytes were moDCs and neutrophils, and a small number of B cells was Td-tomato$^+$ (FIG. 4D). These data show that in EAE mice, cells that uptake Ol-EV/i.v. are mostly monocytes/moDCs, classical DCs (cDCs), and neutrophils found in the peripheral blood, spleen, and CNS.

To determine which phagocytic population, moDCs, neutrophils, and/or cDCs, mediates EAE suppression by OL-EVs, neutrophils were depleted with anti-Ly6g Ab during Ol-FVs treatment of EAE mice (~75% reduction of neutrophil numbers in the blood; FIG. 16A, FIG. 16B). The depletion of neutrophils itself had no effect on disease course (FIG. 4E), consistent with findings that neutrophil depletion after disease onset has no effect on EAE (30). Surprisingly, the depletion of neutrophils did not affect EAE suppression by Ol-EVs (FIG. 4E), suggesting that neutrophils do not mediate the effect of Ol-EVs.

Next, the role of cDCs (CD11c$^+$MHCII$^+$Zbtb46$^+$) was investigated. Radiation-induced Zbtb46-DTR (CD45.2$^+$)→CD45.1$^+$ bone marrow chimera mice were first generated to limit the effect of diphtheria toxin (DTX) to cDCs (31) (FIG. 16C, FIG. 16D) and after 6 weeks of reconstitution EAE was induced in these mice. DTX was injected i.p., starting after disease onset and then every other day during the EV treatment and confirmed that DTX treatment reduced splenic cDCs (FIG. 16E, FIG. 16F). The depletion of cDCs was also dispensable for EAE suppression by Ol-FVs (FIG. 4F). The role of monocytes could not be directly tested, as their depletion would have abrogated EAE development (32). Taken together, these data suggest that monocytes/moDCs mediate EAE suppression by Ol-EVs, as virtually all of these cells in the inflamed CNS acquire Ol-EVs and have the capacity to present myelin Ags in the context of MHC class II.

Example 5: Ol-EV/i.v. Induce Immunosuppressive Monocytes

Figure 18A:
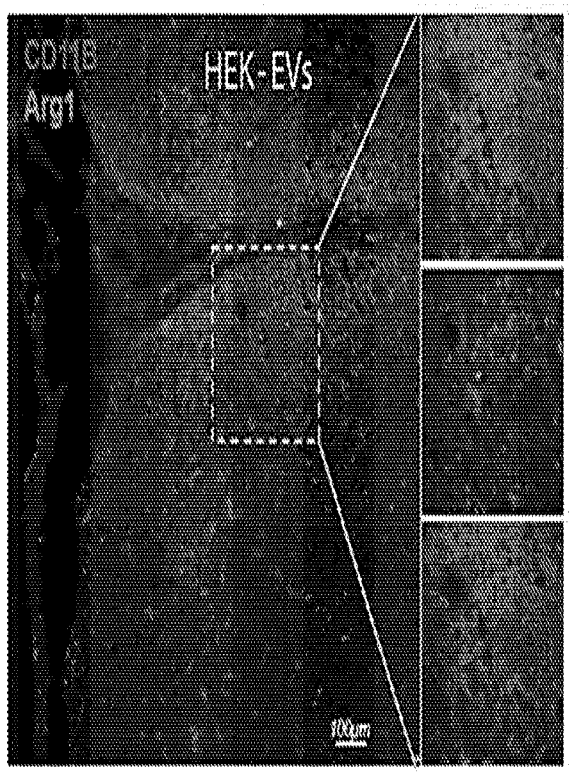
FIGS. 18A-18D illustrate that PD-L2 is not required for EAE suppression by Ol-EVs.
Figure 18B:
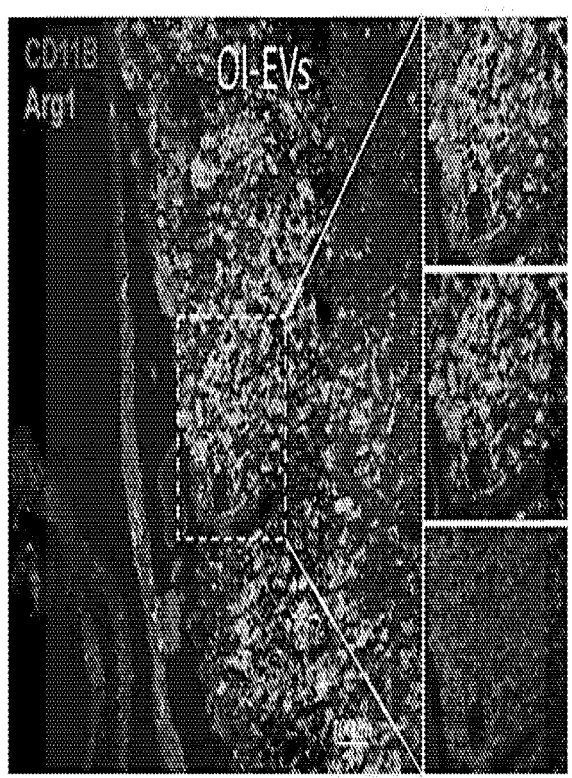

Given that the data indicated that monocytes/moDCs mediate the effects of Ol-EVs in EAE, their phenotype was then examined. EAE mice were i.v. injected with Ol-EVs, their splenic and CNS Td-tomato+ monocytes were FACS sorted (same strategy as shown in FIG. 4A, FIG. 4B) and their mRNAs analyzed. Compared to controls, Ol-EVs treatment induced significant upregulation of several regulatory genes: Arg1, Pdl1, Il10, Irf1, Havcr2 (tim-3), and Stat3, among others (FIG. 5A). Interestingly, monocytes from the CNS, but not spleen, also had significantly reduced expression of some pro-inflammatory mediators (Ccl2, Tnf, Inos, Il23a, and Il1b) (FIG. 5A) that play important roles in EAE pathogenesis (33). Some of these findings were validated by immunostaining for corresponding proteins. EAE mice treated with Ol-EVs had a significantly higher percentage of IL-10+ and PD-L1+ monocytes, both in the spleen and CNS (FIG. 5B, FIG. 5C, and FIG. 17A, FIG. 17B), and spinal cords of EAE mice that received Ol-EVs had a greater number of Arg1+CD11b+ cells (FIG. 18A, FIG. 18B).

Figure 5D:
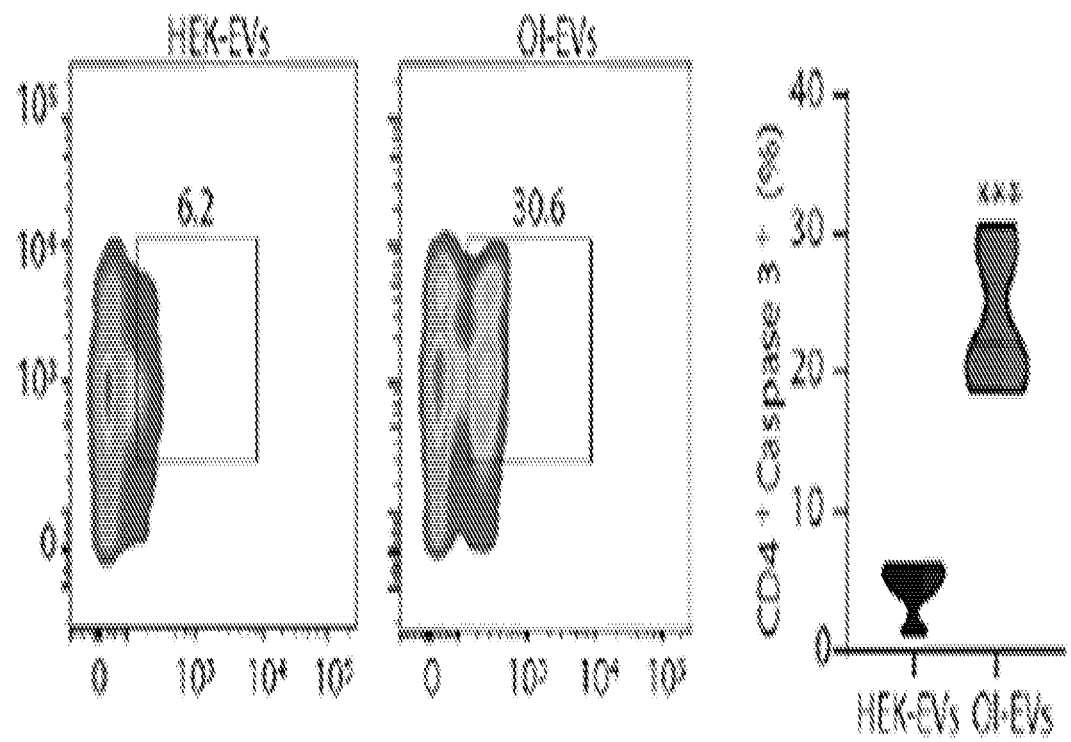
Figure 5E:
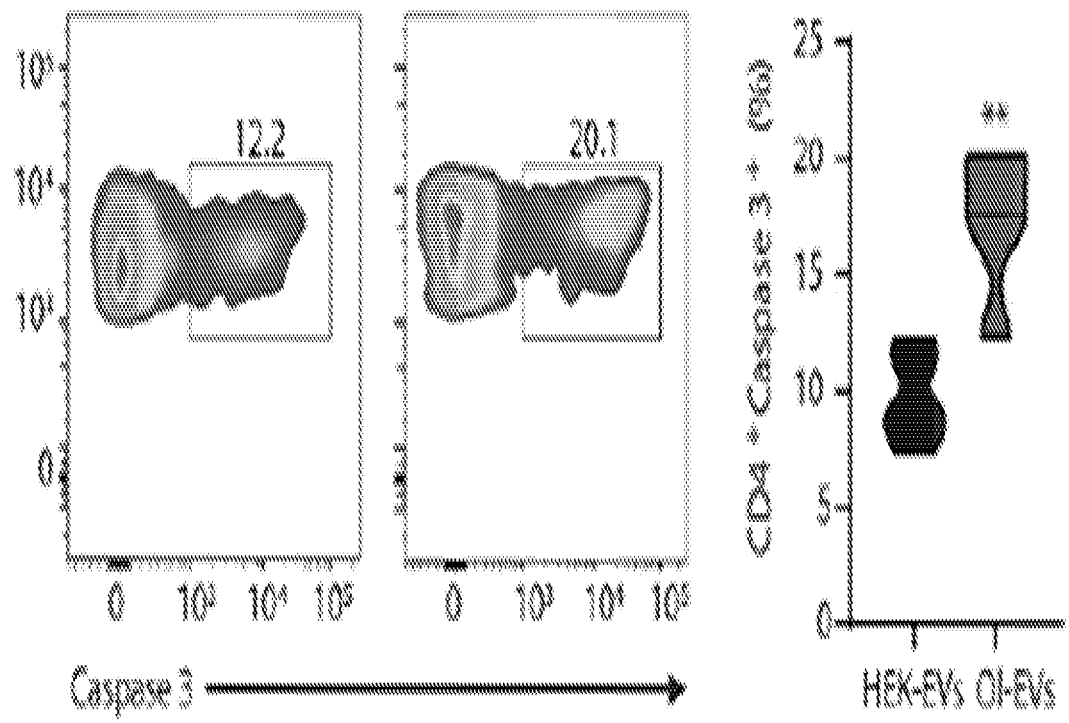
Figure 5F:
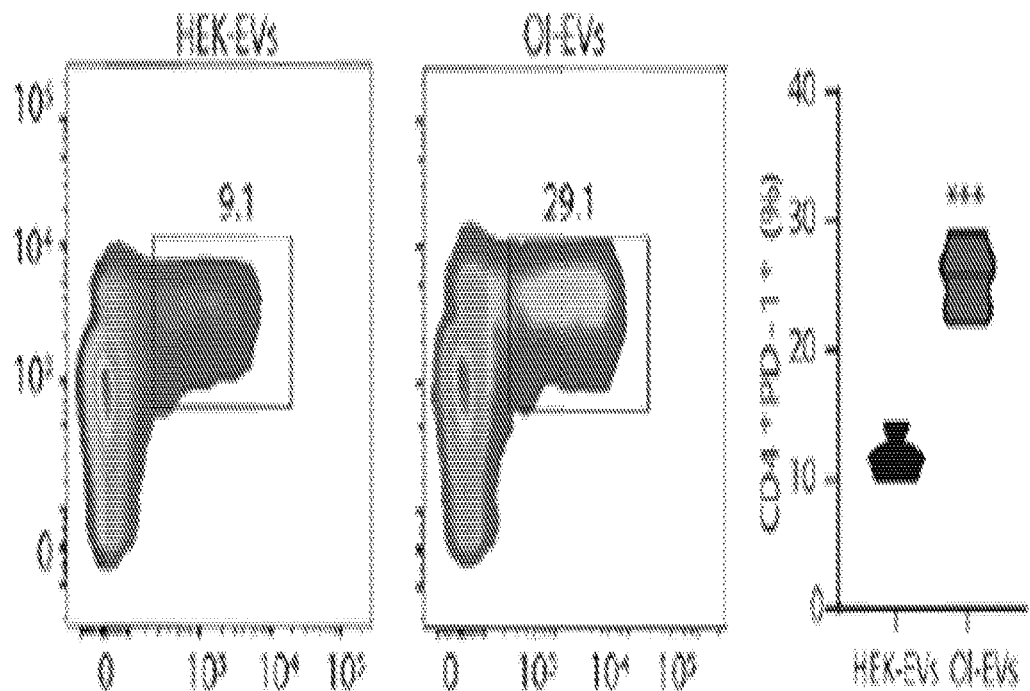
Figure 5G:
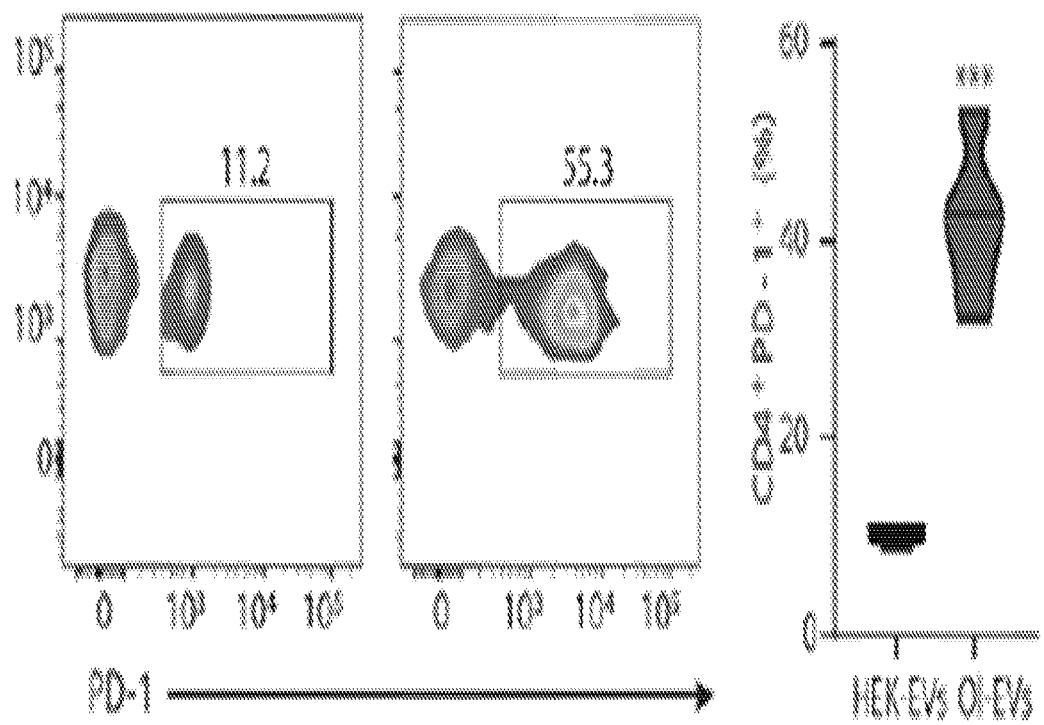
Figures 13J, 13K:
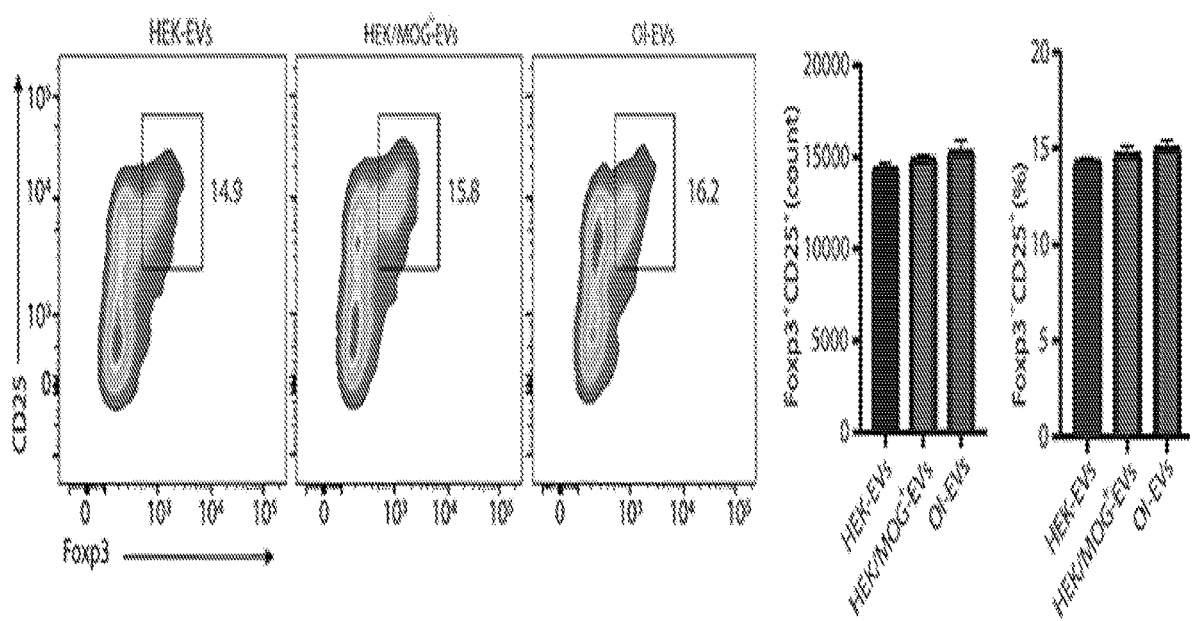
Figures 13L, 13M:
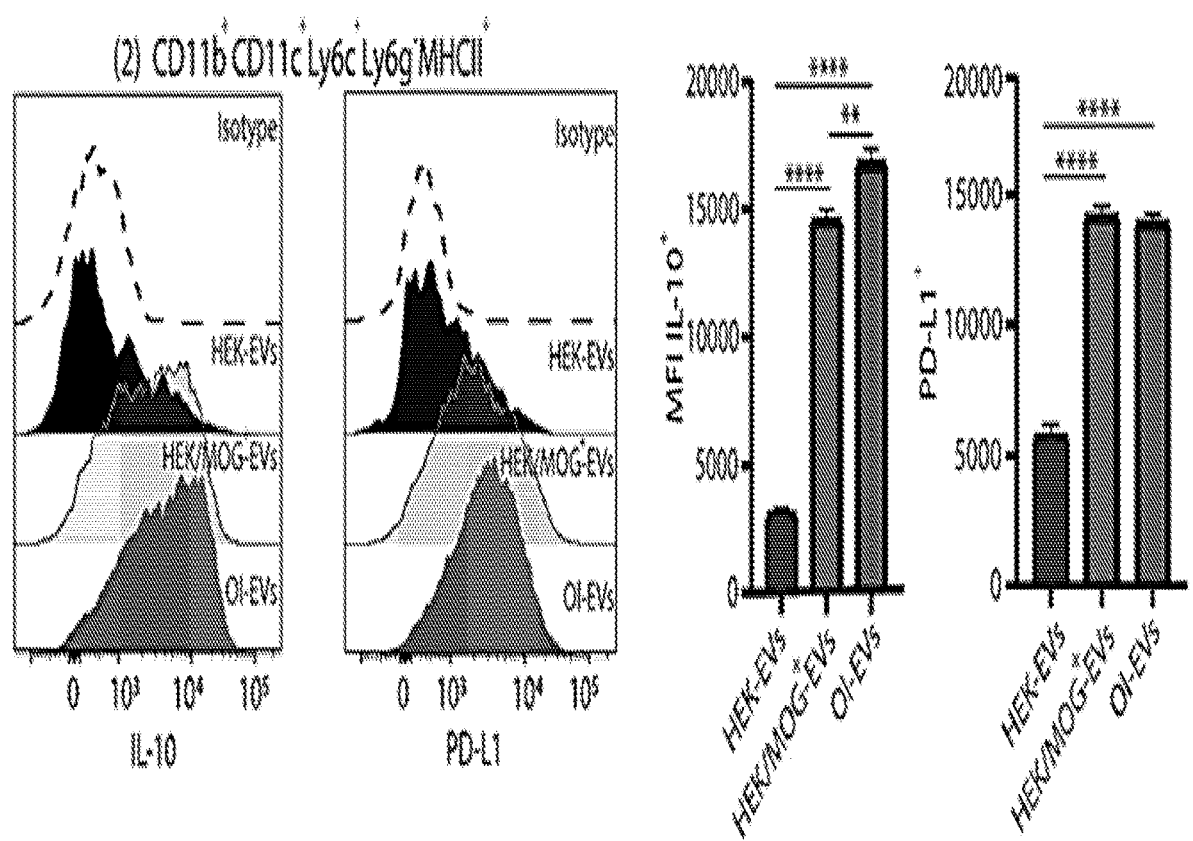

EAE mice treated with Ol-EVs had a higher percentage of apoptotic (caspase-3+ and PD-1+) encephalitogenic CD4+ T cells, both in the spleen and CNS (FIGS. 5D-5G and FIG. 13H, FIG. 13I), similarly to naive 2D2 mice that were i.v. injected with Ol-EVs (FIGS. 3A-3K). Whether there was a correlation between numbers of immunosuppressive monocytes (PD-L1+CCR2+Ly6c+) and apoptotic T cells (caspase-3+PD-1+CD4+) was tested, and a robust positive correlation was found (FIG. 5H). This supports the view that interaction between monocytes and encephalitogenic T cells causes apoptosis of T cells and ameliorates disease. Whether Ol-EV/i.v. impact numbers or frequency of Foxp3+CD25+ Tregs was also investigated, and no difference compared to controls was found (FIG. 13J and FIG. 13K), suggesting that Tregs do not mediate the suppressive effect of Ol-EVs in EAE.

Finally, to functionally validate the immunosuppressive phenotype of Ol-EVs-induced moDCs, FACS sorted CNS-derived Td-tomato+ moDCs were transplanted, from EAE mice treated with Cre+Ol-EVs) into mice with ongoing disease (FIG. 5I). The single transfer of Td-tomato+ moDCs induced rapid recovery from the disease, whereas transfer of control Td-tomato+ moDCs, from EAE mice treated with Cre+HEK-EVs, did not alter the disease course (FIG. 5I).

These data suggest that, upon treatment of EAE mice with Ol-EV/i.v., monocytes/moDCs acquire immunosuppressive phenotype and ameliorate disease by causing the death of encephalitogenic T cells.

Figure 18C:
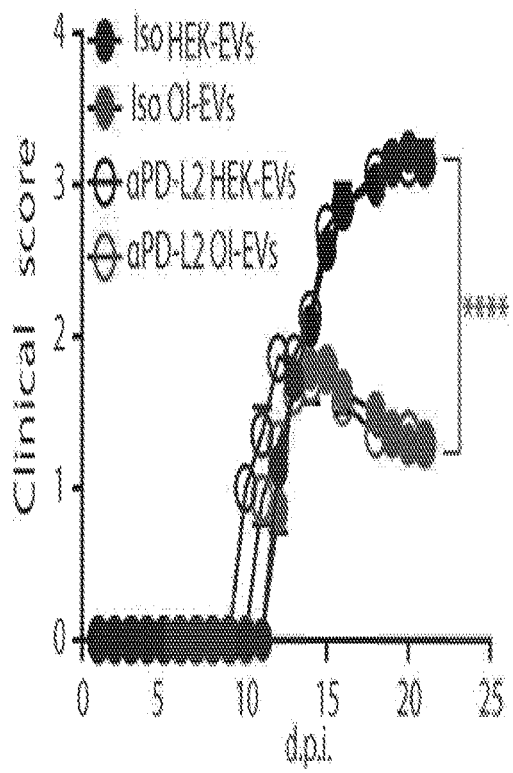
Figure 18D:
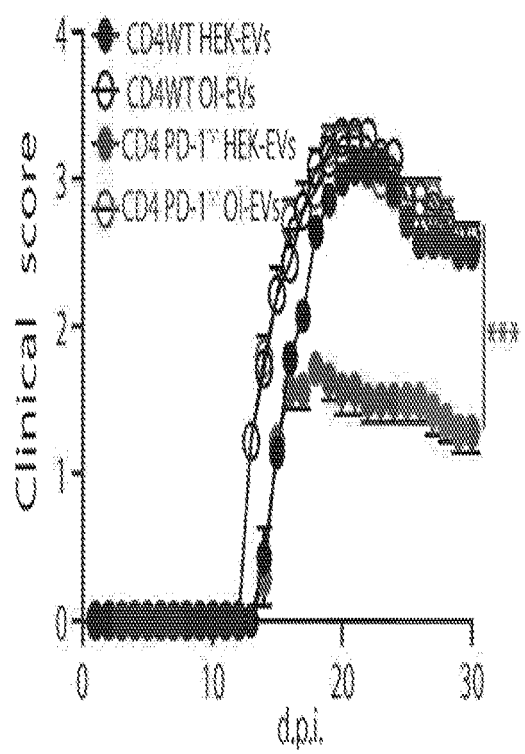

Example 6: Ol-EV/i.v.-Induced PD-L1 in Monocytes is Critical for EAE Suppression Given the importance of PD-1 and its ligands in immune tolerance (34-36), it was investigated whether Ol-EVs suppress EAE via PD-1/PD-L1 interaction. Anti-PD-L1 Ab was i.v. injected after disease onset, 24 h before Ol-EVs injection. Upon anti-PD-L1 treatment, EAE mice developed a severe disease that did not respond to Ol-EV/i.v. treatment (FIG. 5J). On the contrary, blockade of PD-L2 with Ab did not prevent EAE suppression by Ol-EVs (FIG. 18C). To confirm the importance of PD-L1 in the effects of Ol-EVs without using anti-PD-L1 Ab, PD-1$^{-/-}$ or WT CD4+ T cells were transplanted into RAG1$^{-/-}$ mice, immunized them with MOG$_{35-55}$ for EAE induction, and after disease onset, they were i.v. injected with Ol-EVs. The vesicles suppressed EAE in mice transferred with WT CD4+ T cells, but not in mice transferred with PD-1$^{-/-}$ CD4V T cells (FIG. 18D).

Overall, these data demonstrate that PD-1/PD-L1 interaction, but not PD-L2, is critical for the therapeutic effects of Ol-EVs in EAE.

Example 7: Ol-EVs Induce PD-L1 in an IL-10-Dependent Manner

Figure 6E:
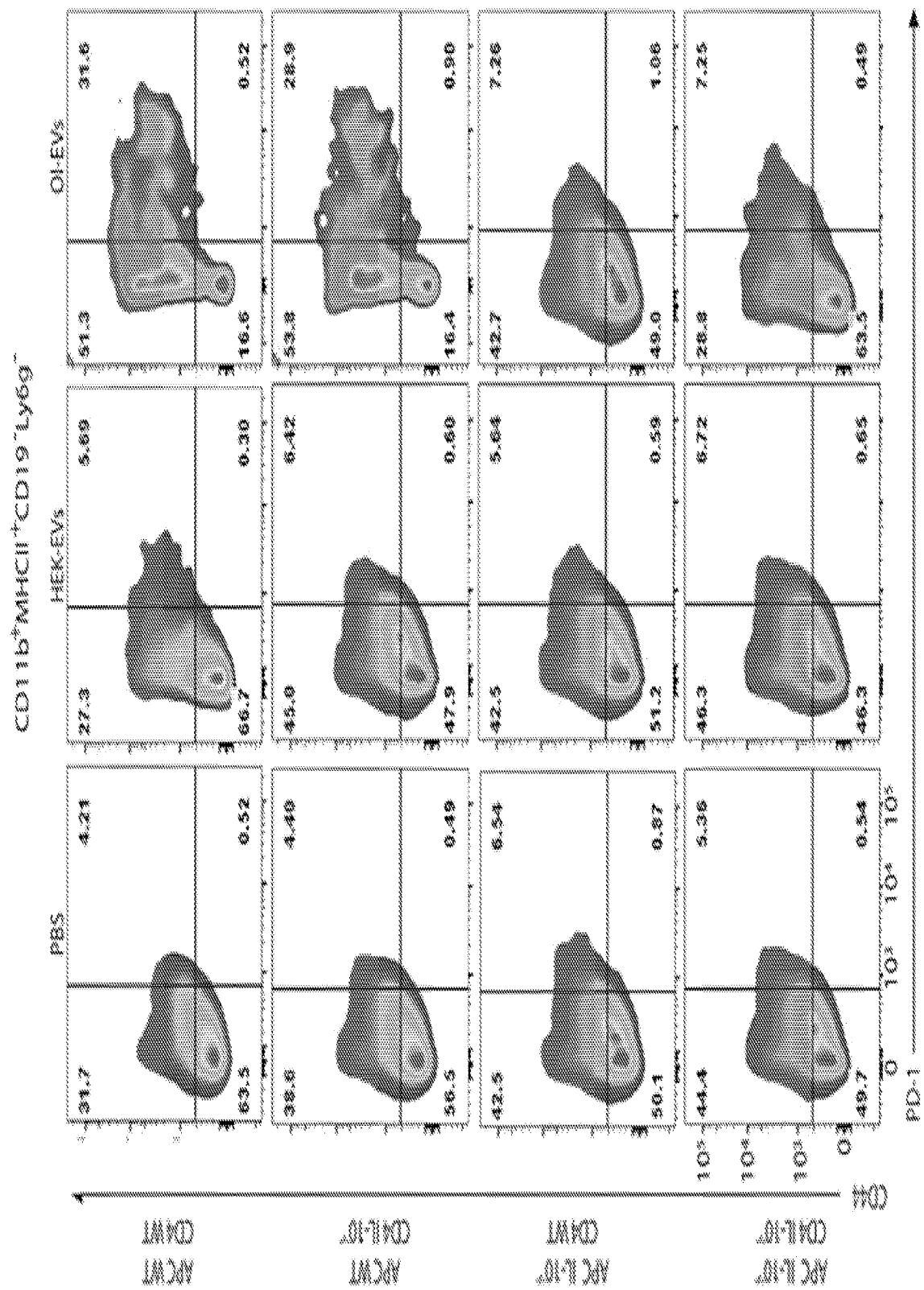
Figure 6F:
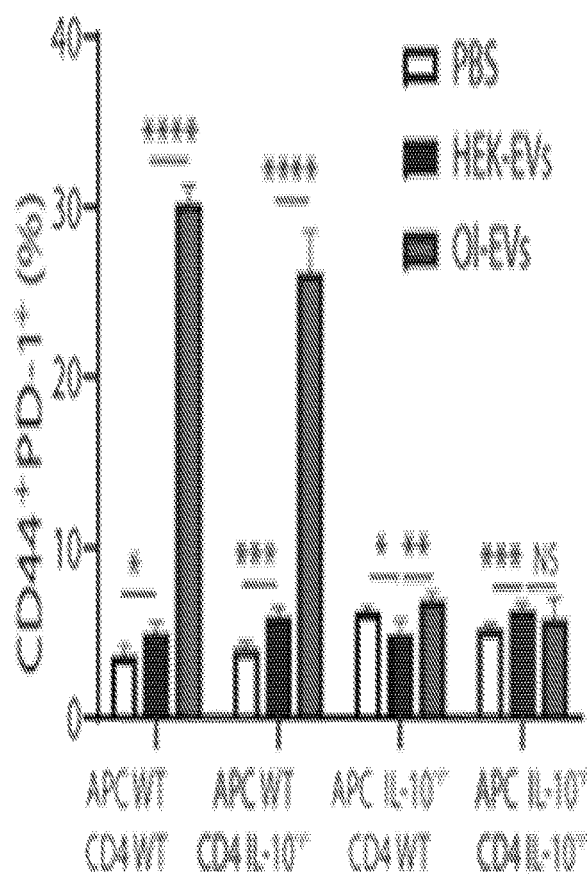
Figure 6G:
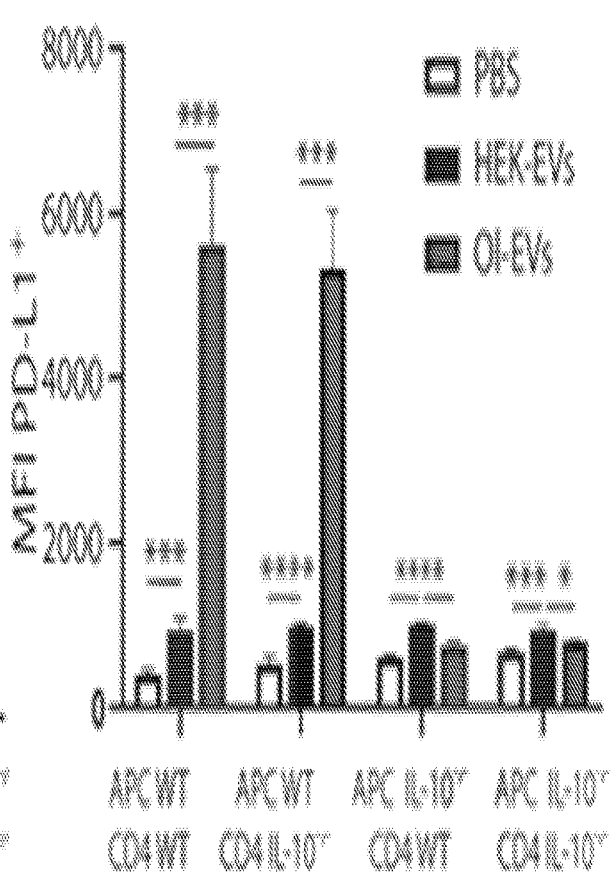

Ol-EV/i.v. induced IL-10 expression in monocytes of the spleen and CNS (FIGS. 5A-5J and FIGS. 6A-6G). Because of the immunoregulatory function of IL-10, it is possible that it contributes to EAE suppression by Ol-EVs, such as by inducing PD-L1 expression (6). To test this, EAE was first induced in mice lacking IL-10 receptor beta subunit (IL-10Rb$^{-/-}$) and Ol-EVs or HEK-EVs i.v. were injected at disease onset. In the absence of IL-10Rb, Ol-EVs failed to suppress EAE (FIG. 6A, FIG. B), and the number of leukocytes isolated from the CNS of Ol-EVs-treated IL-10Rb$^{-/-}$ mice was not reduced, as it was in WT mice (FIG. 6C). Next, to investigate which cell population produces IL-10 and induces PD-L1 on monocytes upon Ol-EVs treatment, a mismatch co-culture was generated with WT or IL-10$^{-/-}$ CD4+ T cells and APCs from MOG$_{3555}$-immunized mice and added Ol-EVs or HEK-EVs (FIG. 6D and FIG. 6F). IL-10 deficiency in myeloid APCs (CD11b+CD11c+ MHCII+CD19- cells) precluded the induction of PD-L1 on myeloid cells by Ol-EVs, whereas IL-10 deficiency in CD4+ T cells had no effect. These data show that Ol-EVs induce IL-10 in monocytes/DCs, which in turn induces PD-L1 expression in an autocrine manner.

Example 8: Human Ols Release EVs Containing Myelin Ags

The prerequisite for using Ol-EV/i.v. as therapy for MS is that human Ols (hOls) release EVs containing multiple myelin Ags. To determine if this is the case, human OPCs, derived from NIH-approved H9 human ESCs (Millipore), were differentiated into mature hOls, and harvested EVs from culture supernatant. hOls released large quantities of EVs, with an average diameter of 300 nm as determined by Cryo-EM (FIG. 7A). The proteomic profile of hOPC-derived EVs and hOl-EV was analyzed by mass spectrometry and it was found that their protein profiles substantially differ (FIG. 7B, FIG. 7C). Similar to mouse Ol-EVs, hOl-EVs contained a substantial amount of myelin proteins, such as MBP and MOG (FIG. 7D), whereas OPC-derived EVs contained much less of these proteins.

These data show that in vitro differentiated hOls release EVs containing substantial quantities of myelin Ags, which provides a proof of principle that hOl-EVs are similar in nature to mouse Ol-EVs, and therefore could have a similar beneficial effect in MS patients as mouse Ol-EVs have in EAE.

Example 9

Current therapies for MS target the immune system in an Ag-nonspecific manner, with potentially serious side effects due to systemic immunosuppression (4). A longstanding goal in MS research has been to devise an Ag-specific therapy that would suppress only harmful immune responses while leaving the rest of the immune system intact. The prerequisite for Ag-specific therapy is the identification of the target Ag. An autoimmune response in MS is believed to target Ol-produced myelin proteins, such as MOG, MBP, and PLP (41). It is also thought that the relevant myelin Ag(s) are not necessarily the same among MS patients, and that, over time, the specificity of the autoimmune response can shift from an initial myelin Ag epitope to another epitope or Ag (41). This concept of evolution in Ag specificity of pathogenic response, called "epitope spreading," also proposes that newly developed responses against additional myelin Ags contribute to disease flares and chronicity (24). Overall, the identity of relevant Ag(s) in MS remains unknown, with the possibility of heterogeneity among patients and over time. It is this lack of knowledge about Ags that hampers the development of Ag-specific MS therapies, despite its success in experimental animal models. Some of the therapies tested in animals address the issue of antigenic complexity, but in a manner that requires knowledge of Ags that drive disease (4). Based on findings in EAE, several approaches for the induction of Ag-specific tolerance in MS have been proposed (4). One of the approaches is the induction of tolerance by i.v. injection of free encephalitogenic peptide, or by peptide coupled to nanoparticles or apoptotic cells (5-10). I.v. tolerance suppresses EAE by eliciting tolerogenic APCs, diminishing pathogenic Th1 and Th17 cell responses (11, 42), and inducing Tregs and Tr1 cells (37). We have recently shown that induction of i.v. tolerance in ongoing EAE is dependent on IL-27 (11) and galectin 1 (42).

Clinical trials testing the effect of s.c. delivery of altered MBP peptide showed that this approach could indeed worsen disease in some MS patients (43). A trial in MS patients has shown that i.v. infusion of immunodominant MBP peptide (500 mg every 6 months for 24 months) to patients (n=32) with progressive MS is safe (44). At 24 months, the treatment had significant benefit only in patients (n=20) with HLA haplotypes DR2 and/or DR4. Long-term follow-up of these responder patients showed a median time to progression of 78 months compared with 18 months for placebo treatment. In another trial, a single i.v. infusion of autologous leukocytes covalently coupled with 7 immunodominant myelin peptides was also safe (9). Findings from these trials suggest that i.v. delivery of myelin Ags can be safe and beneficial to MS patients. Based on findings in experimental animals, it is thought that the infusion of myelin Ags in a particle form (cells, nanoparticles), which also applies to Ol-EVs, is a safer approach than the infusion of soluble free Ags (45).

The EVs field has grown rapidly during the last decade (20). EVs are protein-lipid membrane-enclosed particles secreted by virtually all cells (15, 16) that play a major role in cell-cell communication, both in physiological and pathological conditions. Several studies have reported the presence of EVs derived from CNS resident cells, such as microglia and astrocytes, both in cerebrospinal fluid and blood, with their quantities increasing during inflammatory conditions, such as MS and EAE (46). Ols also release EVs, but little is known on the role of Ol-EVs in maintaining homeostasis or during disease.

Thanks to significant advances made in EV biology, EVs are now being studied as a therapy for several diseases (20). Multiple studies have used EVs for therapy of experimental autoimmune diseases (17-19), reporting their efficacy in modulating EAE inflammation by targeting microglia/macrophages, eliciting tolerogenic DCs, and inducing Tregs (18-20). We show that in vitro cultured Ols release EVs, both exosomes and microvesicles, containing most relevant myelin proteins. In most reports describing EVs as a drug delivery tool, only exosomes were used (18), because of certain therapeutic advantages (17, 48). It has been shown that due to different sorting mechanisms of myelin proteins into different classes of Ol-EVs (49), PLP is enriched in exosomes, whereas MBP and MOG are mainly present in membrane-derived microvesicles (50). We used total Ol-EVs, exosomes, and microvesicles, and their administration suppressed neuroinflammation in an Ag-dependent manner, prophylactically and therapeutically in several EAE models. The treatment had no observable adverse effects and was safer than the infusion of free peptides. Infused Ol-EVs were preferentially taken up by phagocytes, monocytes, neutrophils and cDCs, but only monocytes proved to be indispensable for Ol-EV-induced tolerance. Monocytes that had taken up Ol-EVs upregulated expression of several anti-inflammatory molecules, such as PD-L1 and IL-10, which mediated disease suppression. Finally, we show that hOls also release EVs containing myelin proteins.

Ol-EVs, carrying multiple myelin Ags, diminish encephalitogenic T cell responses against multiple myelin Ags/epitopes and suppress neuroinflammation in several EAE models. It has been reported that the use of synthetic multi-epitope Ags (several myelin epitopes combined into a single artificial protein) are more efficient in suppressing EAE than the individual peptides (23, 38). The effect of Ol-EVs is Ag-dependent and specific. Using MOG- and MBP-specific T cell receptor transgenic mice showed that Ol-EVs induce apoptosis and anergy of autoreactive T cells through myelin Ag(s) that they carry. Furthermore, it is shown herein that Ol-EVs deficient for MOG or MBP failed to suppress $MOG_{35-55}$-induced or MBPAc(1-11)-induced EAE.

Heterogeneity in size and protein content of EV are variables that influence uptake of EV by recipient cells that can occur via multiple pathways (16). It is known that nanoparticles are endocytosed by a scavenger receptor-dependent mechanism (7); however, although the specifics of EVs uptake are not fully elucidated (15), it is described that phagocytes, such as monocytes/moDCs, DCs, macrophages, and microglia can internalize EVs by receptor-mediated endocytosis, phagocytosis, and micropinocytosis (51).

The roles of moDCs in EAE have been extensively described (32). moDCs are generally not present in the healthy CNS, but during inflammation, they infiltrate into the meninges and parenchyma and contribute to CNS pathology by acquiring an enhanced capacity for Ag processing and presentation. In contrast to several studies that have described the importance of "Ag-capture" by splenic phagocytes for restoring immune tolerance in EAE (7), data herein suggest that moDCs infiltrated into the CNS acquire Ol-EVs and mediate suppression of EAE. Indeed, the transfer of CNS-derived moDCs from EAE mice treated with Ol-EVs into mice with ongoing disease rapidly suppressed EAE inflammation.

It was shown herein that upon treatment of EAE mice with Ol-EV/i.v. there is an upregulation of PD-1 on CD4+ T cells, and upregulation of PD-L1 and PD-L2 on moDCs. Given the importance of PD-1 and its ligands in immune tolerance (38), it was investigated whether Ol-EVs suppress EAE via PD-1/PD-L1 and/or PD-1/PD-L2 interaction. Blockade of PD-L1 with Ab abrogated EAE suppression by Ol-EVs, whereas blockade of PD-L2 had no effect. This demonstrates that interaction between PD-1 on T cells and PD-L1 on moDCs leads to anergy and apoptosis of encephalitogenic T cells and disease amelioration, being in agreement with the reported role of PD-L1 in induction of i.v. tolerance in EAE (6).

IL-10 is an anti-inflammatory cytokine with critical immune regulatory roles, suppressing inflammatory responses and autoimmunity, including EAE (6). It has been shown that peptide/i.v. tolerance induction in EAE requires IL-10. Studies have shown the possibility to induce IL-10 and promote immune tolerance in EAE, by different ways (6, 7) and that the blocking IL-10 abrogates tolerance (6). It is demonstrated herein that EAE suppression by Ol-EVs also requires IL-10 production by APCs, but not by CD4+ T cells. Apparently, IL-10 for PD-L1 expression on moDCs to be induced and disease suppressed.

An important mechanism for establishing and maintaining peripheral tolerance relies on Tregs. It was therefore explored whether Ol-EV/i.v. impact Tregs, but a change in their total numbers or frequencies among CD4+ T cells was not found. This suggests that Ol-EV/i.v. suppress EAE by a Treg-independent mechanism, and that direct interaction between myelin-specific CD4+ T cells and tolerogenic moDCs leads to apoptosis and anergy of the T cells. However, even though a tolerogenic phenotype of moDCs can be induced independently of Tregs, there is still the possibility that Tregs contribute to its induction, without being themselves expanded. A modest Treg contribution to Ag-specific i.v. tolerance induction in EAE has been reported in a system similar to ours, but with the use of myelin Ag coupled to microbeads (7). These reported findings support the view that Tregs may provide some contribution to EAE suppression by Ol-EVs but are likely not essential to it.

In conclusion, given that Ol-EVs contain most, or possibly all relevant myelin Ags, they have the potential to induce Ag-specific tolerance and suppress disease driven by an immune response against myelin Ags. Hence, the use of Ol-EVs would sidestep the need to identify relevant myelin Ag(s) in each patient, raising the possibility that Ol-EV/i.v. may be a universally applicable Ag-specific MS therapy.

What is claimed is:

1. A method for inducing immunological tolerance to myelin antigens in a human subject with multiple sclerosis (MS), the method comprising administering to the subject an effective amount of oligodendrocyte-derived extracellular vesicles (Ol-EVs) comprising myelin basic protein (MBP), myelin oligodendrocyte glycoprotein (MOG), and/or myelin proteolipid protein (PLP), ALIX, FLOT-1, TSG101, ANAX1, and GAPDH, and wherein the administering induces immunosuppressive monocytes expressing PD-L1.

2. The method of claim 1, wherein the administering does not cause any deleterious or unwanted effect(s) on the immune system of the subject.

3. The method of claim 1, wherein the oligodendrocyte-derived extracellular vesicles are formulated in a pharmaceutical composition comprising at least one pharmaceutically acceptable carrier.

4. The method of claim 3, wherein the pharmaceutical composition is administered intravenously, subcutaneously, intradermally, transdermally, orally or nasally.

5. The method of claim 1, wherein the MS is chronic MS.

6. A pharmaceutical composition comprising oligodendrocyte-derived extracellular vesicles (Ol-EVs) and at least one pharmaceutically acceptable carrier, wherein the Ol-EVs comprise myelin basic protein (MBP), myelin oligodendrocyte glycoprotein (MOG), and/or myelin proteolipid protein (PLP), ALIX, FLOT-1, TSG101, ANAX1, and GAPDH.

7. The pharmaceutical composition of claim 6, wherein the composition is formulated for intravenous, subcutaneous, intradermal, transdermal, oral or nasal administration.

8. The method of claim 1, wherein the MS is relapsing-remitting MS.

* * * * *